United States Patent
Adams et al.

(10) Patent No.: US 7,461,381 B2
(45) Date of Patent: Dec. 2, 2008

(54) FLEXIBLE NETWORK PLATFORM AND CALL PROCESSING SYSTEM

(75) Inventors: Thomas L. Adams, St. Louis, MO (US); Will R. Chorley, Ballwin, MO (US); Philip C. Cunetto, Ballwin, MO (US); James M. Doherty, Ballwin, MO (US); John E. Lemay, Chesterfield, MO (US); Stephen M. Mueller, Ballwin, MO (US); Satish Parolkar, Chesterfield, MO (US); Timothy P. Schroeder, Chesterfield, MO (US); Charles B. Slaten, St. Charles, MO (US)

(73) Assignee: AT&T Labs, Inc., Austin, TX (US)

( * ) Notice: Subject to any disclaimer, the term of this patent is extended or adjusted under 35 U.S.C. 154(b) by 867 days.

(21) Appl. No.: 10/743,475

(22) Filed: Dec. 23, 2003

(65) Prior Publication Data

US 2005/0078611 A1    Apr. 14, 2005

Related U.S. Application Data

(63) Continuation of application No. 08/871,545, filed on Jun. 9, 1997, now Pat. No. 6,724,875, which is a continuation of application No. 08/362,987, filed on Dec. 23, 1994, now abandoned.

(51) Int. Cl.
*G06F 13/00* (2006.01)
(52) U.S. Cl. .................................. 719/316; 719/318
(58) Field of Classification Search ................ 719/316, 719/318
See application file for complete search history.

(56) References Cited

U.S. PATENT DOCUMENTS

| | | | |
|---|---|---|---|
| 4,313,035 A | 1/1982 | Jordan et al. | |
| 4,567,323 A | 1/1986 | Lottes et al. | |
| 4,611,094 A | 9/1986 | Asmuth et al. | |
| 4,959,854 A | 9/1990 | Cave et al. | |
| 5,046,088 A | 9/1991 | Margulies | |
| 5,133,075 A | 7/1992 | Risch | |
| 5,179,734 A | 1/1993 | Candy et al. | |

(Continued)

FOREIGN PATENT DOCUMENTS

| | | |
|---|---|---|
| WO | 98/53599 | 11/1998 |
| WO | 99/16271 | 4/1999 |

OTHER PUBLICATIONS

Dunogue et al., "The Building of Intelligent Networks, Architecture and Systems from Alcatel," *Communication & Transmission*, No. 2, pp. 5-22 (1989).

(Continued)

*Primary Examiner*—Andy Ho
(74) *Attorney, Agent, or Firm*—Greenblum & Bernstein, P.L.C.

(57) ABSTRACT

A communications services network platform has a multi-layered software architecture residing on a host computer. The network platform connects to a communications network and includes a call processing stack, a link layer, and a service support subsystem. The call processing stack implements call processing by processing events associated with a communication path through the communications network and has an application layer, representing each active call being processed by the call processing stack, and a resource layer, including software abstractions of physical resources located outside the host computer. The link layer manages a communications link between physically connected physical resources and the call processing stack. The service support subsystem executes services requested by the call processing stack. The platform manages and controls communications events associated with the communication path to complete a request for services between nodes on the communication network.

11 Claims, 29 Drawing Sheets

U.S. PATENT DOCUMENTS

| | | | |
|---|---|---|---|
| 5,193,110 A | 3/1993 | Jones et al. | |
| 5,237,684 A | 8/1993 | Record et al. | |
| 5,241,588 A | 8/1993 | Babson, III et al. | |
| 5,243,643 A | 9/1993 | Sattar et al. | |
| 5,255,305 A | 10/1993 | Sattar | |
| 5,282,244 A | 1/1994 | Fuller et al. | |
| 5,291,489 A | 3/1994 | Morgan et al. | |
| 5,291,593 A | 3/1994 | Abraham et al. | |
| 5,295,139 A | 3/1994 | Palmer | |
| 5,297,279 A | 3/1994 | Bannon et al. | |
| 5,299,260 A | 3/1994 | Shaio | |
| 5,305,454 A | 4/1994 | Record et al. | |
| 5,315,646 A | 5/1994 | Babson, III et al. | |
| 5,319,778 A | 6/1994 | Catino et al. | |
| 5,323,452 A | 6/1994 | Dickman et al. | |
| 5,329,471 A | 7/1994 | Swoboda et al. | |
| 5,329,579 A | 7/1994 | Brunson | |
| 5,335,229 A | 8/1994 | Hunt et al. | |
| 5,335,339 A | 8/1994 | Maejima et al. | |
| 5,337,351 A | 8/1994 | Manabe et al. | |
| 5,345,380 A | 9/1994 | Babson, III et al. | |
| 5,345,587 A | 9/1994 | Fehskens et al. | |
| 5,367,473 A | 11/1994 | Chu et al. | |
| 5,379,432 A | 1/1995 | Orton et al. | |
| 5,386,464 A | 1/1995 | Pruitt | |
| 5,388,258 A | 2/1995 | Larsson et al. | |
| 5,404,396 A | 4/1995 | Brennan et al. | |
| 5,408,526 A | 4/1995 | McFarland et al. | |
| 5,434,920 A | 7/1995 | Cox et al. | |
| 5,455,854 A | 10/1995 | Dilts et al. | |
| 5,490,199 A | 2/1996 | Fuller et al. | |
| 5,490,251 A | 2/1996 | Clark et al. | |
| 5,491,820 A | 2/1996 | Belove et al. | |
| 5,491,822 A * | 2/1996 | Allen et al. | 719/316 |
| 5,495,484 A | 2/1996 | Self et al. | |
| 5,526,415 A | 6/1996 | Wakamoto | |
| 5,544,345 A * | 8/1996 | Carpenter et al. | 711/150 |
| 5,548,726 A * | 8/1996 | Pettus | 709/221 |
| 5,652,879 A * | 7/1997 | Harris et al. | 707/101 |
| 5,704,041 A * | 12/1997 | Allen et al. | 719/316 |
| 5,724,406 A | 3/1998 | Juster | |
| 6,418,215 B1 * | 7/2002 | Schessel | |

OTHER PUBLICATIONS

Pennanec'h, "Intelligent Network Software Factory for Service Creation and Modification," *Electrical Communication*, vol. 3, No. 4 (1989).

De Sadaba, "Personal Communication in the Intelligent Network," *British Telecommunications Engineering*, vol. 9, pp. 80-83 (Aug. 1990).

Fujioka et al., "Universal Service Creation and Provision Environment for Intelligent Network," *IEEE Communications Magazine*, pp. 44-51 (Jan. 1991).

Berman et al., "Perspectives on the AIN architecture," *IEEE Communications Magazine*, pp. 27-32 (Feb. 1992).

Beyltjens et al., pp. 356-365, no date.

Booch, *Object-Oriented Analysis and Design, With Applications*, Second Edition, the Benjamin/Cummings Publishing company, Inc. (1994).

Application for New Radio Station Authorization, dated Jul. 16, 1991.

Participant's Manual—Administrative PCS—Feb. 23, 1993.

Quarterly Progress Reports, dated Jun. 17, 1992, Sep. 17, 1992, Dec. 17, 1992, Mar. 17, 1993, Jun. 17, 1993, Sep. 23, 1993, and Jan. 4, 1994.

Draft Press Release, dated Jun. 19, 1992.

Maruyama, K. et al., "A Concurrent Object-Oriented Switching Program in Chill," IEEE, pp. 60-68, 1991.

Koyanagi, K. et al., "Hierarchically Structured Switching Software," IEEE, pp. 1918-1922, 1993.

Lemay et al., "Prototyping Environment for New Service Creation," Proceedings of the National Communications Forum, Oct. 8-10, 1990, vol. 44.*

* cited by examiner

RESOURCE MANAGEMENT

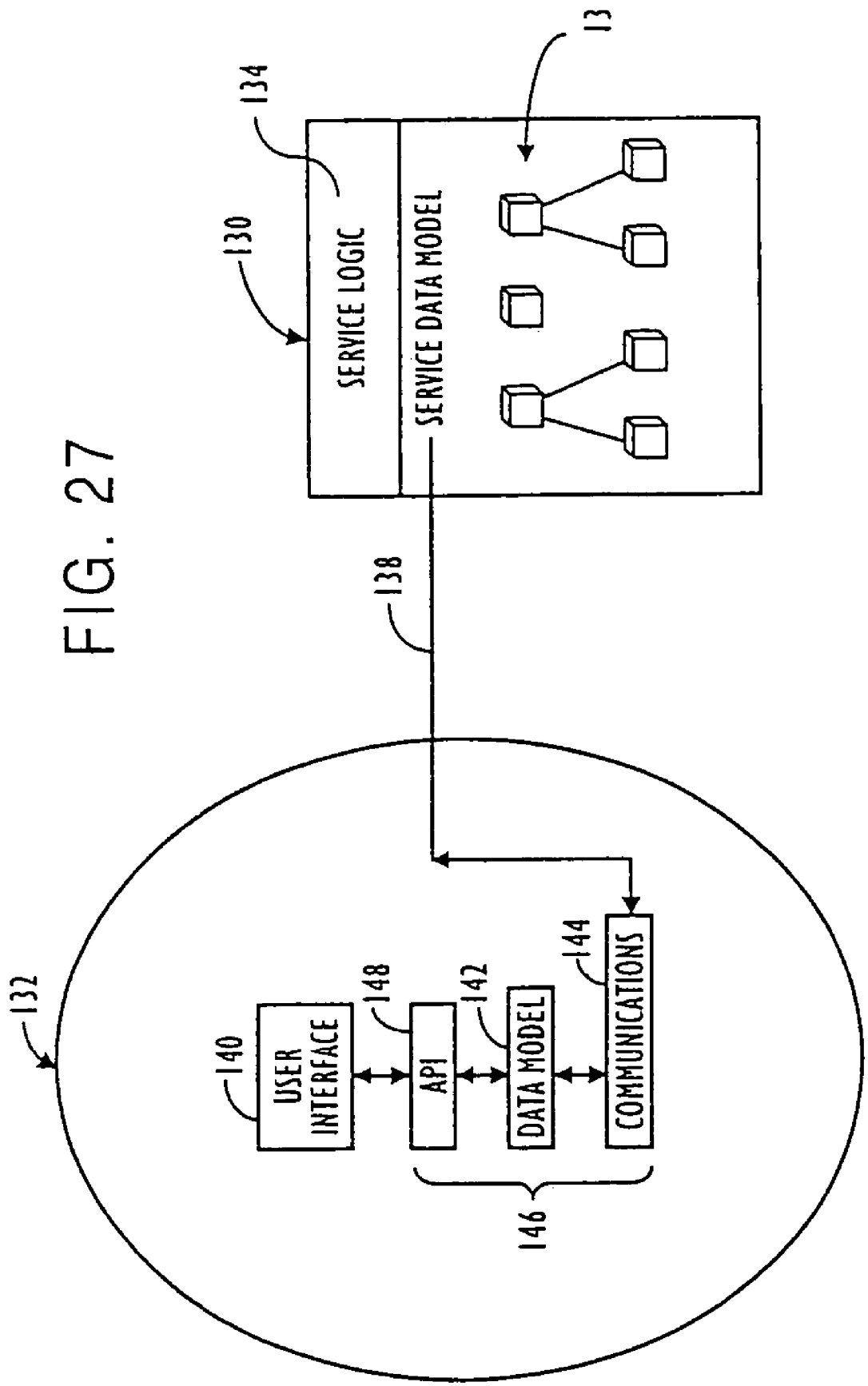

FLEXIBLE NETWORK PLATFORM AND CALL PROCESSING SYSTEM

This application is a continuation of U.S. patent application Ser. No. 08/871,545, filed on Jun. 9, 1997 now U.S. Pat. No. 6,724,875 which is a Rule 62 Continuation Application of U.S. patent application Ser. No. 08/362,987, filed on Dec. 23, 1994, which is now abandoned, the contents of all of which are expressly incorporated herein by reference in their entireties.

SUMMARY OF THE INVENTION

1. Field of the Invention

The present invention relates to a telecommunications network and a platform which controls the telecommunications network by managing call processing within the telecommunications network and handling other functions such as the assignment of resources, signalling and switching.

2. Discussion of Background Information

Over the years, telecommunications networks have vastly improved in their ability to enable network users to receive what is termed "personalized services." These services are personalized in that they are oriented toward the user/subscriber instead of the network in general; that is, the user can decide which network service or services he or she wishes to subscribe to, as opposed to the user getting, and paying for, all services that the network provides.

One type of network that is particularly well suited for the provision of personalized services is the intelligent network. Intelligent networks centralize service-related intelligence in special nodes located in the telecommunications network. The intelligent network is well suited for telecommunications systems providing personalized services since it allows the setting up and management of network services that require sizable data and call handling resources.

An article by Sadaba (Telefonica de Espana) entitled "Personal Communications in the Intelligent Network," British Telecommunications Engineering, Vol. 9, August, 1990, pages 80-83, notes the importance of intelligent networks with respect to personalized services. The article generally describes (at pages 82-83) the concept of intelligent networks, and notes that intelligent networks treat all calls individually, dependent upon several parameters and variables. The article further explains that several entities are involved in the control of a call, and that switching functions are clearly separated from the control functions. The article states that separation of the switching functions from the control functions allows the resulting network to be more flexible in the way that it handles telecommunications functions, such as numbering, charging, routing, subscriber location, network management and service creation. Accordingly, intelligent networks have been deemed important in providing for flexibility in network management, service creation, and provisioning in telecommunications networks. Intelligent networks have been embodied in various forms, including well-known versions such as IN/1, IN/2 and IN/1+, as well as the advanced intelligent network (AIN) releases. A particular AIN architecture is described by Roger K. Berman and John H. Brewster in an article entitled "Perspectives on the AIN Architecture," IEEE Communications magazine, February 1992, pages 27-32. In that article, a particular AIN release 1 architecture is described at pages 28 and 29. The physical systems and interfaces included in the AIN architecture are shown in FIG. 1 of the article.

The article further discloses, in an appendix at page 31, more detailed information about an AIN release 1 call model. The AIN release 1 call model is described as comprising two components, including a basic call model (BCM) and a connection view (CV). The BCM provides a generic model of current call processing for basic two-party calls and describes when in call processing AIN switch capabilities can be utilized. The CV describes how service logic of a stored program control can access the AIN switch capabilities to influence call processing and the switch. The CV provides a generic view of call processing resources in the AIN switch to the SCP/adjunct, which view is independent of the switch vendor implementation, representing the essential characteristics of call processing resources needed by service logic, and hides the critical details of technical complexities of the resources from the service logic.

While the specifics of the AIN release 1 architecture allow for a certain amount of flexibility in the use of different switches, e.g., by hiding the physical details and technical complexities of the resources from the service logic, the AIN architecture is limited in many respects. Particularly, there is some room for improvement in the ability of a network platform to provide a wide range of personalized services, change the resources used by the platform, quickly create and deliver services, and provide OAM&P capabilities.

3. Definitions

The following terms are defined in order to provide a better understanding of the present invention as described herein.

Aggregate Resource Capability:
A resource capability that represents more than one basic capability.

Alarm Factors:
The input states associated with a managed object which caused the object's summary state to take on its current value. If all problems listed in the alarm states are resolved, the managed object's summary state will return to CLEAR.

Application Layer:
The application layer comprises all classes whose objects generically participate in call processing, including, e.g., the leg, session, event manager, event handler and application components.

Application Component:
A basic unit of service function. Services are built using application components.

Basic Capability:
Fundamental units of equipment functionality. A basic capability cannot be decomposed into other capabilities. Some examples of basic capabilities could be playing tones, and recognizing DTMF digits.

Call Processing Stack:
A hierarchy of objects that interact with each other to implement call processing. From bottom to top for a given active call, the stack comprises one or more logical resources, one or more channels, one or more virtual terminals, one or more legs, a session, and at the top of the hierarchy, a set of event managers, event handlers and application components that are utilized to execute various service logic units (service program).

Call Processing Virtual Machine:
The software environment within which the flexible platform services run, consisting of generic call components and application components.

Capability:
A capability is any function that a piece of equipment can perform. Some example capabilities are playing tones, making voice calls and playing announcements.

Channel:
An object in the call processing stack that manages a path resource and a set of logical resources (which may be empty) associated with that path resource. A channel may also keep track of basic capabilities and resource capabilities supported by the resources that it is managing.

Event Handler:
An object that appears in the event manager of a session. Each event handler waits for a particular event to occur, where the event is of a certain type and has a particular reference channel and reference leg. If an event occurs with respect to reference channel and reference leg, the event handler starts execution of the specified service logic unit assigned to it.

Event Manager:
An object in (or associated with) a session that contains event handlers for that session. It may be arranged as an array, indexed by event type, of event handler lists.

Generic Call Components:
Software objects, comprising, e.g., sessions, legs, VTs (virtual terminals), channels and VUs (virtual users), that are used to represent the dynamic states of calls, and other information including how many calls are involved, what resources are being used, and so on.

Input State:
The set of states which serve as the input to one or more functions used to calculate the output states of a managed object. These states are communicated to the objects via the state distributor.

Intermediate Model Domain:
Managed object representation of objects existing in the real-time domain (RTD) and logical groupings of those objects.

Leg:
The application layer object that represents a party to a call. The leg manages both information about a single party in a call and the VT (virtual terminal) object associated with that party's call. The leg may also perform other functions.

Link Layer:
The software in the platform host that manages the communications link which connects physical resources to the host. The link layer passes messages between physical resources and the logical resource objects with which they are associated.

Logical Resource:
An object in the call processing stack that represents one or more resources, e.g. hardware, software, firmware, etc. The logical resource may perform functions such as translating commands from higher layers into bit streams understandable by the resources it represents. Other functions that a logical resource might perform include translating reports from the resources it represents into calls to reporting methods that are present in the higher layers of the software.

Managed Object:
A collection of a set of input states, a set of output states, a set of functions which calculate the output states from the input states, and a set of functions which this collected entity can perform. This collection of information within the managed object may be used to represent either a physical or logical entity within the platform system.

Output States:
The set of states which provide a consolidated view of the information feeding into a managed object. The output state is defined by a function using one or more of the managed objects of the input state of the managed object as parameters. The input states are communicated to that particular managed object via a state distributor.

Path:
Any medium that supports the transfer of information from a user located on the network to the platform, from the platform to a user on the network, or from one user on the network to another user on the network. Some example paths could include a voice path, or a data path.

Path Resources:
A logical resource object that represents a resource that supports a path.

Platform:
The control component of a communications system infrastructure which manages the communication processes and handles assignment of resources, and other functions such as signalling and switching.

Presentation Domain:
Applications used to present the object in the intermediate model domain (IMD) to an external system (e.g., an application program within an OAM&P work station).

Real-Time Domain (RTD):
Those components of the platform which directly support call processing, e.g., resources, channels, virtual terminals, and so on, as well as OAM&P specific objects which interact in real time with the call control object that supports call processing.

Reference Channel:
The channel with reference to which an event occurs. The reference channel is not necessarily the same as the channel which produced the event. For example, an internal offer connection event is produced by a channel on the incoming side of a call. However, its reference channel is an unspecified channel and some leg on the outgoing side of the call. If a session receives an event with a particular reference leg and a particular reference channel and it contains an event handler for that event, with the particular reference leg and particular reference channel, it starts executing that particular corresponding event handler. The reference channel for an event is contained in a virtual terminal (VT) associated with the reference leg for that same event.

Reference Leg:
The leg with reference to which an event occurs. The leg is not necessarily the same as the leg which produced the event (which may be called the originating leg). For example, an internal offer connection event may be produced by a leg on the incoming side of a call. But its reference leg may be some leg on the outgoing side of a call. If a session receives an event with a particular reference leg and reference channel, and it contains an event handler that corresponds to that event, reference leg, and reference channel, it will start executing that event handler. The reference leg for an event is associated with a VT that contains the reference channel for the same event.

Resource Capability:
A capability that represents one or more basic capabilities.

Resource Layer:
In the context of a flexible network platform, as disclosed herein, the resource layer may comprise all logical resource, channel, and VT (virtual terminal) classes. With respect to a given call, the resource layer may comprise a set of objects within those classes that are participating in that active call.

Scratch Variable:
Each event handler has a collection of scratch variables. If the event handler is considered to be a virtual machine for executing services, the scratch variable serves as its memory and register space. The scratch variables are used to perform calculations and store data that needs to be conveyed from one application component to another during execution of service logic.

Service Logic Unit (SLU):
The body of service logic that an event handler executes. A service logic unit may be simply called a service unit. A service may be composed of one or more (usually more) service logic units.

Sessions:
The software object to which all legs in a call attach themselves. A session transmits event reports from channels via legs to the event handler assigned to handle those events.

Singular Resource Capability:
A resource capability that represents only one basic capability.

State Distributor:
A component of a platform OAM&P subsystem that provides a communication mechanism by which multiple processes may be concurrently informed of changes in the state of the platform.

State Information Client:
A process which initiates certain actions when notified by the state distributor of a change in the value of a specified state.

State Information Server:
A process which monitors or maintains a specific state and communicates information about that state via the state distributor.

Summary State:
A state used to describe the state of a managed object. The summary state may include terms such as CLEAR, MINOR, MAJOR, CRITICAL, INITIALIZING or UNKNOWN.

Universal Information Network (UIN):
A network that deals not only with voice-based personalized services, but handles services handling/using other types of media including audio and video, as well as text information.

Virtual Synchrony:
A property of a distributed system under which each recipient of a set of events receives those events in the same order that would be produced if the event happened everywhere at the same time. A virtually synchronous system will not guarantee that distributed events occur at the same time, but only that they will be ordered (i.e., set into motion) at all recipients as if they had occurred synchronously.

Virtual Terminal (VT):
An object in the call processing stack that manages a set of channel objects associated with a single user.

Virtual User (VU):
An entry in the database that stores persistent data about a subscriber to platform services. Such data may include, for example, the name, address and subscribed services of that user. Originating callers who have not subscribed to any originating services may be associated with a virtual user entry which corresponds to a default origination service.

SUMMARY OF THE INVENTION

In view of the above, the present invention, through one or more of its various aspects and/or embodiments, is thus presented to accomplish one or more objectives and advantages, such as those noted below.

It is an objective of the present invention to provide a universal information network platform that is flexible, and that can aid in the performance of several functions including: call processing and service execution; database maintenance; service creation; service and user data provisioning; OAM&P; and switching, routing and translation.

It is a further objective of the present invention to provide a network component that can provide a wide range of telecommunications services.

It is a further objective of the present invention to provide a universal information network platform that is flexible and that can be easily expanded or modified to be able to provide different services.

It is yet a further objective of the present invention to minimize the amount of time it will take from definition to delivery of a particular service. Another objective of the present invention is to reduce the complexities of integrating services or service modifications into the network, so that less skill is needed to develop new services.

A further objective of the present invention is to reduce the amount of resources needed to provide a wide range of telecommunication services. In addition, the present invention strives to provide service application programs that can perform call processing in accordance with defined service logic, without having to handle hardware allocation and deallocation directly.

It is yet a further objective of the present invention to provide a mechanism for interfacing service control to other hardware and software resources, without limitations as to the resource type. Therefore, it is an objective to provide a system that will not have limitations on the ability to integrate different types of resources into the service providing platform. For example, there should be no limitation on the type of vendors or the type of technologies used in order to implement resources utilized by the service providing platform.

It is yet a further objective of the present invention to provide an OAM&P system that will work in connection with a flexible network platform, where the OAM&P system gathers and maintains information about the state of various entities within the flexible network platform, and makes that information easily accessible.

It is yet a further objective of the present invention to provide an OAM&P system that gathers and maintains information about the states of various entities within the call processing mechanism of a platform, without adversely affecting the platform's ability to perform call processing. It is an objective to provide such an OAM&P state information gathering system which does not require the call processing system to take an active part in gathering and maintaining such state information.

It is yet a further objective of the present invention to provide a flexible managed object hierarchy which presents information in a certain standard way to OAM&P information clients (including information about what information is provided, where further information may be obtained, and what actions the clients may take with respect to that particular state information). Thus, it is an objective of the present invention to allow the introduction of new types of managed objects without requiring changes to the architecture or configuration of information clients that may call upon information from the managed objects.

A further objective of the present invention is to provide a flexible network platform which will allow new service provisioning and modification to be quickly and easily delivered. A further objective of the present invention is to provide such a flexible network platform which allows services to execute in an asynchronous environment, but to allow service logic to be programmed in a sequential fashion without the need to handle asynchronous events.

It is a further objective of the present invention to provide service logic that can be interpreted in a threaded fashion in order to allow services to be modified and added to extended data interfaces without the need to recompile or halt the system. A further objective of the present invention is to provide a threaded interpretative service logic mechanism which does not trade speed of execution for flexibility.

It is a further objective of the present invention to provide a call processing virtual machine which does not assume a call model or any template into which service logic must fit. It is an objective to provide a call processing virtual machine within which a platform will allow any piece of service logic to be associated with any particular event that would be seen by the platform.

It is a further objective of the present invention to separate service software from resource layer software, so that the service software need not know the particulars about the physical resources connected to the platform.

The present invention is directed to a flexible network platform, and to various subsystems that may be provided in connection with a flexible network platform. In accordance with one aspect of the invention, a telecommunications services network platform is provided for controlling the processing of calls in accordance with one of a plurality of defined services. The network platform may include a call processing system for performing call processing in accordance with defined service logic, and call processing resources connected to the call processing system.

The resources may include at least one media processor and a switching system for routing information among the at least one media processor and entities connected to the telecommunications network. The switching system is connected to a telecommunications network, to the call processing system, and to the resources.

The call processing system may be provided with session means for representing an active call with a session object, and means for forwarding external events associated with the active call to the session object. In addition, a mechanism may be provided for creating an initial event handler object, which has a particular method, variables, and values for the variables. A further mechanism may be provided for registering the initial event handler object with the session object. The initial event handler object is associated with a particular event type, a party of an active call, and a communication path used by the party.

The session object receives the particular event and includes a mechanism for calling an event handler method within the initial event handler object. The method of the initial event handler object performs several functions in accordance with variables set forth in the initial event handler object. The variables may include a service logic unit identifying variable, and the several functions may include commencing execution of a service logic unit.

A mechanism may also be provided for registering additional event handler objects in response to requests by application components being executed within a service logic unit. Each additional event handler object corresponds to a service logic unit.

In accordance with another aspect of the present invention, a resource managing system may be provided for assigning resources for use in performing call processing by a call processing system. A resource is assigned in response to a request made by the call processing system for a particular capability. The resource managing system includes a mechanism for receiving a request made by the call processing system for a specified capability. A plurality of logical resource objects are defined, each logical resource object comprising a mechanism for translating generic resource commands made by the call processing system into a form compatible with actual resources coupled to the call processing system. A further mechanism may be provided for correlating which logical resource object supports each capability within a set of capabilities that may be requested by the call processing system. In addition, a mechanism is provided for allocating a logical resource object that supports the specified capability.

The above-listed and other objectives, features and advantages of the present invention will be more fully set forth hereinafter.

BRIEF DESCRIPTION OF THE DRAWINGS

The present invention is further described in the detailed description which follows, by reference to the noted plurality of drawings, by way of non-limiting examples of preferred embodiments of the present invention, in which like reference numerals represent similar parts throughout the several views of the drawings, and wherein:

FIG. 27 is a diagram which represents a service provisioning system in relation to the parts of the platform carrying the service logic;

DETAILED DESCRIPTION OF THE EXAMPLE EMBODIMENTS

A. The Network Architecture

Figure 1:
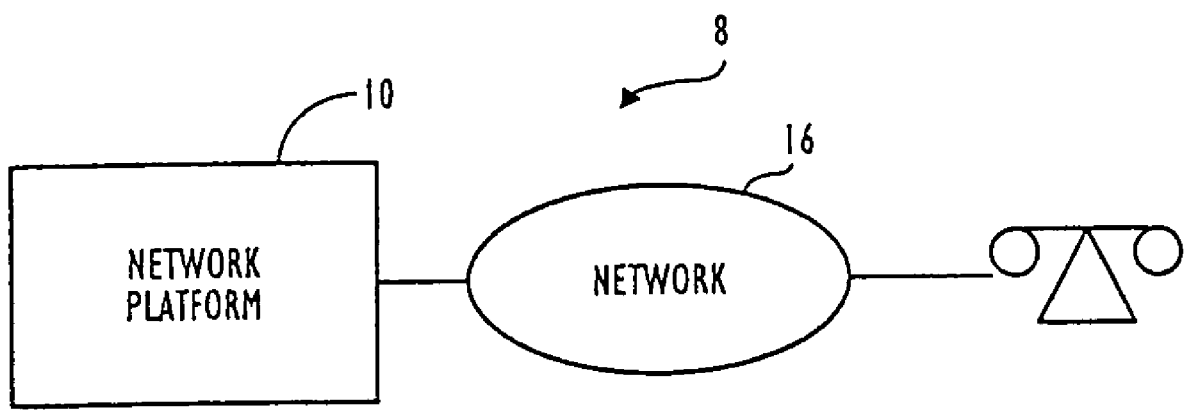
FIG. 1 illustrates an overall network view of a flexible network platform.

Referring to the drawings now in greater detail, FIG. 1 provides an overall network view of a flexible network platform 10. The flexible network platform 10 is connected to a telecommunications network 16. Together, flexible network platform 10 and network 16 form a communications system infrastructure 8. Flexible network platform 10 is the control component of communications system infrastructure 8. Flexible network platform 10 is provided with features which allow it to manage various aspects of the communications system infrastructure 8, such aspects including, e.g., switching, signalling, and assigning peripheral resources to implement advanced telecommunications services. Network platform 10 may comprise a universal information network (UIN) platform that provides not only voice-based personalized services, but also provides services dealing with different types of media information, including, e.g., data and video information. Network platform 10 is preferably capable of exchanging messages, as well as controlling the exchange of such messages, with the various nodes in network 16. Network platform 10 may be connected, either directly or indirectly, to one or more nodes provided within network 16. Network platform 10 also may be connected simultaneously to one or more nodes of another network separate and independent from network 16 illustrated in FIG. 1.

Network platform 10 will typically comprise several subsystems for performing functions including: call processing; database maintenance, control and management; service and user data provisioning; service creation; OAM&P (operations, administration, maintenance and provisioning); and network functions such as routing, translation and switching.

Figure 2:
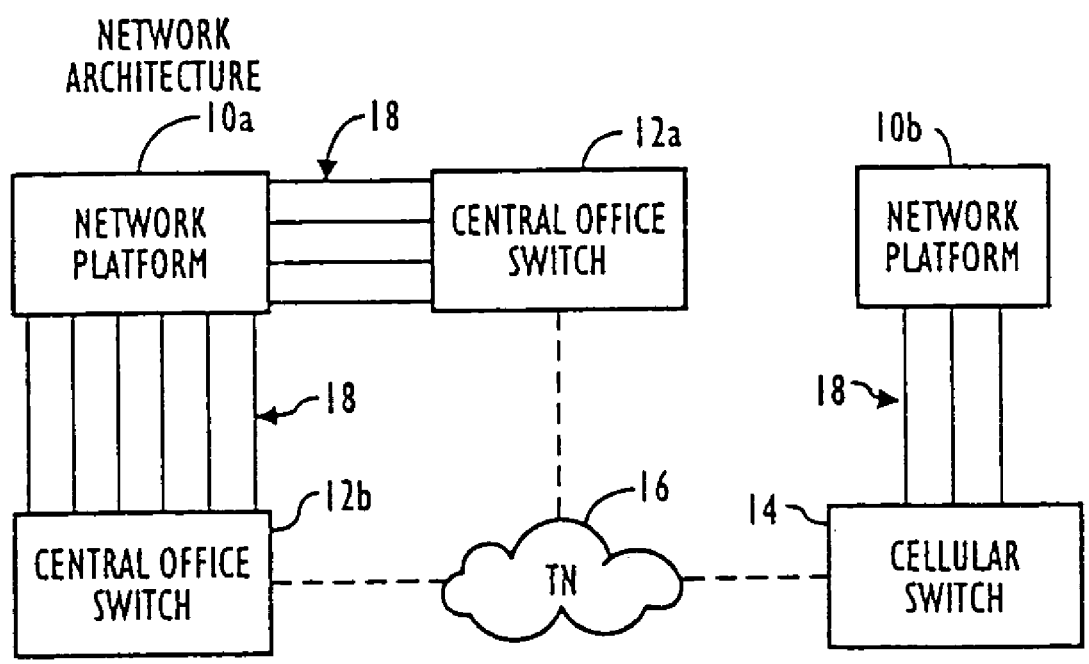
FIG. 2 illustrates a particular example of a network physical architecture within which a flexible network platform can be utilized.

FIG. 2 illustrates a particular example of a network physical architecture within which a flexible network platform, such as the one shown in FIG. 1, can be utilized. In the network physical architecture illustrated in this figure, two flexible network platforms 10a and 10b are provided. A first network -platform 10a is connected to two nodes of a telecommunications network, including first and second central office switches 12a, 12b. A second network platform 10b is connected to a node which comprises a cellular switch 14. Each of the nodes specifically shown in FIG. 2 is coupled to a telecommunications network 16 which may, e.g., provide a public switched telephone network (PSTN). Each of the network platforms 10a, 10b is connected to its respective network nodes (central office switches 12a, 12b, and cellular switch 14) via one or more communications links 18, which provide the necessary connection between each network platform and the network node to which it is connected. By way of example, such communications links 18 may comprise digital trunks and/or analog subscriber lines. The present invention does not place any limitation on the types of communications links that extend between network entities and network platform 10. The links can use various types of transmission media including, e.g., two-wire open lines, twisted pair lines, coaxial cable, optical fiber, satellites, terrestrial microwave, and radio transmission. Additionally, if physical lines are used, the types of lines used may be switched connections or permanent lines. The types of communication link protocols may also vary. The diagram shown in FIG. 2 shows a particular implementation of a flexible network platform 10 provided in accordance with the present invention. Other implementations and physical network architectures are possible. For example, signalling system 7 (SS7) nodes using the Transaction Capabilities Application Part (TCAP), and underlying protocols of the same, may be utilized.

Figure 3:
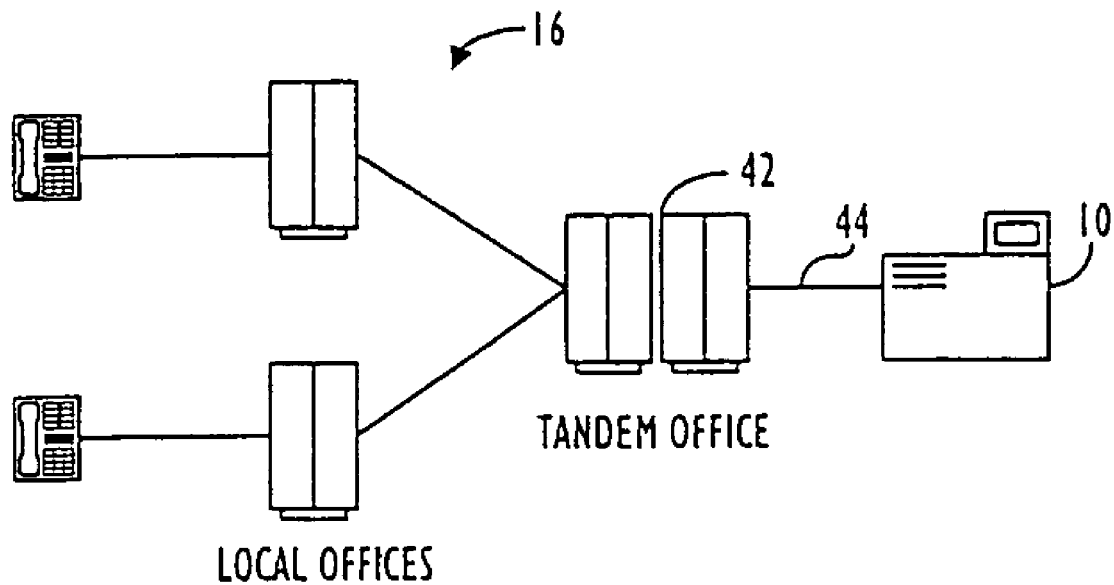
FIG. 3 illustrates a flexible network platform 10 which is connected to a telecommunications network 16 through an access tandem office 42.

In accordance with a particular aspect of the present invention, the flexible network platform 10 is loosely coupled to the network. This makes it possible to introduce new services or to customize existing services while modifying only a minimum number of nodes within the network. Rather than utilizing existing network switches to trigger calls to the platform via control messages (e.g., signalling system 7 (SS7)), flexible network platform 10 may be configured to terminate lines and trunks, and thus be capable of switching calls that require platform services to the platform. With this approach, there are several manners in which the flexible network platform may be placed within a telecommunications network. For example, the flexible network platform may be connected in the form of a tandem interconnection, a local exchange interconnection, and/or an off-network interconnection. FIG. 3 illustrates a tandem interconnection, and FIG. 4 illustrates a local exchange interconnection.

In FIG. 3, a flexible network platform 10 is connected to a telecommunications network 16 through an access tandem office 42, using standard trunk interfaces 44. For example, the standard trunk interfaces may comprise MF trunks. With this physical network architecture, platform services are available on an area-wide basis, e.g., a LATA-wide basis. In this configuration, the flexible network platform 10 is configured so that no subscriber lines terminate directly on the flexible network platform 10. Services may be "addressed" by dialed numbers (DNs) with a conventional dialing plan in accordance with a service access strategy which is further described below.

Figure 4:
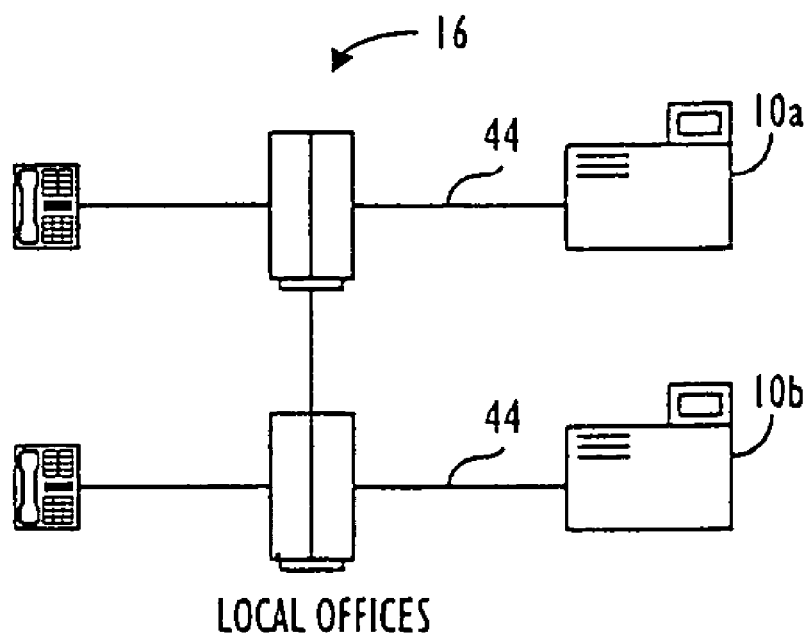
FIG. 4 illustrates a local exchange interconnection physical network architecture.

FIG. 4 illustrates a local exchange interconnection physical network architecture. With this architecture, each of a plurality of flexible network platforms 10a, 10b is connected to a respective node in telecommunications network 16, the node comprising a local exchange or office. The connection may be made via standard trunks 44. No subscriber lines are terminated directly to the flexible network platforms 10a, 10b. With this physical network architecture, there will be a slightly shorter call setup delay in Utilization of services provided by the flexible network platforms 10a, 10b. Such a configuration may be beneficial where the flexible network platforms are providing services only to customers which are based within the associated local exchanges. Difficulties may arise with this configuration in receiving automatic number identification (ANI) on terminating calls that are originating outside of the home local office, since existing trunk signalling to the local exchange does not normally carry ANI information.

Depending upon which services are provided by the flexible network platform, it may be desirable or even necessary to place the flexible network platform outside of the public network. The precise topology of the physical network architecture may vary and need not resemble either of the architectures shown in FIGS. 3 and 4.

In order for a call to have access to the services provided by the flexible network platform, a particular service access strategy may be utilized. In this regard, the services may be accessed by addressing the services with the use of dialed numbers (DNs), or, alternately, some other method of addressing. Subscribers may be terminated on the platform or may be hot-lined to the platform. In any event, it may be beneficial to provide some sort of direct user dialing to the platform in order to control calls. For example, direct user dialing to the platform may be facilitated via an integrated voice/data interface, where the data channel is used as a call control signalling channel between the user and the platform.

With the service access strategy utilizing dialing plan access DNs routed to the platform, it may have the ability to address certain components of the flexible network platform, such as a service (independent of a subscriber), a subscriber (providing access to an array of services provisioned for that subscriber), and/or a specific service for a specific subscriber.

By using a dialing plan service access strategy, services may be accessed using dialed numbers (DNs). More particularly, originating services (which are services provided on behalf of the caller) may be accessed by DNs; and terminating services (i.e., services provided on behalf of the called party) may be accessed by DNs. In this regard, the service subscriber's advertised DN routes directly to the flexible network platform 10 and the addressed service is performed by the flexible network platform on behalf of the terminating party. Terminating services (i.e., services performed on behalf of the terminating/called party) may also be accessed by call forwarding to the platform from the service subscriber's normal DN.

The special triggering capabilities of the Network Access Point (NAP) defined in the AIN architecture could be utilized to provide screening functions prior to routing calls to the platform. By providing this feature, the flexible network platform may efficiently provide additional originating screening services.

There is a wide array of physical layer interface standards which may be utilized by the flexible network platform in communicating with its associated telecommunications network. By way of example, the physical layer interface standard utilized may comprise standard digital trunks using MF signalling, signalling system 7, and/or ISDN PRI (primary rate ISDN).

B. Platform Hardware Architecture

Figure 5:
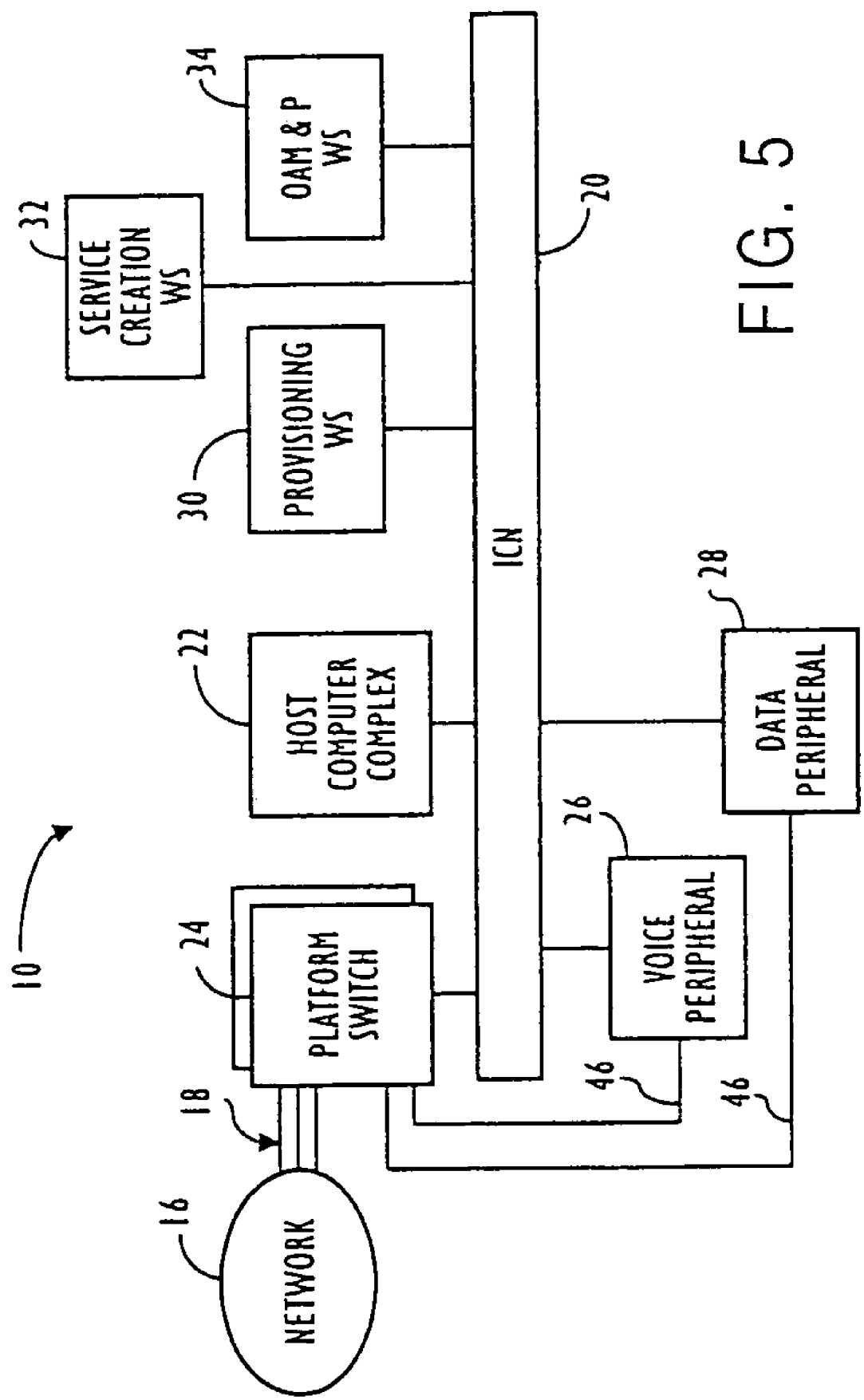
FIG. 5 is a block diagram illustrating a particular example of the hardware architecture that forms a flexible network platform.

FIG. 5 is a block diagram which illustrates a particular example of the hardware architecture which may be utilized to form a flexible network platform in accordance with the present invention. A host computer complex 22 is coupled to a number of other devices via an interconnection network 20. Data devices include a platform switch 24, a plurality of peripherals (including a voice peripheral 26 and a data peripheral 28), and several work stations. The several work stations may include a provisioning work station 30, a service creation work station 32, and an OAM&P work station 34. The interconnection network (ICN) 20 forms a control path between host computer complex 22 and each of the various devices to which it is connected. Each peripheral that is provided in the platform, including, e.g., voice peripheral 26 and data peripheral 28, is shown as being connected to a platform switch 24 via a voice/data path 46, so that any voice, data, or other needed information may be routed to the telecommunications network via the platform switch. Host computer complex 22 has the primary duty of performing call processing functions and executing services in connection with such call processing. Host computer complex 22 calls upon the various peripherals such as the voice peripheral 26 and data peripheral 28 along with the platform switch 24 in order to execute the appropriate services. Provisioning work station 30 may be provided in order to allow entry, retrieval, review and editing of service data as it pertains to the subscribers of the various platform services. Service creation work station 32 may be provided to allow the creation and modification of services delivered to host computer complex 22. OAM&P work station 34 may provide a user interface through which persons can monitor the performance of the components of the flexible network platform. It provides a unified view of the platform's behavior and a common point of control over its operation. Flexible network platform 10 is connected to telecommunications network 16 via communication link 18, which are coupled to platform switch 24.

Platform switch 24, host computer complex 22, and peripheral processing units 26 and 28 together form a core platform system which controls the performance of services. While particular peripheral processing units are illustrated in FIG. 5, including a voice peripheral 26 and a data peripheral 28, other types of peripheral processing units may be provided depending upon the type of functions to be performed by the network platform. In addition, the flexible network platform 10 may include more than one platform switch in order to increase the capacity of switching for the overall network platform 10. In the alternative, other variations may be made to the hardware architecture of the flexible network platform 10, as long as the general functionality of each component remains in the hardware architecture. For example, host computer complex 22 may be expanded to have a platform switch integrally provided therein, and to include an interconnection network facility for coupling the host computer complex to the other components of the overall flexible network platform 10.

By way of example, host computer complex 22 may be implemented with the use of a dual SPARC 20 host computer. Platform switch 24 may comprise, e.g., a SUMMA SDS-1000 switch. That switch has limited functionality to connect/disconnect link channels and to perform signalling interface processing. ICN 20 may comprise an Ethernet network and/or may be capable of transmitting information using the Internet TCP/IP protocol. Voice processing unit 26 may comprise a dialogic board provided within a PC running appropriate voice processing software that interfaces with the board. Each of the provisioning 30, service creation 32, and OAM&P 34 environments may be implemented with software in a different work station computer, or may be all run on the same computer system with a user interface for switching between the various environments.

Figure 6:
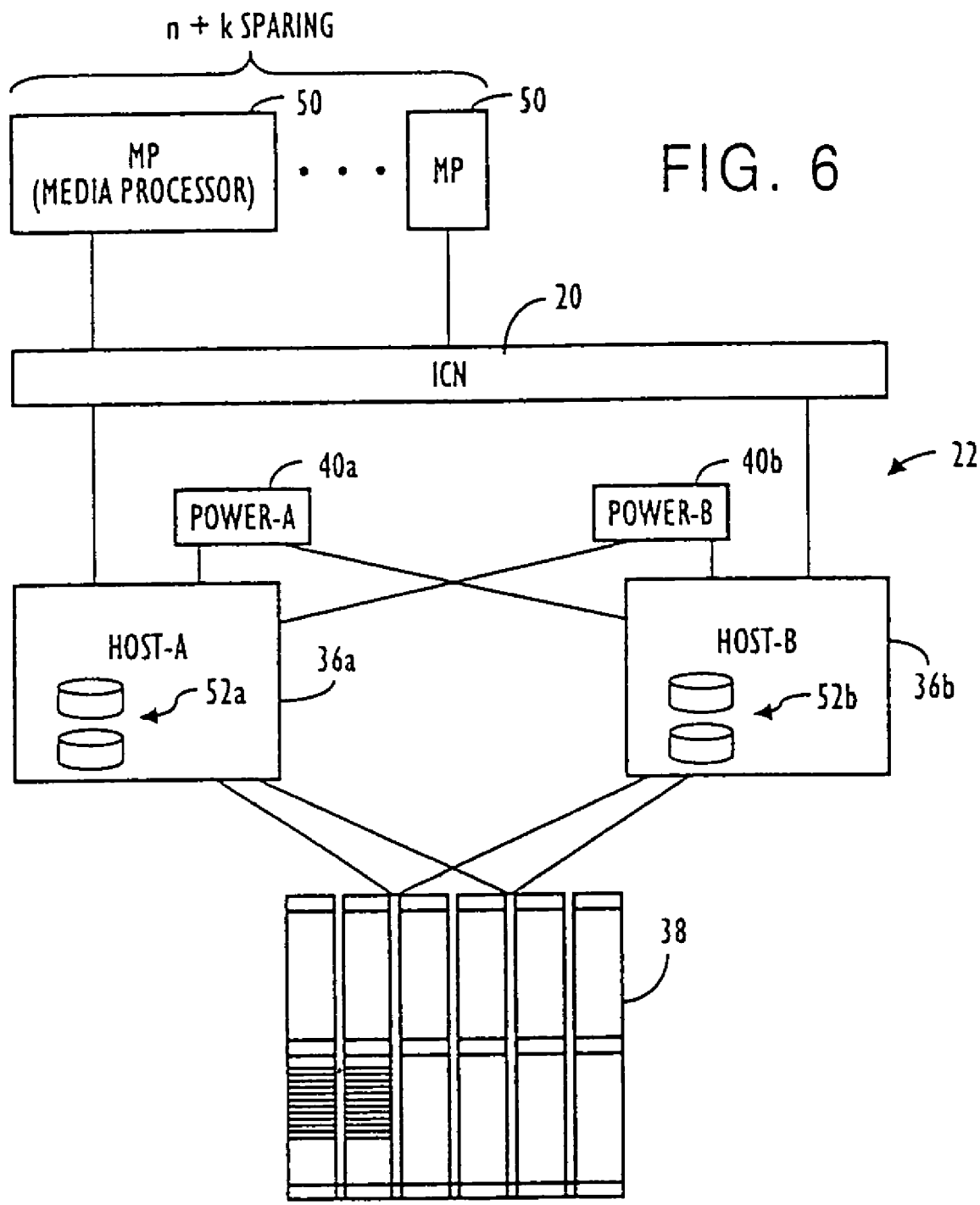
FIG. 6 is a block diagram which illustrates an example embodiment of the host computer complex.

FIG. 6 is a block diagram of an example embodiment of the host computer complex 22 shown in FIG. 5. Host computer complex 22 is shown together with interconnection network 22 and a plurality of (n+k) media processors 50. Each of the media processors 50 is connected to interconnection network (ICN) 20. Host computer complex 22 comprises two host computers, including host-A 36a and host-B 36b, as well as two power supplies including power supply A 40a and power supply B 40b. Each of the power supplies 40a, 40b is connected to each of the host computers 36a, 36b. Each of the host computers 36a, 36b is connected to a dual-ported RAID array 38.

The hardware architecture of the flexible network platform provided in the present invention preferably is equipped so as to maintain system reliability. In this regard, the host computer complex 22 may be configured that it supports open system interfaces, such as UNIX, or communicates with UNIX via Ethernet or TCP-IP protocol. In addition, reliability may be further ensured by the use of redundancy in the hardware architecture. In this regard, various hardware components may be replicated. For example, as shown in FIG. 6, more media processors 50 are provided than necessary; whereas only "n" media processors may be needed at a particular time, an additional number "k" is provided, thus utilizing "n+k" sparing in order to ensure the reliable use of media processors 50. Other redundancies of the hardware architecture include the use of two separate host computers, a first host computer 36a being the hot or active host computer, while the other host computer 36b is in a warm standby state. In addition, two separate power supplies 40a and 40b are provided, and each may be used for either one of the host computers 36a, 36b, in order to provide the necessary redundancy in the event that one of the power supplies fails to operate properly. Another example of reliability achieved by redundancy in the hardware is the use of a dual-ported RAID array 38. In the event that one of the ports of RAID array 38 fails, either host 36a, 36b may use the other port. Other inherently fault tolerance hardware may be utilized. For example, a switch such as the SUMMA 4 switch may be provided which is inherently fault tolerant. The interconnection network 20 may be provided with multiple links between the various devices in order to protect against link failure.

Depending upon the particular environment of the flexible network platform, a NEBS-compliant (Network Equipment Building Standard) physical hardware architecture may be employed in order to implement the platform. This may be required, e.g., if the flexible network platform is going to be employed in a central office environment.

With reference to the example embodiment shown in FIG. 6, it is noted that the dual-ported RAID array 38 may comprise a RAID array provided by Array Technologies. Each of the host computers may, e.g., be implemented with the use of a SPARC 20 host computer. It is noted that reliability concerns revolve around two main issues, including hardware failure and data protection. With regards to data protection, a complete set of the data of the flexible network platform is duplicated within the RAID array 38. Additionally, the set of data is duplicated within the RAM of each host computer 36a, 36b, as represented by mirrored system disks 52a, 52b, as shown in FIG. 6.

In connection with the redundant hardware architecture of the flexible network platform, e.g., as illustrated in FIG. 6, several software mechanisms may be provided in order to assure the proper operation of the various redundant systems. For example, a software mechanism can be provided within the software system of each host computer in order to ensure that only one host computer can access data from the mirrored systems disk 52 at a particular time. In addition, interconnection network 20 may be provided with a dual connectivity to the various software entities within each host computer. Thus, if a link to a particular software module or entity fails, the system allows for a reconnection with another link within interconnection network 20. Additionally, the software within each host computer may be provided with a mechanism for detecting the failure of a media processor (or other peripheral processing units connected to the system) for taking the processor out of service. The mechanism would then accordingly reroute traffic to another media processor which is properly functioning. When the media processor is repaired, it is then in a state for reintegration with the system. A mechanism may be provided for detecting the change of state of the media processor so that media processor will then be available for use the next time a capability is requested by the call processing software that calls upon use of that media processor.

In the event a host is still processing but cannot process calls, a switchover mechanism may be utilized, which may be triggered with the use of OAM&P work station 34 as shown in FIG. 5. The switchover mechanism will notify the other properly functioning host 36b that it is to become the primary host, and then cause the first host computer 36a to terminate its execution. It will further take steps to ensure that the first host computer 36a will not come back as the primary access host computer.

In addition, a mechanism may be provided, in connection with the OAM&P architecture hierarchy, or other appropriate software, to monitor for failure of the non-active host, e.g., the second host computer 36b. If failure is detected, the non-active host will then be shut down and fixed. The switchover mechanism may be implemented by what is called "fail over software" provided within the platform system.

Data protection is another significant issue that will affect the reliability of the platform system. In accordance with a particular embodiment of the present invention, the database of the platform may be stored in an ORACLE database, e.g., a system 7 ORACLE database or other versions thereof. The types of data that may be stored in the database include service data which is provided on a per-user basis, system data (including information such as which media processors are connected to the platform at a particular time), and service logic (in the form of service logic units (SLUs)). The ORACLE system has a transaction mechanism which prevents the corruption of data when it is being placed into the database. When a particular unit of data is being forwarded to the database, either all of the data goes in, or none goes in.

In order to protect the data, another process that may be performed is the periodic backing up of data in the system so that the backup data can be used in the event of data corruption. If there is a breakdown or corruption of data, the uncorrupted data which is stored in a backup storage may be used.

C. The Platform Software Architecture

Figure 7:
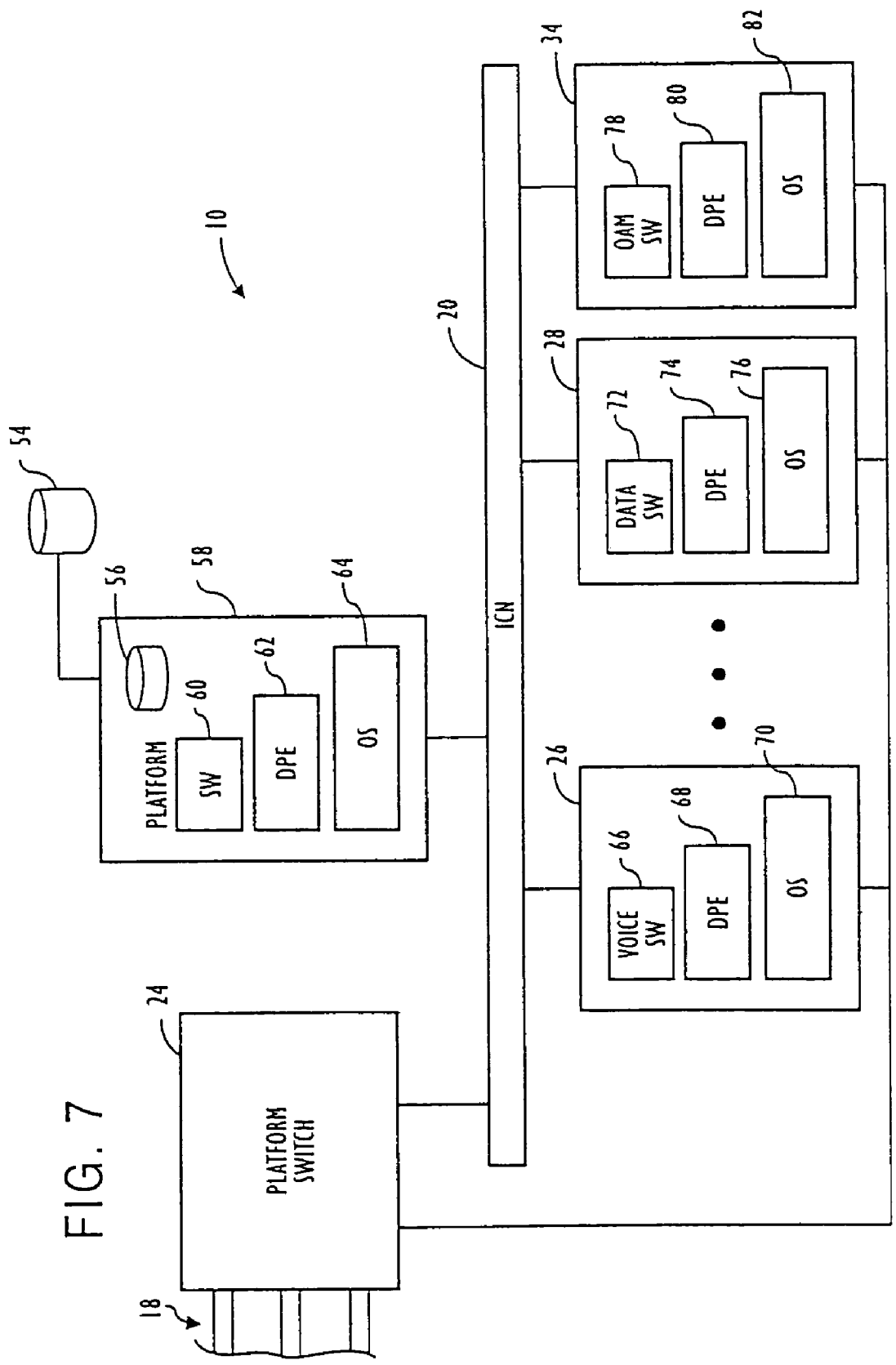
FIG. 7 is a block diagram representing a platform software architecture in relation to the platform hardware architecture of FIG. 5.

FIG. 7 is a block diagram which provides a software view of an exemplary flexible network platform 10. The main elements depicted in FIG. 7 include platform switch 24, host 58, ICN 20, voice and data peripherals 26, 28, and OAM work station 34. An outboard database 54, which may be in the form of disk storage, is coupled to the platform host 58. A resident database 56 is maintained within the RAM of host 58, and the data within the resident database corresponds precisely with that of the outboard database. On the software level, platform host 58 includes platform software 60, a distributed process environment 62, and operation system software 64. Similarly, voice processing unit 26 comprises voice software 66, a distributed processing environment 68, and operating system software 70. Data processing unit 28 comprises data software 72, a distributed processing environment 74, and operating system software 76. OAM work station 34 comprises OAM software 78, a distributed processing environment 80, and operating system software 82.

The software architecture of the system illustrated in FIG. 7 contributes to the open nature of the overall system. The database, which resides in the resident database 56 as well as outboard database 54, may comprise a relational database. It may utilize systems such as the ORACLE or SYBASE relational database systems. The distributed processing environment provided within each of the computing devices of the platform 10 may be implemented using ISIS. The distributed processing environment is provided in order to simplify building of distributed applications. ISIS provides this function and provides a standard extension to UNIX; and thus allows for multi-threading within a process. The operating system 64 of the platform host 58 preferably comprises an operating system which is somewhat vendor-independent in its compatibility with other software and hardware systems. A UNIX system V operating system may be utilized for this purpose. A distributed processing environment is also provided within each of the peripherals 26, 28 and 34, which are connected to ICN 20. The distributed processing environment 58, 74, and 80 provided within each of those respective peripherals may also be implemented with ISIS.

C.1 The Run-Time Environment

The run-time system may be defined as all application and hardware independent functionalities within the platform software that is necessary to execute the applications of the flexible network platform. Many of these requirements are commercially available for a general purpose computing operating system such as UNIX.

Because of the need for high throughput of the flexible network platform, it may be necessary to process multiple requests concurrently. This concurrent execution of requests may require the use of priority scheduling.

The run-time environment preferably uses a multi-processing environment so that tasks may be handled concurrently. That is, processes (operating system abstractions/units of concurrency) are run concurrently and thereby simultaneously handle various tasks. Some example tasks to be implemented or performed by separate processes may include call processing related to the call processing stack; OAM data collection/presentation; communication between various hardware elements; arbitration between active and standby hosts; and logging of events and measurements.

C.1.a The Database

Figure 9:
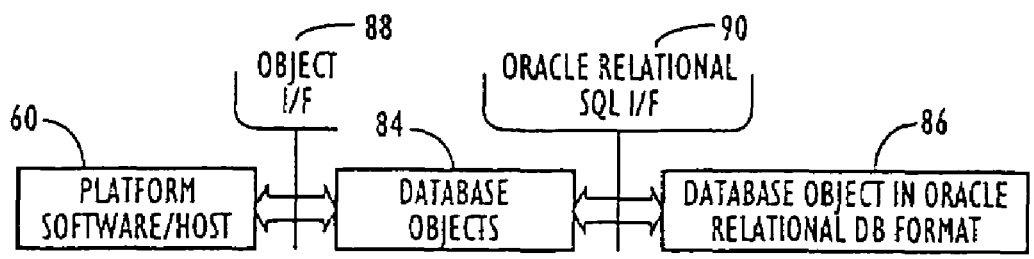
FIG. 9 illustrates a data transformation process which may be performed between a flexible network platform and a database.

FIG. 9 illustrates a data transformation process that may be performed by the flexible network platform according to the present invention. The particular transformation process shown is an exemplary embodiment. Data that is utilized by the platform software 60 is transformed into database objects 84 through the use of an object interface 88. By creating database objects 84, the data may be stored and later retrieved, thus allowing persistence of the data. The database objects are then transformed via an ORACLE relational SQL interface 90 into database objects in an ORACLE relational database format 86. When the host system is initialized, all database objects are obtained from an outboard database storage. The data being stored in the database includes user data, service logic, and service data. A background function may be provided within platform software 60, so that whenever a change is made to a database object 84, within resident database 56, that same change is written (i.e., persisted) in outboard database storage 54.

C.1.b Distributed Operating System Environment

In accordance with one particular feature of the present invention, the platform may be implemented with the use of a distributed operating system environment. The distributed connected to a platform switch 98. Platform switch 98 is connected to a telecommunications network 16.

The top two layers of the three-layered body of call processing software, including application layer 100 and resource layer 102, form a call processing stack, otherwise referred to as a call stack. Among the various functions performed by each of these layers, call processing application layer 100 represents each active call by allocating a number of call processing objects, including a session object 106, and a number of leg objects 108a, 108b. A leg object is allocated for and represents each party to the call corresponding to the session object 106. Each leg passes commands and reports between the resource layer 102 and application layer 100, and manages various aspects of a virtual terminal which resides within resource layer 102.

Resource layer 102 contains several objects including logical resource objects 110a, 110b, channels 112a, 112b, and virtual terminals (VTs) 114a, 114b. A logical resource object 110 corresponds to each resource type and is assigned for each resource capability that is to be called upon by the application layer as it executes its service logic. The logical resource objects (otherwise referred to as the LRs) serve to hide the details of the device-specific commands and reports which are generated by the resources themselves and forwarded by the link layer 104 to the resource layer 102 and application layer 100.

A channel object 112 is provided and is formed by a collection of logical resources. Each channel object 112 is associated with a single communications path that is presently connected to platform 10. Channels 112 manage the allocation and release of logical resource objects 110. They also send commands from the higher layers to the logical resources which are provided with the facilities to respond to those commands. connected to a platform switch 98. Platform switch 98 is connected to a telecommunications network 16.

The top two layers of the three-layered body of call processing software, including application layer 100 and resource layer 102, form a call processing stack, otherwise referred to as a call stack. Among the various functions performed by each of these layers, call processing application layer 100 represents each active call by allocation a number of call processing objects, including a session object 106, and a number of leg objects 108a, 108b. A leg object is allocated for and represents each party to the call corresponding to the session object 106. Each leg passes commands and reports between the resource layer 102 and application layer 100, and manages various aspects of a virtual terminal which resides within resource layer 102.

Resource layer 102 contains several objects including logical resource objects 110a, 110b, channels 112a, 112b, and virtual terminals (VTs) 114a, 114b. A logical resource object 110 corresponds to each resource type and is assigned for each resource capability that is to be called upon by the application layer as it executes its service logic. The logical resource objects (otherwise referred to as the LRs) serve to hide the details of the device-specific commands and reports which are generated by the resources themselves and forwarded by the link layer 104 to the resource layer 102 and application layer 100.

A channel object 112 is provided and is formed by a collection of logical resources. Each channel object 112 is associated with a single communications path that is presently connected to platform 10. Channels 112 manage the allocation and release of logical resource objects 110. They also send commands from the higher layers to the logical resources which are provided with the facilities to respond to those commands. A virtual terminal (VT) 114 is formed by a set of one or more channels 112. VTs 114 manage the allocation and release of channels. Taken together, logical resources 110, channels 112, and virtual terminals 114 isolate objects in application layer 100 so that application layer 100 does not have to concern itself with the details of hardware allocation, deallocation, and control. This isolation serves to greatly simplify service programming and minimizes the chance that existing services will be affected when hardware changes are made.

Each session 106 contains a number of event manager objects 116. One event manager object 116 is provided for each type of event session 106 might expect to receive. Events are typically received via legs 108, and handled by an event handler object. Each event manager 116 contains a list of event handler objects 118 set aside to handle unique events.

A session 106 represents a particular active call being processed by the call processing stack. The session 106 groups all event types that it may encounter for the particular active call which it represents. Each event type is represented by an event manager 116 provided within session 106. Each event manager 116 points to event handlers 118 within a list of event handlers, and identifies each event handler in accordance with a reference channel and a reference leg, i.e., in accordance with a reference communication path and a particular party to the active call. The event manager also responds to a request to execute a particular event handler corresponding to a particular event, and calls an ev method within that event handler. Each of the event handlers, located within the list of event handlers 118, performs several functions in executing its ev method. The ev method is a common procedure shared among all of the event handlers, which extracts information from scratch variables provided within the event handler object, performs several functions and starts an SLU (service logic unit) that is associated with a particular event handler. The service logic unit associated with that particular event handler is referred to in one of the scratch variables, and was specified by the call components that originally created that particular event handler. Once the event handler begins executing its ev method, it interprets the SLU, thereby executing the SLU. The event handler object interprets the SLU in a threaded interpretative manner. Each SLU is made up of a plurality of application components. Each application component is identified within an SLU by data which will persist in a database of the flexible network platform. Each application component of an SLU is executed by way of the ev method within the event handler object.

The event handler object will not again be used once it is assigned a particular service logic unit and begins execution of the same. Thus, if the same event is expected at another point during execution of a service, a different event handler will be created to handle that event, even if the reference leg and reference channel corresponding to the event are the same as those for a previous event handler object. This allows the call processing software to assign, for each and every event that is expected to occur, a separate, independent (and potentially different) service logic unit for interpretive execution by the event handler.

While an event handler is dropped once its service logic unit is executed, the corresponding event manager for each event type provided for within the session object need not be dropped.

When an event handler object is created, e.g., by a leg object or by an application component (during execution of an SLU), the creator of the event handler object communicates with the session object 106, and instructs the session object to register this event handler for this event type. The session will then check to see if there is already an event manager (EM) existing for that event type. If there is an EM already existing for that event type, the session object will instruct the event manager to register the event handler object. The event manager registers the event handler object in accordance with the event handler object's reference channel and reference leg.

Each of the SLUs may be identified by a unique non-zero positive integer, and may be specified as such in one of the variables of each event handler object, so that the event handler object will cause execution of that particular SLU. All event handlers which have completed their interpretation of an SLU are detached from their associated session and destroyed. New event handler objects are created, e.g., by a leg, during some portion of a call setup, or by an application component either during a call setup or during execution of a service. By way of example, if a programming language such as C++ is utilized to create the software that forms the call stack, the various objects, including the event handler objects, may be created by calling a constructor.

When an event occurs, it is reported to the session. If an event occurs and it is an external event, it is reported to the session via the various call components within the resource layer 102, i.e., via a logical resource 110, its associated channel 112, and its associated virtual terminal 114. Virtual terminal 114 then reports the event to session 106 via its associated leg 108. Session 106 will then take the particular event, along with its reference leg and reference channel information, and pass the same to the appropriate event manager 116 for that event type. The event manager 116 will then use the reference leg and reference channel information to find the particular event handler that is supposed to handle that particular event. The event manager then tells the event handler to start execution of its ev method.

Figure 8:
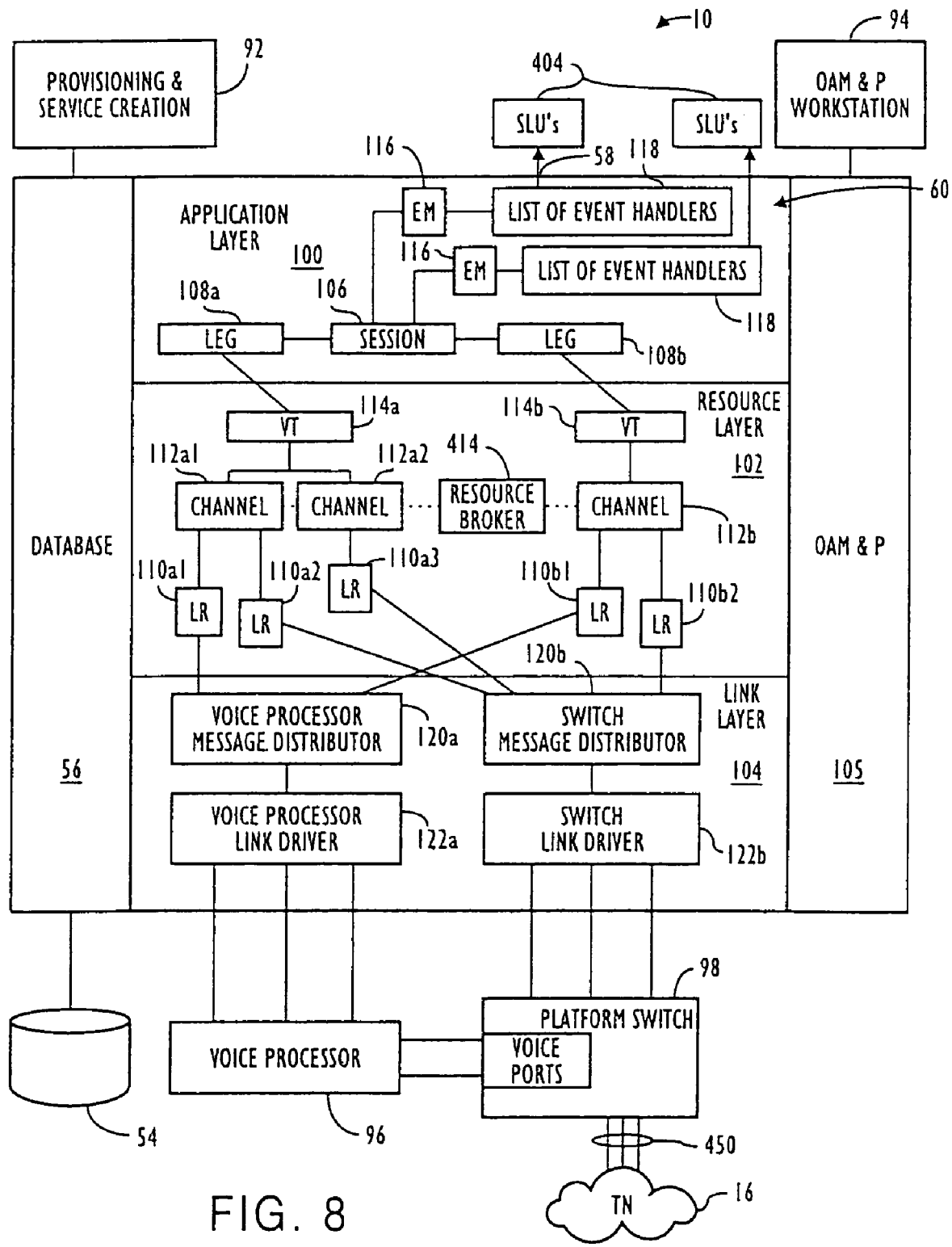
FIG. 8 illustrates a particular embodiment of platform call processing architecture in relationship to the rest of a flexible network platform.

A link layer 104 is also depicted in FIG. 8 and includes a plurality of message distributors 120, including a voice processing message distributor 120a and a switch message distributor 120b, as well as a plurality of link drivers (including a voice processor link driver 122a and a switch link driver 122*b*). Link drivers 122 may perform standard device driver functions in accordance with software that is typically provided by the vendors of the resources coupled to the platform. The message distributor may comprise a set of objects provided to facilitate communication between the resources and the higher level software. Each message distributor takes messages and either creates an object to handle the message or sends the message to an existing object. The information from that object will then be handled by the appropriate logical resource and will be forwarded up to the session via the appropriate call components within the resource layer and application layer. For outgoing information, the message distributor will transfer messages from logical resources to the appropriate resources via link drivers 122.

D. The Application Layer

With respect to a given call, a set of objects is allocated within application layer 100 to represent the call itself and the parties involved. That set of objects will include a session object 106, at least one leg object 108, at least one event manager object 116, a list of event handler objects 118, and various application components (AC). Session 106 forms the central object in application layer 100. A session 106 is an object to which all legs 108 to the call attach themselves, and each leg 108 attached is controlled by the session 106. The session 106 also dispenses information regarding events, from the resource layer 102, through a leg 108, to an event handler object 118 assigned to respond to that event occurrence. Simply stated, the session 106 is an object that represents the active call and the legs 108 are objects that represent the various parties to any given session 106. The leg object 108 manages information about the party represented and also controls and manages a virtual terminal object 114 associated in the resource layer 102.

Each session 106 contains a leg list 511 (shown in FIG. 20), which keeps track of the identity of legs 108 associated with a particular session 106. The session 106 also contains an event manager object 116. An event manager 116 is an object in the session 106 that contains the identification of all event handlers 118 for the session 106 and all anticipated events that may possibly occur at any given point during a session. To maintain order, event managers 116 are provided and each event manager handles all events of a given type. The event handler 118 is an object associated with a particular event within event manager 116 that waits for a particular predetermined event to occur, e.g., an external origination event on a predetermined reference channel and reference leg.

If such a predetermined event occurs, the event handler 118 is commanded to start executing a specific service logic unit (SLU or service unit) 404. A service logic unit 404 is a body of logic within the resident database 56 that will be executed upon the occurrence of an event. Conversely, an event is an occurrence during a call that causes the execution of a service logic unit 404. Events are known, predetermined, and anticipated by the session 106. Each event is identified as having a particular reference leg and reference channel. An event can either be an external event or an internal event. An external event is an event generated in telecommunications network 16 external to platform 10. An internal event is an event which is generated by platform software 60. Some examples of external events are: receiving a disconnect signal from the network; failing to receive an answer signal from the network; and an origination signal (trunk seizure) from the network. Some examples of internal events are: offering a connection; and internally instructing a disconnect.

When an event occurs, and the occurrence is communicated to session object 106, session 106 then passes the event along with information identifying the event to an appropriate event manager object 116 which will determine which event handler corresponds to the event that has just occurred. Once event manager 116 has identified the specific event handler 118 that corresponds to the event, event manager 116 will then pass the event to those event handlers 118 related to the identified event (of which there may be one, many or no such event handlers). Each event handler 118 that receives an event will then execute its designated service logic unit 404, which is a body of logic made up of a plurality of instructions known as application components (ACs). Service logic units 404 are stored in the flexible platform system as unique, non-zero, positive integers, for example, the default originating service is stored as ID 100, pending connection/disconnect is stored as ID 1004, etc. In addition to AC's, service logic units 404 may contain scratch variables 501 (shown in FIG. 20) that are assigned values either to serve as memory and register space, or to perform calculations and store data, depending upon the particular requirements of the designated AC. Following execution of a first AC in a particular SLU, event handler 118 will then execute the next AC in the service logic unit until all ACs have been executed. An AC is executed in application layer 100 until a command, e.g., proceedToNext, is encountered. When proceedToNext is encountered, the event handler object 118 is notified of the completion of execution of the current AC, sets its pointer on the next AC in the service unit being run, and executes.

The service programs are written and designed, in general, to support telecommunications applications. A service logic unit comprises a plurality of application components with zero-to-plural associated parameters. A service logic unit is essentially a collection of precompiled routines executed upon the occurrence of some predetermined triggering event. The use of SLU's increases the flexibility of the system software without significantly sacrificing processing speed. Service Logic Units 404 may be written, for example, in an application-oriented language, using a preprocessor similar to the C preprocessor. Such an application oriented language may be created which enables simple flexibility without undue complexity. The service creation language may be provided with statements that may be introduced with minimal effort, giving the service programmer access to additional system capabilities as they become available (e.g., voice recognition). This could be done by preventing programming statements from altering the behavior of existing language statements; thus, services which do not require the new capabilities continue to run without change.

A service, one or more SLU's 404 executed cooperatively to provide a set of communications capabilities, is delivered as a single package, and is executed in an asynchronous environment. That is, events occur at arbitrary times and the service logic 404 must be prepared to handle these events without errors, no matter when they occur. Since asynchronous applications are typically more difficult to develop than synchronous ones because of the inability to anticipate when events might occur, the application-oriented language hides this asynchronism within individual language statements. The service programmer may thus write in a sequential programming style, the language ensuring that all relevant synchronous events are handled correctly. This is a considerable simplification for service development.

Service programs executed within the application layer are executed in a threaded interpretive mode. Thus, service programs and their data both appear as data to the application layer 100. This allows services to be modified and/or added through standard data interfaces without the need to recompile or even halt the system. While typical interpretative systems must sacrifice speed of execution for flexibility, the flexible platform of the present invention pays a very small price in speed of execution for the flexibility gained by interpretation of the SLUs. The threaded interpretative mode is employed so that the service program controls execution of a series of compiled modules, application components, which are executed at compiled speed. The sequences of precompiled machine code are what is actually executed giving excellent performance results.

As previously noted, the flexible platform has been designed to maintain flexibility, and therefore, the call stack does not assume a call model, i.e., a template into which service logic must fit, in contradistinction to other call processing systems. The call stack allows any piece of service logic to be associated with any event. The service logic associated with an event can be changed even while a service is running, thus altering the way in which a service responds to that event.

Instead of a call model, the flexible platform employs generic call components, software objects used to represent the dynamic state of calls. These generic call components have defined relationships to each other so as to ensure a degree of consistency in the execution of services programs. Service logic units may be easily shared and released, and may freely interact with each other. Referring to FIG. 8, the generic call components provided in the exemplary embodiment include session objects 106, leg objects 108, virtual terminals (VTs) objects 114, channel objects 112, the virtual user (VU) objects (not shown). The session objects 106 and leg objects 108 have heretofore been discussed in detail, the virtual terminal 114 objects and channel objects 112 will be discussed with regard to the resource layer below.

E. The Resource Layer

Resource layer 102 comprises one arrangement of objects which manages the connection of paths and resources to generic call components that are within application layer 100. The arrangement of objects within resource layer 100 comprises virtual terminals 114, channels 112, and logical resources 110. A virtual terminal 114 is provided for each leg object 108; thus, a virtual terminal-leg object pair is provided to represent each party to a call (which is represented by session 106). Each virtual terminal 114 manages a set of channels 112 for its corresponding leg 108, and passes messages between each of its channels 112 and its corresponding leg 108.

One or more channels 112 may be assigned to a VT 114, whereby each channel 112 represents a particular path of communications to a party to the present active call represented by session 106. Each channel 112 manages a set of logical resources 110 associated with a particular path. Each particular set of logical resources will include at least one logical resource representing the path, which may be, e.g., a voice path established through platform switch 98. Each channel 112 manages a plurality of logical resources 110, but each logical resource 110 is associated with only one channel 112. However, a single resource may be associated with a plurality of channels as long as a separate LR represents each association with a channel.

Logical resources 110 translate commands from the higher layer objects 106, 108, 114, 112 into physical resource commands understandable by the respective resources they represent. Logical resources 110 also translate reports from the resources represented into calls to the higher layer objects 106, 108, 114, 112.

In addition to these generic call components (including VTs, channels, and LRs), resource layer 102 also includes a resource broker 414 which keeps track of resource types supported by logical resources 110. If a particular resource type is needed on a particular channel 112 in order to provide a resource capability needed for a service, broker 414 will determine whether a logical resource 110 has already been allocated to the particular channel 112 or whether it should be allocated by monitoring the logical resources 110 managed by the channel 112 and determining whether the existing logical resources 110 can accommodate the requested capability.

E.1 Resource Management

Resource layer 102 manages resources by isolating the service logic within application layer 100 from the complexities of resource allocation and deallocation. In order to accomplish this, techniques are used for classifying a resource according to its capabilities, together with mechanisms that use those classifications to present application layer 100 with a view of its platform resources based upon the capabilities of (i.e. the functions performed by) the resources, rather than what specific type of equipment is used to provide a capability. In addition, techniques are used for encapsulating the allocation and deallocation of resources to present application layer 100 with a common, simplified view of the allocation/deallocation process in order to reduce the duplication of code and increase the reliability of the application layer software.

As generally stated above, a logical resource 110 is an object that represents a resource. In creating resource layer 102, a logical resource class may be defined for each generic category of resources that might be connected to platform 10. From each generic category, subclasses may be defined that represent different vendors' implementations of that generic class of resource.

Figure 10A:
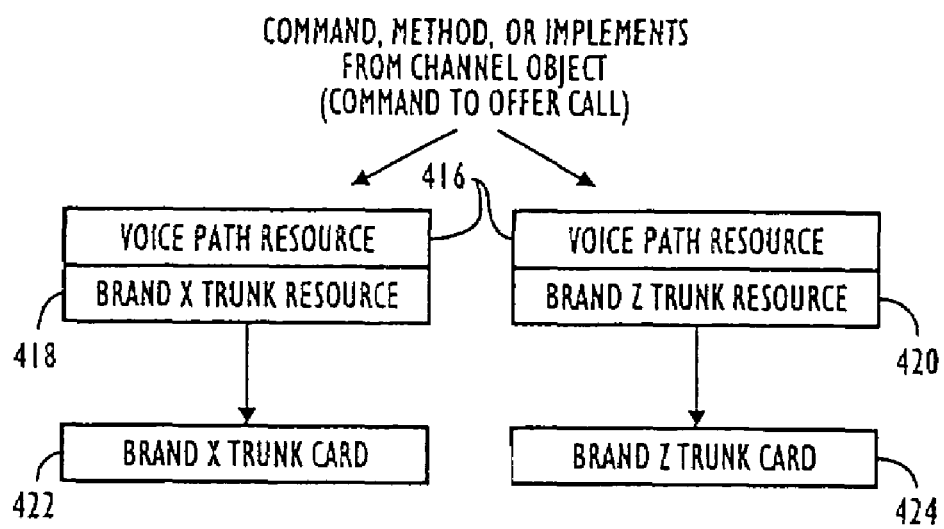
FIG. 10A is a block diagram representing a resource translation of generic commands into device-specific commands.

FIG. 10A is a block diagram representing, by way of example, a resource translation of generic commands into device-specific commands. As shown in FIG. 10A, an LR class 416 is defined for a particular generic category of resource in platform 10, i.e., a voice path resource class. From a generic resource class 416, subclasses 418, 420 may be derived representing different vendors' implementations of the resource class. More particularly, in the specific example shown in FIG. 10A a brand X trunk LR 418 and a brand Z trunk LR 420 may each be defined as a subclass of a trunk LR class 416. Trunk LR class 416 may define a method for offering a call. When that method is called in a brand X trunk LR object 418, brand X commands are sent to a corresponding brand X trunk card 422. When the method is called in a brand Z trunk LR object 420, brand Z commands are sent to the corresponding brand Z trunk card 424. The service processing software that calls the method however, sees no difference in the two subclasses because both trunk LR's 418, 420 invoke the same generic method in trunk LR class 416.

Figure 10B:
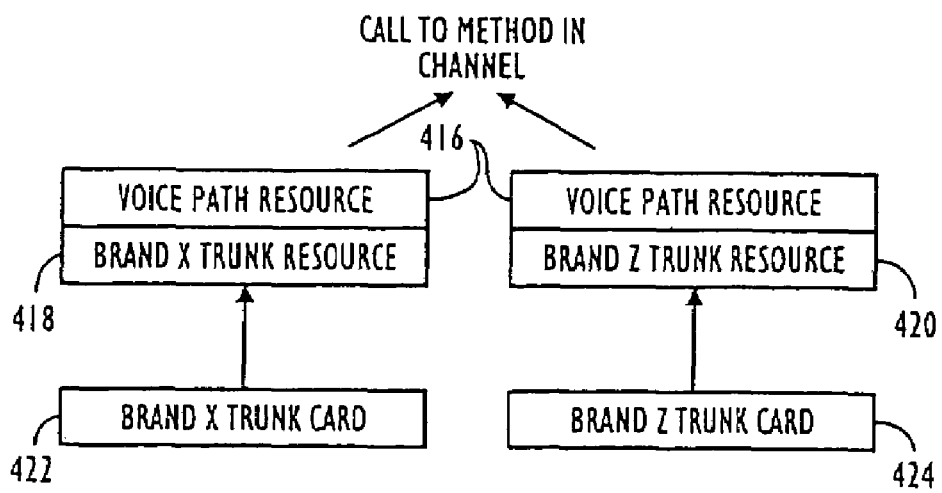
FIG. 10B is a block diagram demonstrating a resource translation of device-specific reports into generic reports.

FIG. 10B is a block diagram which demonstrates a resource translation of device-specific reports into generic class reports. This figure shows how the method described in FIG. 10A works for reports coming from the resource to platform 10. A brand X trunk LR object 418 receives reports from its brand X trunk card 422, and translates them into calls to methods in its associated channel object. The brand Z trunk LR object 420 operates in a like manner in reporting from its brand Z trunk card 424.

As mentioned above, application layer 100 is isolated from the resources by resource layer 102. Application layer 100 requests allocation of resources by making a request for one or more capabilities, such as playing tones, recognizing DTMF digits, making or accepting calls, etc. A requested resource capability may be a basic capability which defines a fundamental unit of equipment functionality, or it may be a combination of basic capabilities. LR's 110 may be organized by their channel objects 112 by maintaining two tables keeping track of capabilities. One table keeps track of basic capabilities, and the other keeps track of resource capabilities. The tables may be configured so that each entry in the basic capability table contains a basic capability value and a pointer to an LR supporting the basic capability. Similarly, each entry in the resource capability table may contain a resource capability value and a pointer to an LR supporting the resource capability. As a new LR 110 is allocated to the channel 112, a record is made in each table related to the LR's capabilities and a pointer to its location. Application layer 100 has no direct knowledge of specific LR's 110; it knows only that channels 112 have LR's with certain sets of capabilities. When application layer 100 issues a command to a channel 112, the channel looks in its basic capability table for an LR with a basic capability needed to support the requested action. If no such basic resource is found, a "lack capability" message is sent back to the service. Because the basic capability could not be supported by the channel 112, the service will add the desired functionality to the channel 112 by issuing an "add capability" command directly to channel 112.

Capabilities are added to the architecture because similar pieces of equipment from different vendors do not operate in exactly the same way. For example, a given service A may require both the digitized and synthesized voice resources available from vendor X's voice processing equipment. Assume further, vendor Y makes similar voice processing equipment but only with the digitized voice resource. For service A to operate as desired, it must allocate vendor X's equipment for voice processing. If a service B required only a digitized voice resource, vendor Y's equipment would be allocated to support service B. Thus, in order to properly allocate resources to support a given service, each individual service must know each resource supported by each vendor's product.

To tie specific services to specific vendor resources is a tremendous burden on service designers, especially when new technology arises or a new vendor resource is to be used. In the case of a newly integrated resource to the platform, it would be necessary for the service designer to update all services that may be associated with that new resource. Because one of the design goals of the present invention is to simplify the design of services and to isolate them as much as possible from the resources, services allocating their own resources is not a good idea.

Rather than allocating resources directly, service programs in the flexible program ask for certain capabilities. For example, the service may ask for a digitized voice capability and a synthesized voice capability. If one LR 110 can handle both these capabilities, resource broker 414 will inform the channel 112 making the request that a single LR 110 satisfies both requests and that LR would be allocated to the service program through the requesting channel. If two LR's are required, two LR's will be allocated to the service program in a manner similar to the allocation of the single LR. In either case, the service logic remains the same.

Figure 11:
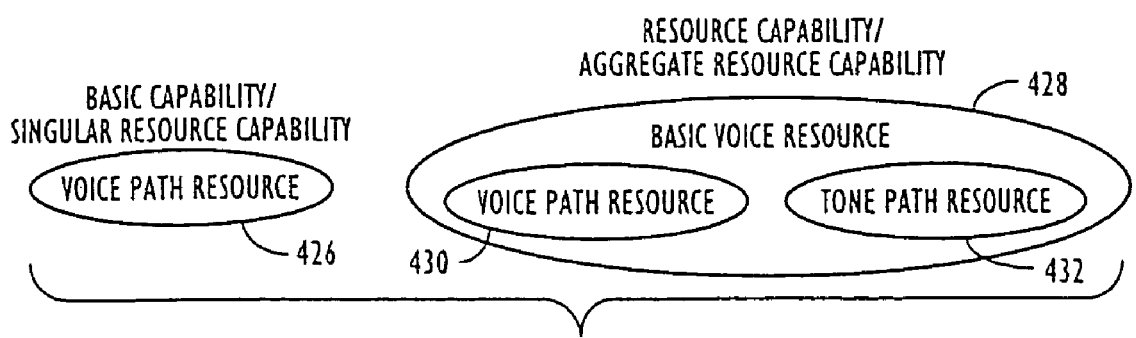
FIG. 11 is a block diagram demonstrating the relationship between basic and resource capabilities and singular and aggregate resource capabilities.

FIG. 11 shows a block diagram, by way of example, demonstrating the relationship between basic and resource capabilities and the relationship between singular and aggregate resource capabilities. Capabilities, the things that resources can do, can be divided into two different classes. A basic capability is the smallest unit of LR functionality. It represents a set of actions and behaviors that could be provided by a single resource. Some example basic capabilities include providing a voice path, playing tones, performing DTMF collection, and synthesizing voice. FIG. 11 illustrates a basic capability of providing a voice path which is provided by a voice path resource 426. A resource capability is a set of one or more basic capabilities provided by a single unitary device. For example, one resource capability could be a basic voice capability 428, as shown in FIG. 11, which represents the basic capabilities of providing a voice path 430 and playing a tone 432.

The two separate classes of capabilities are desired because some resources support more than one capability. A service may require an LR 110 that supports a particular mix of basic capabilities. In the flexible platform system, this is done by requesting the resource capability that represents a combination of basic capabilities. Thus, this is an efficient way to identify all such combinations without binding service logic into a fixed relationship with a particular resource's configuration. Furthermore, an ordering mechanism, within the resource broker 414, is implemented by mapping out the LR's and the resource capabilities they support so that the resource best suited for a given resource capability may be identified and therefore allocated to the service.

Resource capabilities may also be divided into two subclasses. FIG. 11, as mentioned above, shows a block diagram, by way of example, demonstrating the differences between a singular and aggregate resource capability. A singular resource capability represents a single basic capability. Every basic capability has a corresponding single resource capability, for example, bcVoicePath 426 may also referred to as rcVoicePath; bcSynthVox (not shown) may also referred to as rcSynthVox (not shown); etc. An aggregate resource capability represents more than one basic capability, for example, rcBasicVoice 428 represents both rcVoicePlay 430 and rcTonePlay 432.

The resource layer 102 supports several media for the transfer of information from the user to the platform 10, from the platform 10 to a user, or from one user to another user. Each medium is called a path 412, and is characterized by the information carried, not the physical medium on which the information is carried. For example, voice paths carry trunk signalling and voice information; pager paths carry pager signals; and signalling paths carry out-of-band signalling information. An LR 110 associated with a resource that supports a path 412 is known as a path resource 410.

Like the path 412, the channel 112 is an object that manages a path resource object 410 and a set of other LR objects 110 that generate and receive information via the path resource 410. A channel 112 must have, at a minimum, a path resource 410. The type of channel 112 is the same as the type of its path 412, for example, a channel 112 which manages a voice path is a voice channel. Channels 112 are the means through which services and users interact. Over the lifetime of a channel 112, services may ask the channel 112 to add and remove capabilities, but the path characterization always remains.

The virtual terminal 114 is an object that owns and manages the channels 112 associated with a single user, in which the user may be associated with as many channels 112 as needed to represent that user. The virtual terminal 114 is also used for releasing capabilities, which can be accomplished in two ways: a full release or a partial release. In a full release, the VT 114 directs the channel 112 to release all of its capabilities, and after release, to delete itself. In a similar manner, a VT 114 may do a full release of its associated channels 112. In a partial release, all capabilities except required capabilities (called "sticky capabilities") are released. A sticky capability is a capability that can be released only by a full release, which may be made, e.g., when the service has been completed and all capabilities are no longer necessary. When specific capabilities are released from a service, a partial release is issued.

Because requests for capabilities are issued by AC's that need them, and more than one AC may need the same capability, it becomes tricky to determine when to release them. The resource broker 414 economizes the allocation of resources by reusing LR's 110 already owned by the channels 112. The larger the set of owned LR's 110, the more likely it is that an already owned LR 110 will be reused. If capabilities are both requested and released by every AC, the opportunities for reuse of LR's 110 are reduced and the number of allocations and releases that must be processed is increased. Another solution is to let AC's request capabilities as needed and wait until some predetermined time to release them. The only problem is that if the predetermined time is before the end of the call, not all capabilities will be viable candidates for release. Thus, sticky capabilities and partial releases give a way to control what is released and what is retained.

To determine whether an LR 110 may be properly released, the channel 112 must keep track of the basic capabilities and resource capabilities of its associated LR's, as described above in the Resource Management section. It should be remembered that an LR 110 may support more than one resource capability, and that ACs may issue more than one capability request to a channel 112 for a particular capability. This can result in a channel allocating an LR to support several capabilities. Thus, an LR 110 should not be released until every capability it supports has been completely released by the service. To ensure that no capability or LR 110 is prematurely released, the tables within each channel 112 are consulted before release.

E.2 The Resource Broker

As noted earlier, services have no direct knowledge of LR's 110 owned by channels 112. The services know only of capabilities. Therefore, to have resources allocated to a service, the service must present an "add capability" request to the channel 112.

Figure 12:
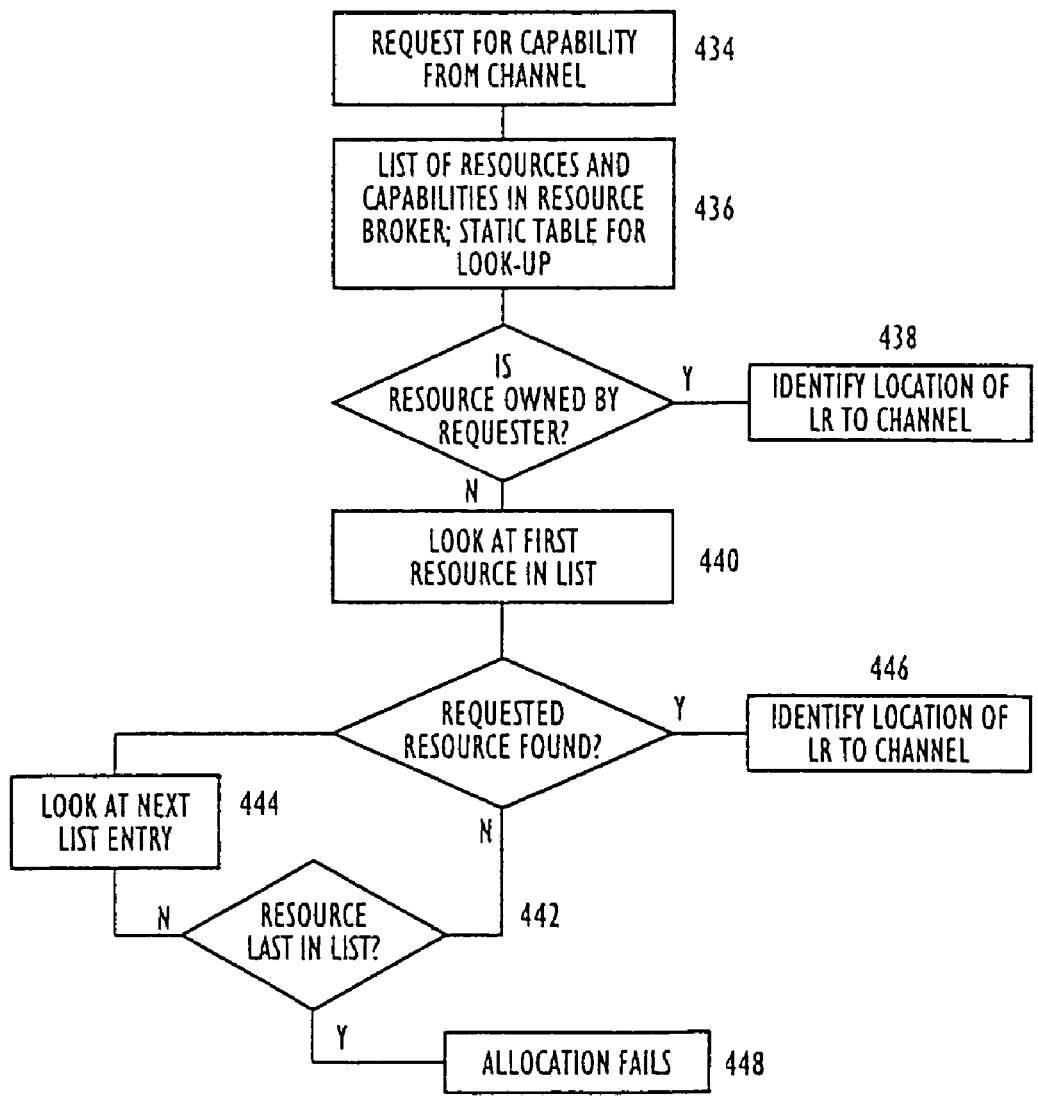
FIG. 12 is a flow diagram which illustrates a resource broker method.

The resource broker 414 keeps track of which resources support which resource capabilities and manages the allocation of the logical resources for objects known as resource owners, i.e., objects (e.g., channels 112) that contain pointers to LRs 110. FIG. 12 shows a flow diagram illustrating, by way of example, steps that may be performed by a resource broker upon receiving an "add capability" request from an executing service and allocating a logical resource to a resource owner to satisfy the request. Before a resource capability is allocated, a channel 112 (which serves as a resource owner) receives a capability request from an executing service. Channel 112 calls the resource broker 414 and indicates the resource capability requested with reference to itself. The resource broker 414 tries to obtain a resource 110 which supports the requested resource capability.

The resource broker 414 may comprise a static list (read into the database at initialization) that has information recorded into three fields: logical resource (LR) type; resource capability type; and preference. The preference, an integer from the set, for example, {−1, 1, 2, 3, . . . }, is used by the broker when several different LR's support the same resource capability to determine which resource is the best to support the capability request. The higher the preference numeral, the higher the preference. The special value −1 identifies LR types that are never allocated by the broker 414, but about whose capabilities it must know, for example, incoming trunks. The broker becomes involved only if the LR's 110 associated with a particular channel 112 do not support the requested resource capability. For example, when a resource capability request is made by the executing service 434, the resource broker first checks the resources already owned by the client channel 436. If one of those resources supports the request capability, the resource broker reports a reference to that resource back to the resource owner 438. If the resource owner doesn't already own the resource which satisfies the request, the resource broker tries to allocate a resource of the type that appears first in the resource broker's table of resources supporting the requested capabilities 440. If the resource cannot be allocated 442, the resource broker tries the next resource type in the resource broker list 444. Eventually, one of the resources will succeed in satisfying the capability request or all will have failed, resulting in no more resource types to try. If the allocation succeeds, the resource broker reports back to the resource owner, e.g., channel 112, with a reference to the allocated resource 446. If the allocation fails, the resource broker reports back to the client channel 112 that the allocation has failed 448.

E.3 Simplified Allocation, Deallocation, and Use of Resources

As stated above, the flexible platform system was designed, inter alia, to simplify the task of writing services by isolating them from resources. The resource layer 102, made up of a plurality of channels 112, each with sets of resources 110 included, relieves service writers and designers of worrying about how to organize and manage resources 110.

Figure 13:
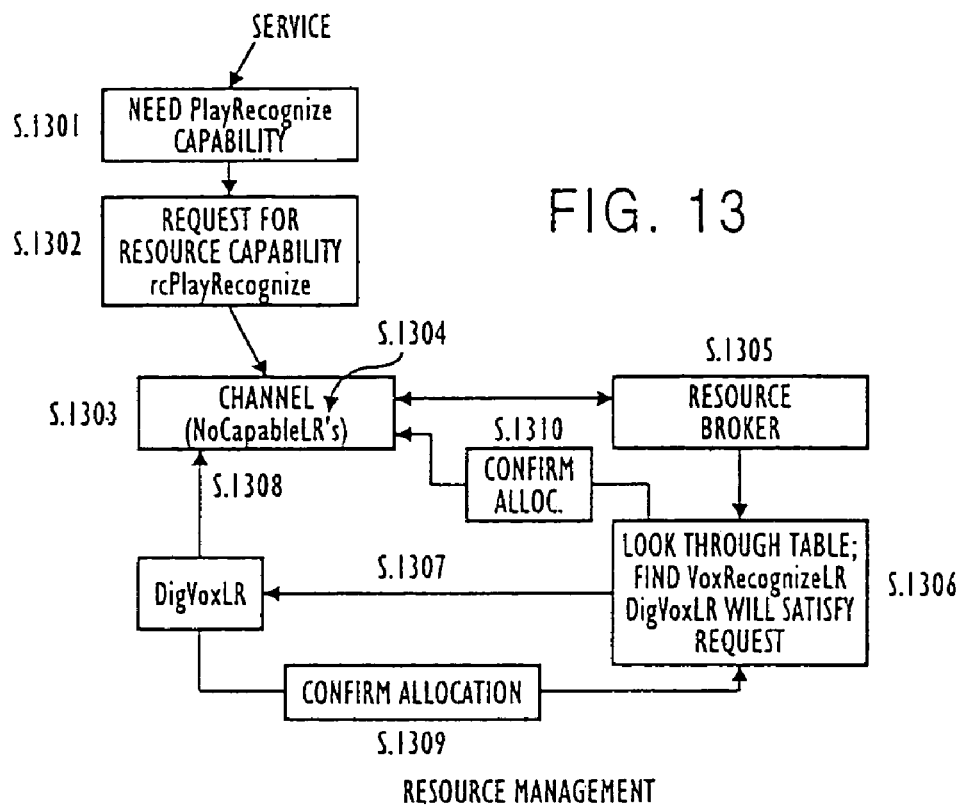
FIG. 13 is a flow chart representing steps that may be performed during resource management in responding to capability requests by the application layer.

FIG. 13 shows an example of a simple resource allocation. Assume that a service is operating and (s.1301) requires the ability to both play and recognize voice signals. A (s.1302) request for resource capability is made, e.g., rcPlayRecognize, to (s.1303) the reference channel through which the service is operating. At this point, assume (s.1304) the channel has no logical resource able to perform the desired capability. The resource broker inquires of the requesting channel (s.1305) which logical resources it has previously obtained. The resource broker asks each of these which capabilities they support. "rcPlayRecognize" will not be represented (s.1304), therefore the resource broker continues by looking in its own resource list (s.1306) for a logical resource that supports "rcPlayRecognize." The resource broker finds such a resource, which we will call DigVoxLR (s.1306). The resource broker allocates a DigVoxLR (s.1307). The DigVoxLR, as part of its allocation obtains all hardware resources needed to support it (s.1308). Once all of these have been allocated, the DigVoxLR reports back (s.1309) to the resource broker that its allocation is complete. The resource broker informs the requesting channel (s.1310) that it now has a logical resource that can support rcPlayRecognize and passes the address of DigVoxLR back to the channel.

The resource broker checks the requesting channel for its owned logical resources before allocating a new one to improve the efficiency of hardware allocation on the platform. In the previous example, DigVoxLR might be able to support a DTMF digit collection capability, "rcDtmfCollect," in addition to rcPlayRecognize. If the requesting channel had earlier obtained DigVoxLR in order to support rcDtmfCollect, it would already have a resource that supports rcPlayRecognize. Rather than obtain a second one, the resource broker determines that the DigVoxLR already owned by the requesting channel can be used to support rcPlayRecognize as well.

Another example relieving service designers of managing resources is when a service wants to tear down a channel. The service simply sends a command to release the channel 112 specifying the full release and then waits for a confirmation that all channel 112 resources 110 have been deallocated. Because the service programs do not keep track of which resources 110 have been allocated, or even know how to handle them, it is only necessary that the service program inform the channel 112 that the capabilities are no longer required and the resources providing those capabilities should be deallocated.

When deallocating resources 110, the platform treats basic capabilities and resource capabilities differently. Basic capabilities keep track of what a channel 112 can do, while resource capabilities keep track of what resources 110 channel 112 has obtained and must yet release. When a channel 112 is waiting for a logical resource 110 to finish releasing, the logical resource entry for that particular LR is kept current in the resource table, but dropped in the basic capability table. This keeps the logical resource 110 from being used while it is being released.

There is a similar relationship between service logic and VT's 114. The VT 114 enables service writers and designers to not concern themselves with writing code to organize and manage channels 112. Similar to the way the service logic can release capabilities in channels 112, the service logic need only issue a full release command to a VT 114 and then wait for VT 114 to issue a confirmation call when all of the VT's 114 associated channels 112 have been deallocated.

Services can also create multi-channel VT's with a single VT request. Besides supervising simplified channel management, VT's 114 provide a useful abstraction for modeling multi-media services. The VT's 114 are important to support integrated voice and data and other multi-media services through a single object that gathers all user media into one bundle.

All these functions are implemented by a complex state machine within the VT 114 and channel 112. Encapsulating these mechanisms in the resource layer 102 frees service writers of the need to implement similar mechanisms on their own. These facilities provide a framework within which an interface with considerable flexibility can be designed within channels 112, VT's 114 and services. For example, VT configurations need not be known by a service ahead of time. A service can start off with a VT, with no associated channels, and it can later add and release channels 112 of any sort, as required by the particular service program. Once a set of channels 112 has been associated within a VT 114, the VT 114 can add and release capabilities through its associated channels 112.

F. An Exemplary Call Walkthrough Procedure

The exemplary platform call processing architecture disclosed herein can be better understood by walking through the platform call processing architecture as a call is placed from an originating party to a terminating party. FIGS. 14-18B illustrate several of the main steps the call processing software will perform in handling a call, including setting up an originating side (FIG. 14), starting an originating service (FIG. 15), making a terminating side (FIG. 16), offering connection (FIG. 17), accepting the offered connection (FIG. 18A), and executing an escape service (FIG. 18B). This walkthrough refers to certain events, event handlers, and terminology. However, the specifics referred to in this walkthrough should not be construed as in any way limiting, as variations may be made to various aspects of the call processing architecture without detracting from the flexible and versatile nature of the same.

Figure 14:
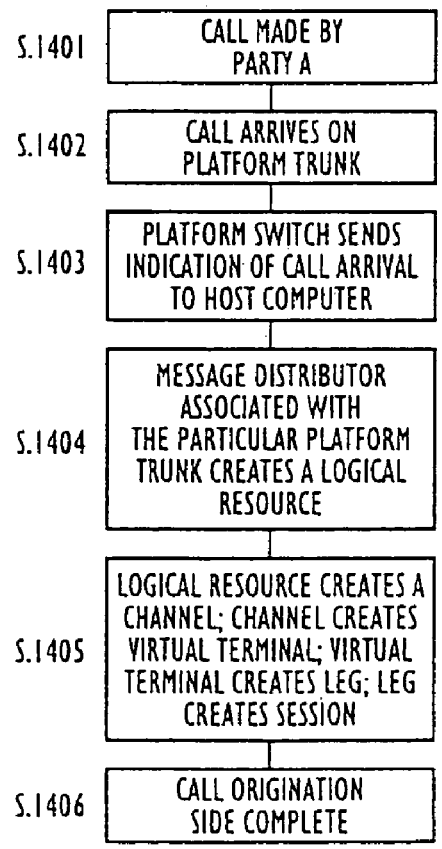
FIG. 14 is a flow chart representing the setting up of an originating side of a call processing stack in response to receipt of an incoming call.

FIG. 14 is a flow chart representing, by way of example, the establishment of an originating side of a call processing software in response to receipt of an incoming call. A call is made by party A from a telephone to party B (s.1401). The call arrives at the network platform on the platform trunk (s.1402). A platform switch sends an indication of the call's arrival on the platform to the host computer (s.1403). A message distributor associated with the particular platform trunk creates a logical resource (s.1404). The logical resource creates a channel; the channel creates a virtual terminal; the virtual terminal creates a leg; and the leg creates a session.

Figure 15:
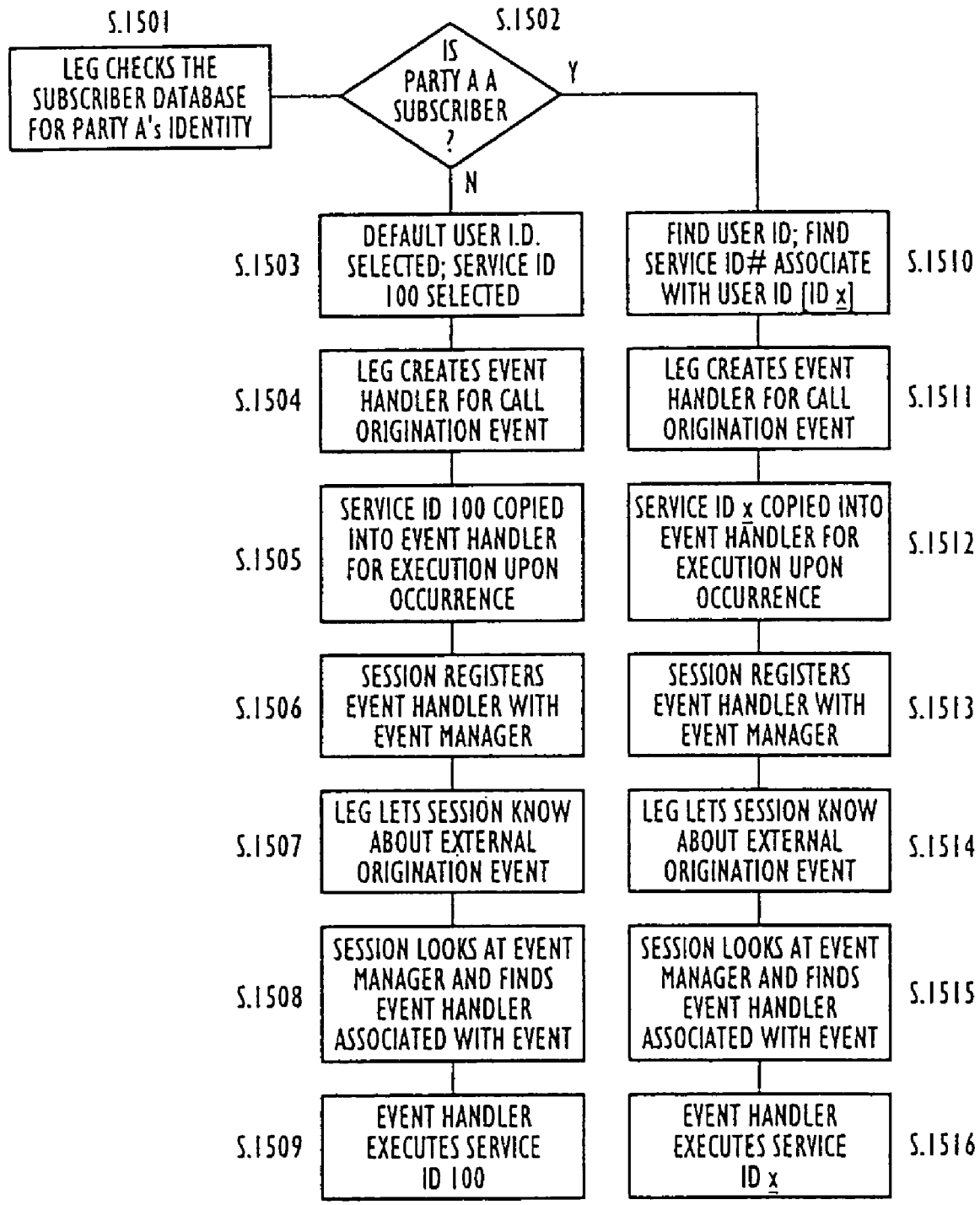
FIG. 15 is a flow chart representing the starting of an origination service once the originating side has been set up.

Once the originating call sets up the originating side of the call, the originating service begins. FIG. 15 is a flow diagram representing, by way of example, the starting of an origination service once the originating side has been set up. According to the diagram the leg checks with the subscriber databases (s.1501) to identify the caller (S.1502). If originating party A is not a subscriber, a default user identification is selected with its default service identification (s.1503). The originating leg creates an event handler for execution upon the occurrence of a call from off the platform (s.1504). The default service identification is copied into the event handler (s.1505), to be executed upon event occurrence. The handler is then associated with the appropriate event in the event manager (s.1506). The originating leg now lets the session know about the call origination from party A (s.1507), which looks through the event manager to find the event handler associated with the external origination event (s.1508). The default service is then executed by the event handler (s.1509).

If the originating party A is a subscriber, the appropriate user identification for party A is selected along with its particular originating service identification (s.1510). As with the default service, the originating leg creates an event handler for execution upon the occurrence of a call from off the platform (s.1511). The user service identification is copied into the event handler (s.1512), to be executed upon event occurrence. The handler is then associated with the appropriate event in the event manager (s.1513). The originating leg now lets the session know about the call origination from party A (s.1514), which looks through the event manager to find the event handler associated with the external origination event (s.1515). The particular originating service subscribed to by party A is then executed by the event handler (s.1516).

Figure 16:
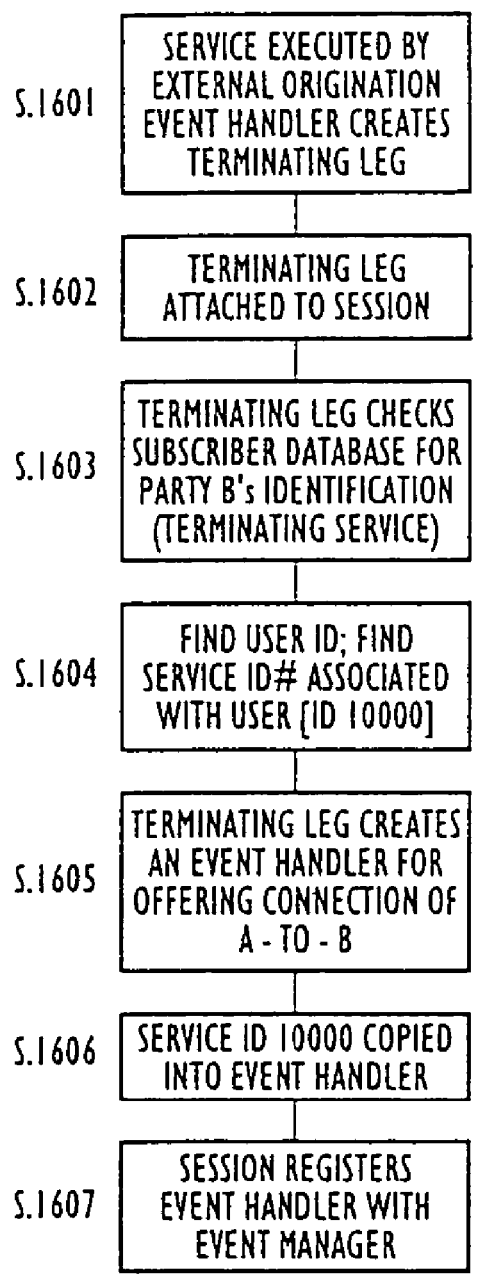
FIG. 16 is a flow chart representing the setting up of a terminating side of a call processing stack once the originating service has been started in accordance with the process of FIG. 15.

Now the originating side is set up and the originating event has caused either an originating service (in this case, a default originating service) to begin executing. FIG. 16 is a flow diagram representing, by way of example, the creation of a terminating side of a call processing stack once the originating service has been started in accordance with the process of FIG. 15. One of the primary functions of the default originating service described herein is the creation of a terminating leg to accommodate party B. As shown in FIG. 16, the service creates a terminating leg in step s.1601 and attaches it to the session in step s.1602. The terminating leg checks the subscriber database to identify the receiving party's subscribed services (s.1603) and finds the appropriate service identification (s.1604). The terminating leg creates an event handler for execution upon the occurrence of an internal software indication of offering connection of the originating leg to the terminating leg (s.1605). The receiving party's subscribed service identification is copied into the event handler (s.1606), and the handler is associated with the appropriate event within the event manager (s.1607). This completes the procedure for making the terminating leg.

A next procedural area in the sample call is the method for offering connection from party A to party B. As mentioned above, the offering may be an internal event from the platform software, although that is not absolutely necessary.

Figure 17:
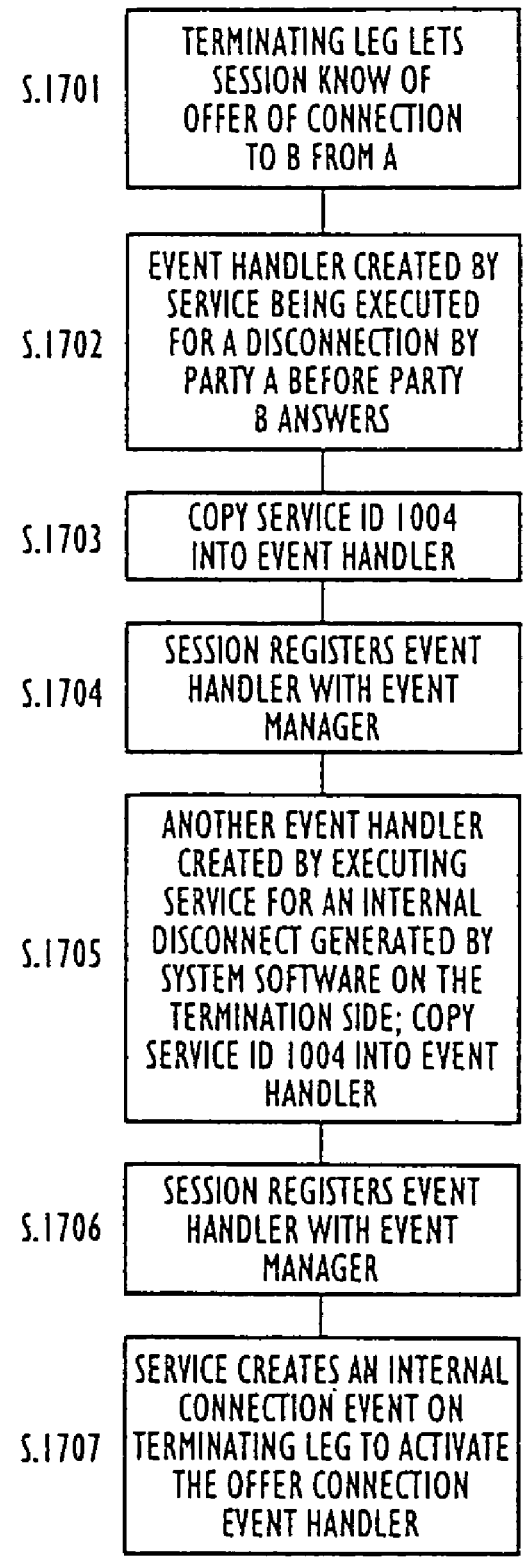
FIG. 17 is a flow chart representing the offering of a connection to a party on the network, after the terminating side has been made in the process of FIG. 16.

FIG. 17 is a flow diagram representing, by way of example, the steps related to offering connection to a terminating party after the terminating leg has been created in the manner set forth in FIG. 16. The originating leg lets the session know that an offer of connection is being made by party A (s.1701). Another event handler, related to a disconnect by the originating party before party B answers, is created by the user or default service currently executing (s.1702). The executing service copies a predetermined service identification into the created handler (s.1703) and assigns the handler to an appropriate event within the event manager (s.1704). The executing service creates another handler (s.1705), this time for an internal disconnect event generated by the platform software on the terminating side of the call, copies a predetermined service identification into the event handler (s.1706), and assigns the event handler to a specific event in the event manager (s.1707). While not necessary, the service identifiers for the external disconnect event and the internal disconnect event may be the same. This is one of the tremendous advantages of the present invention, that service logic is modular and, therefore, reusable for a plurality of events. If desired by the service designer, any event may be associated with any service logic, making the service more flexible and service design easier. The service logic creates an internal connection offering event on the terminating leg to trigger the appropriate event handler to continue the call preparation routine (s.1708).

Figure 18A:
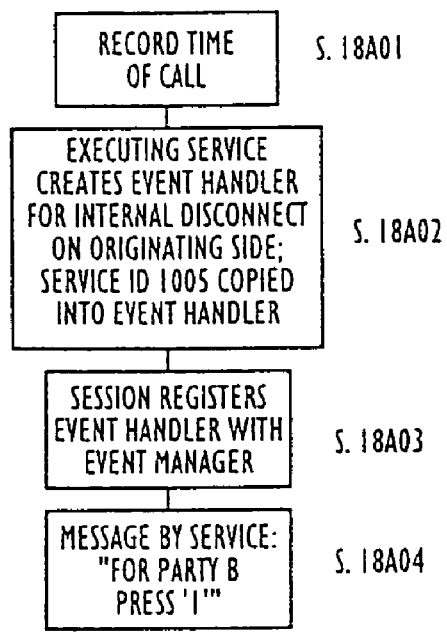
FIG. 18A is a flow chart representing the general steps performed in accepting an offered connection.
Figure 18B:
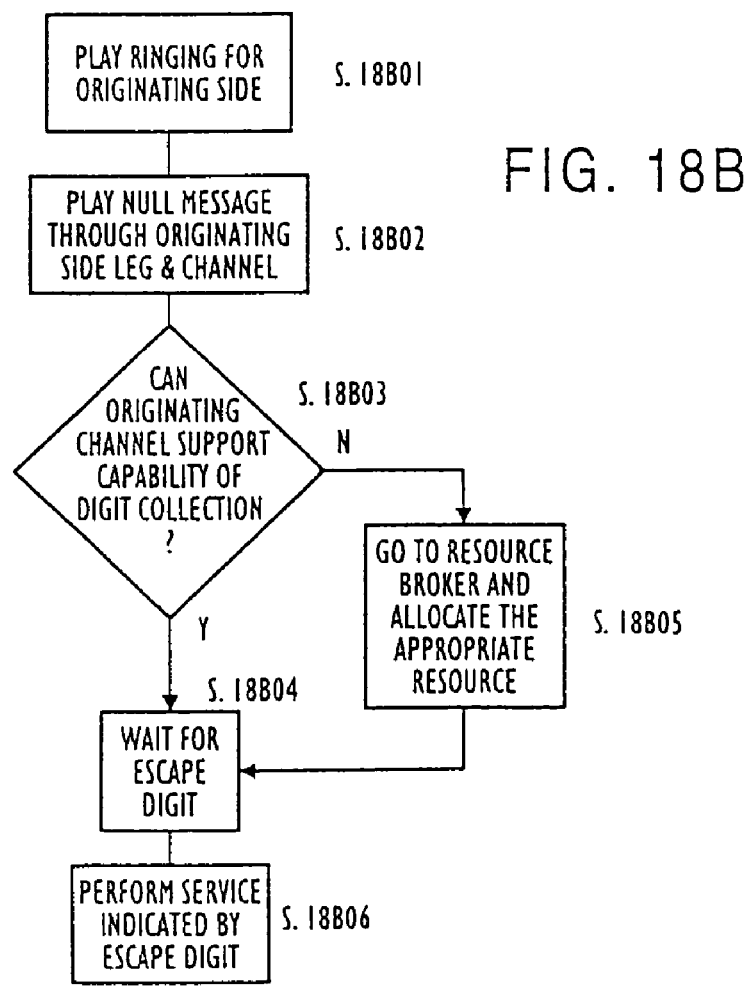
FIG. 18B is a flow chart representing the steps that are performed in performing an escape service.

FIG. 18A is a flow diagram representing, by way of example, the general steps performed in accepting an offered connection. Now that the call has been offered, it is now appropriate for the terminating leg to accept the offer of connection. The executing service may record the time of the call (s.18A01) for the purposes of billing, etc. The executing service creates an event handler to respond to an internal disconnect event on the originating side and copies a predetermined service identification into the handler (s.18A02). The event handler is assigned to an appropriate event within the event manager (s.18A03). Then a message, or some other service dependent action, will be presented to the originating party for an appropriate response (s.18A04).

The service may be designed so that it awaits a response which is referred to as an escape. An escape takes the user from the message portion of the call to the desired party or service. FIG. 18B is a flow diagram representing, by way of example, the steps that may be performed in preparing the session for an escape service. Before party A can be connected with party B, the platform satisfies itself that party A has the ability to transmit an escape to activate party B's subscribed service. Thus, while party A waits for its call to be answered, the executing service plays ringing to the originating side (s.18B01). At the same time, the service plays a null message on the originating side (s.18B02) that is undetectable by the caller, but allows the platform to determine which resources must be allocated to complete transmission of the call. The null message is then received by the platform, which determines whether the originating channel can support the service (s.18B03), e.g., digit collection. If the originating side can support digit collection, an indication is sent to the session, and the call proceeds by playing the service message and awaiting the entry of escape digits (s.18B04). If the originating side cannot support digit collection, the channel must communicate with the resource broker to find and allocate an appropriate logical resource to the channel for digit collection (s.18B05). Once allocated, a confirmation indication is sent to the session, and the call proceeds by playing the service message and awaiting the entry of escape digits (s.18B04). Upon the entry of escape digits, the originating party's desired service is performed (s.18B06), e.g., connection to party B.

While the above description was provided to familiarize the reader with a generalized platform routine, the following call walk-through, shown in FIGS. 8 and 20-23, will refer to various specific events, event handlers, and service identifications for the purpose of explanation, and should not be construed as in any way limiting.

In the present scenario, an originating phone call is made from non-subscribing party A to subscribing party B. The call from A is routed through a general telephone system until a central office switch routes the call to the platform switch 98 of the flexible platform 10. A call origination report is input to the switch message distributor 120 associated with the line or trunk 450 on which the call arrived. The message distributor 120 creates a logical resource object 502, see FIG. 20, to handle the report, naming it, for example, IncTrkLR. This object represents the hardware of the incoming call to the flexible platform 10, and for the duration of the call, all reports from and commands to the line or trunk 450 go through IncTrkLR 502.

Figure 20:
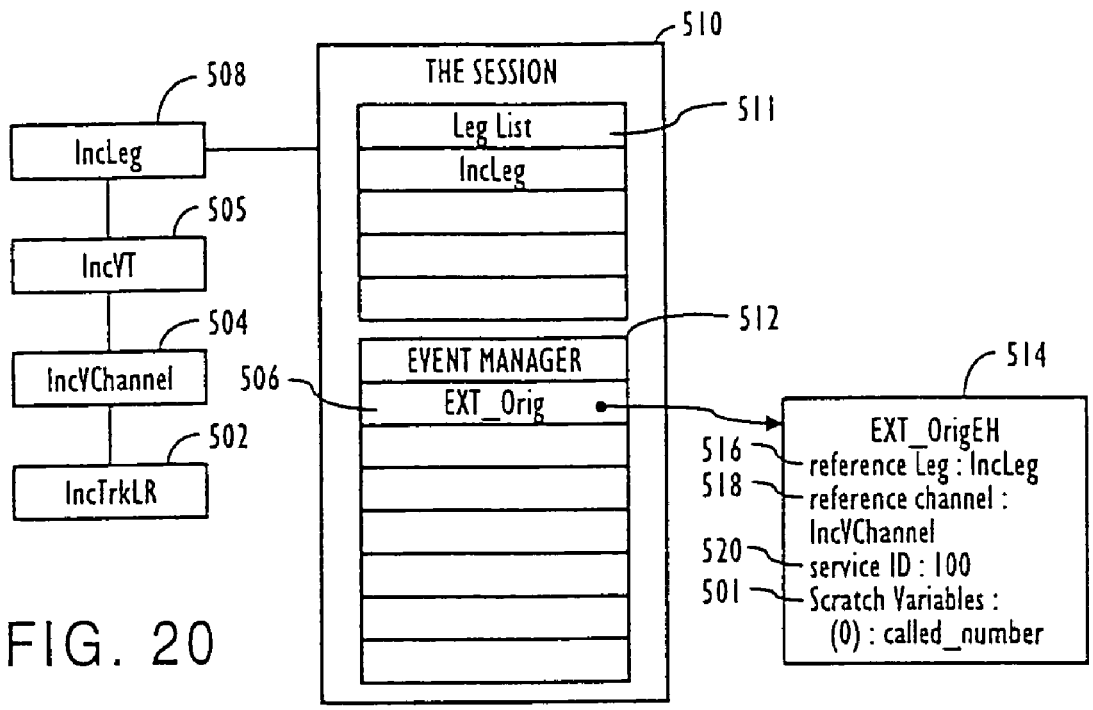
FIG. 20 is a block diagram representing objects that are present after a call origination portion of a call has been completed.

FIG. 20 shows a block diagram representing, by way of example, the creation of objects building the sample session of the example from signal arrival on the platform to immediately following call origination. After the creation of IncTrkLR 502, the logical resource object creates a channel object 504, named, for example, IncVChannel. Channel object IncVChannel 504 in turn creates a virtual terminal object 505, for example, IncVT. The IncVT object then creates a leg object 508, for example, IncLeg. Finally, the leg object creates a session object 510, for example, TheSession. TheSession 510 acts as a managing object for all of the legs in the call.

Upon creation of TheSession object 510, the originating side of the call stack is in place. Control is then returned to IncTrkLR 502 to call IncVChannel's reportOrig method. The reportOrig method is a confirmation message to succeeding objects in the object hierarchy that the reporting object has been created. This reporting method is also a way of identifying the originating call. IncVChannel's reportOrig in turn calls IncVT's reportOrig method, which calls IncLeg's report Orig method.

IncLeg 508 now checks the subscriber database 56 (see FIG. 8) for a record whose key is the calling party's number (A's telephone number). Since it was assumed that A was not a subscriber of the flexible platform, no such record will be found. Instead, the flexible platform system will retrieve a default user identification record to enable the call to proceed. IncLeg 508 retrieves the record for a default user, for example, DefaultOrigUID. This record is referred to as a virtual user record, for example, IncVU. The record is also associated with a default originating service, for example service ID 100 or service logic unit (SLU) 100. As will be seen, this particular SLU creates a leg for the terminating (called) party, i.e., party B, and adds it to the same session, i.e., TheSession, as the originating call.

IncLeg 508 creates an event handler 514 for an external origination event 506, for example, EXT_orig. The event handler 514 is associated with a reference leg 516, for example, IncLeg, and a reference channel 518, for example IncVChannel. The event handler 514 will be called, for example, EXT_OrigEH. IncLeg 508 then copies a service logic unit 520 to be executed, e.g., service ID 100, into the event handler 514 and tells TheSession 510 to add the event handler 514 to the session's event manager 512, thus registering EXT_OrigEH 514 with TheSession d1. EXT_OrigEH 514 has scratch variables 501 that are predetermined, for example, scratch variable 0 is set the by creating leg, IncLeg, to a value equal to the number called by A, e.g., called_number. Thus, if an external event, e.g., EXT_orig 506, occurs, the event manager 512 will inform event handler EXT_OrigEH 514 to execute the ID 100 service 520 defined therein.

Note that TheSession 510 includes a leg list 511 to keep track of the parties to TheSession's call, which at this time includes only the originating leg, IncLeg. Also note that the event manager 512 is a list of anticipated and predetermined events 506. However, at this point in the call, only one event 506, EXT_orig, is anticipated.

The system at this point will remain idle until an event occurs attempting to establish communication between party A and party B. To get things moving, IncLeg 508, as representative of the calling party, notifies TheSession 510 of the external event, signifying a call from outside of the platform to inside the platform. To process the event, IncLeg passes the external origination event of the call origination, EXT_orig 506, plus identifying itself and IncVChannel as the reference leg 516 and reference channel 518, respectively. TheSession passes the external origination event to the event manager which handles events of this type, and that event manager further passes the event to event handler 514. Since the event 506 is a member of the list, the event manager 512 accesses event handler 514 to respond. Since EXT_OrigEH, for example, is invoked by an external origination event 506, and the call from outside the platform to within the platform occurs over reference leg 516 and reference channel 518, the event manager 512 accesses the event handler 514. The event handler 514 then executes the service logic unit 520 associated with EXT_OrigEH, in this example, the default originating service ID 100.

In a service logic program employed as an originating service by the flexible network platform, a first declared scratch variable, scratch variable 0, may be defined as, for example, called_number. This is important because originating leg 508, as the creator of the event handler, sets the scratch variable 0 in EXT_OrigEH 514 when the object was created, and now every originating service must assume that the leg 508 will set all scratch variables 501 this way.

By way of example, assume:
ID 100
make_leg AC
create new leg [terminating leg];
attach new leg to session;
assign scratch variables;
new leg check subscriber data for called party's service identification;
retrieve service identification;
new leg create event handler for internal offer of connection on terminating leg;
copy service identification, e.g., ID 10000, into event handler;
register event handler with session;
proceedToNext.
offer_connection AC
create event handler for external disconnection on originating line;
copy service identification, e.g., ID 1004 into event handler;
register event handler with session;
initialize scratch variables;
create event handler for internal disconnection on terminating leg;
copy service identification, e.g., ID 1004 into event handler;
register event handler with session;
initialize scratch variables;
create offer of connection event in terminating leg [executes service ID 10000].

Part of nearly every user service, e.g., the default origination service ID 100, and generally the first action, is an application component (AC) known as, for example, make_leg AC. When the event handler 514 begins running ID 100 service logic unit 520, the event handler indicates the make_leg AC as the initial AC for execution. The make_leg AC is stored as one or more opcodes, an integer value identifying a particular compiled module of code, to be executed along with several associated parameters. In general, the parameters associated with the executing opcode must be decoded and passed to the opcode while it is being executed. When the opcode has been executed, the event handler will execute the next opcode in the AC by identifying its opcode, as before. This continues until the executing AC is finished by invoking a completion statement, for example, proceedToNext. This passes a completion code to indicate the complete execution of the AC. The event handler will then execute the next AC in the executing SLU.

Figure 21:
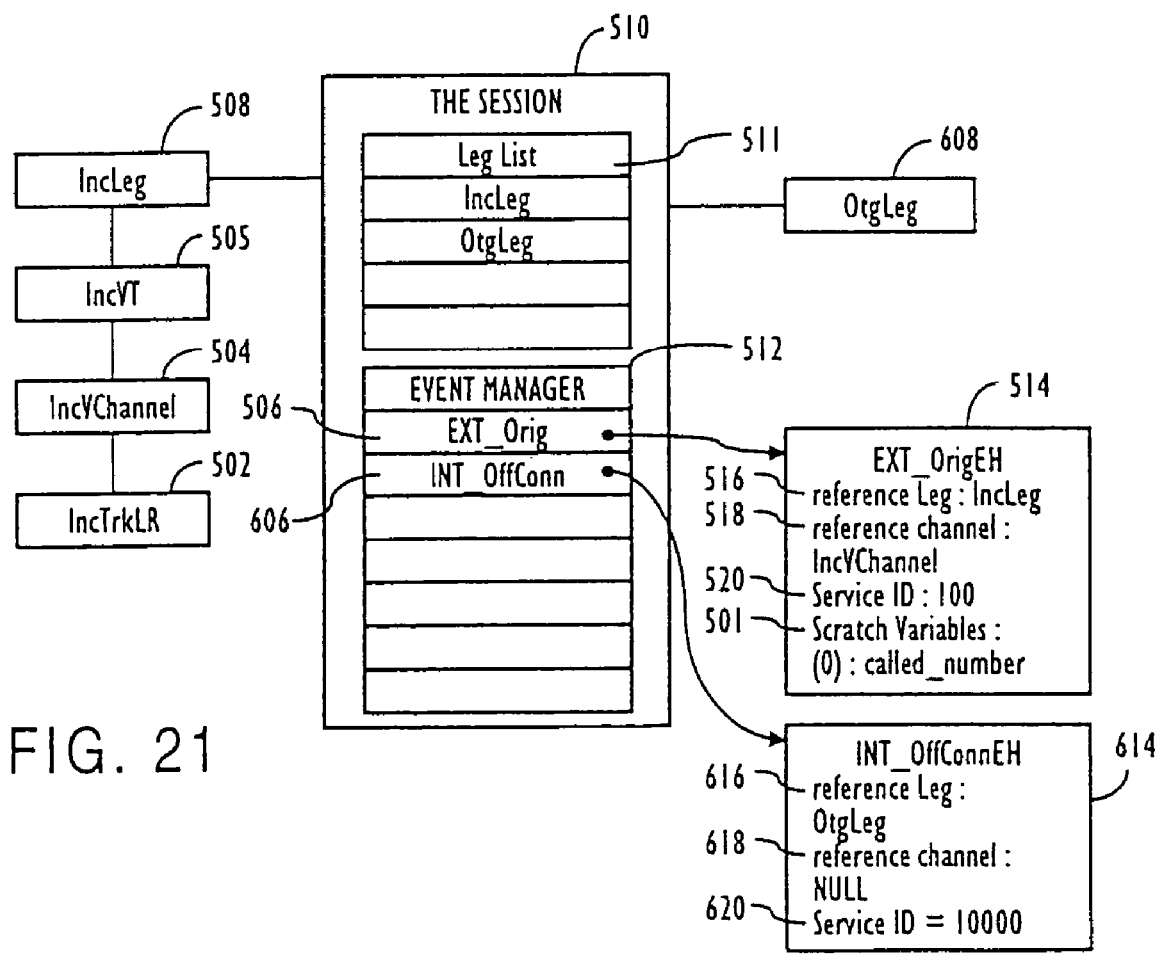
FIG. 21 is a block diagram representing the objects present within the call processing software after an outgoing leg has been created.

FIG. 21 is a block diagram representing, by way of example, building of the objects within the call processing software as a result of the execution of the make_leg AC of the default service. The execution of the make_leg AC creates a new leg called, for example, OtgLeg 608, attaches it to TheSession 510, and assigns predetermined scratch variables associated with a newly created leg. In attaching the OtgLeg 608 to TheSession 510, the session's leg list 511 is updated to include OtgLeg as a party to TheSession. OtgLeg 508 looks in the subscriber database 56 (see FIG. 8) for a record whose key is the same as the value, for example, scratch variable 0, e.g., called_number. Since it has been assumed that party A called party B, a subscriber, a record exists with the value called_number in the subscriber database. The record retrieved is identified as the terminating party's virtual user record and called, for example, OtgVU. OtgVU also contains the service unit of called party B's terminating service. For example, ID 10000 could be the service identification number. This is an aspect of the platform's flexible modular code design. Because services are stored according to an identifying number, two services cannot use the same number identifier. However, different event handlers may access the same services, in response to the same or different events, simply by calling the service identification number.

Upon creation, OtgLeg 608 creates an event handler 614, for example, INT_OffConnEH, for an internal offer connection event 606, for example, INT_off_conn. The reference leg 616 for the event handler 614 is defined here as OtgLeg. However, the reference channel 618 is defined as NULL, because no channel has as of yet been created which is associated with OtgLeg 608. This enables event handler 614 to be activated by an internal offer connection event 606 no matter what reference channel it is passed through, so long as the reference leg 608 is OtgLeg. The offer connection event 606 is considered an internal event because the occurrence comes from the flexible platform software, not from some device outside of the flexible platform.

OtgLeg 608, the terminating leg, copies ID 10000 service 620 into event handler INT_OffConnEH 614 and registers the event handler 614 with TheSession 510. Note that the originating side and the outgoing leg have been created, and that, at this point of the phone call, the external origination event handler 514 is still executing default originating service ID 100's make_leg AC on behalf of caller A, represented by the incoming leg. INT_OffConnEH 614 sits idly waiting for an internal offer connection event 606 with reference to OtgLeg 608. When this event occurs, the event handler 614 will begin executing the ID 10000 SLU 620.

The event handler has executed each AC of service ID 100 and now reaches a proceedToNext instruction. The event handler executes the proceedToNext method of the make_leg AC along with its SUCCESS completion code. The handler informs the platform that it has successfully completed the make_leg AC, points to the offer_connection AC of the ID 100 SLU 520, the next AC in the service logic, and begins executing it. The AC is executed by IncLeg 508 offering the calling party's call to the called party's service location. The parameters identify the leg to which connection is offered, e.g., OtgLeg 608, and the leg and channel from which connection is being offered, i.e., EXT_OrigEH's reference Leg 516, i.e., IncLeg and reference channel 518, i.e., IncVChannel 518.

Figure 22:
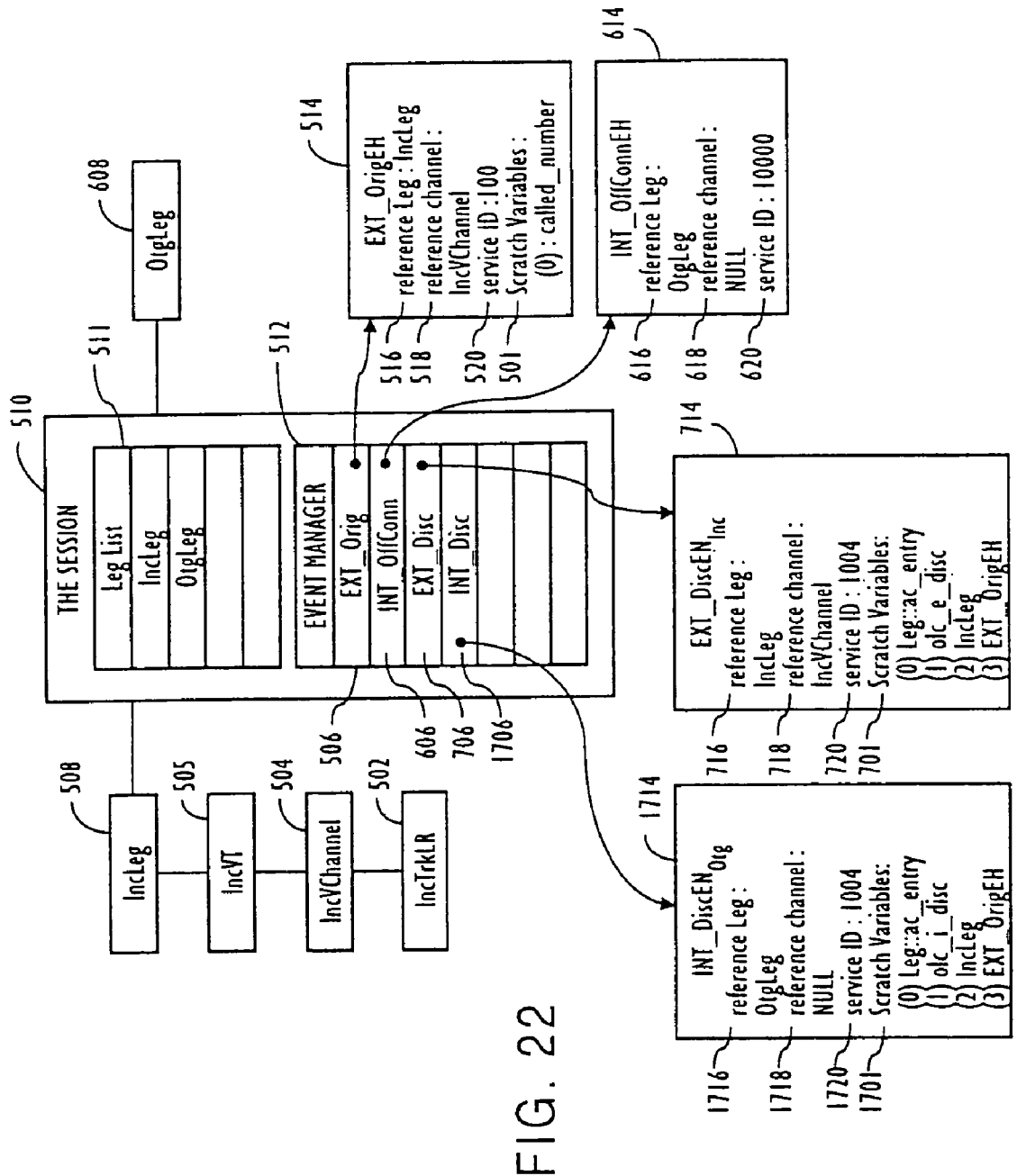
FIG. 22 is a block diagram representing the various objects that are present within the call processing software after disconnect handlers have been created in relation to the incoming and outgoing legs.

FIG. 22 shows a flow diagram representing, by way of example, the arrangement of the objects of the call processing software as a result of the offer connection AC. An event handler for an external disconnect event 706 is created by the offer_connection AC on reference leg 716, e.g., IncLeg and reference channel 718, e.g., IncVChannel. An external disconnect being a disconnection of the call by the originating party prior to the terminating party answering. The event 706 is called, for example EXT_disc and the handler 714 is called, for example, $EXT\_Disc_{Inc}$. The service ID 720 for event handler 714 is defined by offer_connection AC to be, for example, 1004 and then registered with TheSession 510. The ID 1004 service 720 is a background service responsible for handling a disconnect from the originating party while waiting for the terminating party to answer. No internal disconnect handler has been created for the incoming side because there has been no connection to the outgoing side that might generate such an event.

The ID 1004 service 720 is executed upon the occurrence of an external disconnect event 706. Because this particular service is a background service, the offer_connection AC must initialize the event handler's scratch variables 701. For example, scratch variable 0 is set to the address of the AC to be called when the invoke statement of ID 1004 service 720 is executed by the handler 714, e.g., the leg class's static ac_entry method; scratch variable 1 is set to the ID of an AC to be executed upon leaving the background service 720, e.g., olc_e_disc AC, an offer leg connection AC that handles an external disconnect on behalf of the offer_connection AC; scratch variable 2 is set to the address of an object that should execute the AC whose ID appears in the invoke statement, e.g., IncLeg; and after the scratch variables of the background service have been initialized, the offer_connection AC sets background parameter scratch variables specific to the olc_e_disc AC, e.g., scratch variable 3 is set to the address of EXT_OrigEH 514, the event handler that created EXT_DiscEH$_{Inc}$ 714.

The AC offer_connection creates another event handler 1714 that responds if and when an internal disconnect event 1706, e.g., INT_disc, is generated by the software with reference to any channel in reference leg 1716, e.g., OtgLeg. This handler 1714 is referred to, e.g., as INT_DiscEH$_{Org}$. The service ID 1720 assigned by the offer connection AC to the handler 1714 is, for example, ID 1004, the same service associated with EXT_DiscEH$_{Inc}$ 714. As alluded to above, the service identifiers for the external disconnect event and the internal disconnect event may be the same. This reusable code in the software enables the service designer to associate any event with any service logic, thus, making the service more flexible and service design easier. This handler is also registered with TheSession 510. Note that an external disconnect handler has not been created for the outgoing side because there is no connection, at this time, to the outgoing side that might produce such an event. As noted above, the ID 1004 service 720, 1720 is a background service that requires the creating AC to initialize the service scratch variables 701, 1701. The initialization is the same, except scratch variable 1 of scratch variables 1701 is set, for example, to the ID of the AC to be executed after an internal disconnect event 1706, e.g., olc_i_disc AC.

Note that there are now several predetermined events 506, 606, 706, and 1706 anticipated by the flexible platform software and it is not obvious from where the next event will occur. The originating party has done everything possible to get things started, but, as of yet, there is no sign of a terminating party. Originating service handler EXT_OrigEH 514 is executing the offer_connection AC and terminating service event handler 614, INT_OffConnEH, is awaiting an internal offer connection event 606 to get itself started. The final responsibility of the offer_connection AC is to trigger INT_OffConnEH 614 by creating an internal offer connection event 606 for any channel in OtgLeg 616 and sending it to INT_OffConnEH 614 via the event manager in TheSession 510.

At this point, default originating service ID 100 has been fully executed. Any further creating, maintaining, or terminating of the present call is accomplished through the event handlers registered, or to be registered, in TheSession 510. The call now proceeds from TheSession's event manager 512 to INT_OffConnEH's execution of service logic unit ID 10000. Note that the execution of the offer_connection AC EXT_OrigEH is not complete because the internal offer of connection event occurred before the offer_connection AC executed a proceedToNext statement. The offer_connection AC will not complete until either the internal disconnect event or the external disconnect event that it registered for occurs. The passing of the internal offer connection event 606, the reference leg 616, and reference channel 618 parameters triggers INT_OffConnEH 614, thus constituting an acceptance of the offered connection.

By way of further example, assume:
ID 10000
proceedToNext [terminates offer_connection AC].
record_time AC
proceedToNext.
reg_for_i_disc AC
create event handler for an internal disconnection on the originating leg;
register event handler with session;
initialize scratch variables;
proceedToNext.
initialization AC
initialize number to call;
proceedToNext.
play_message AC
allocate resources for service support;
proceedToNext.
mlr AC
call number to call;
proceedToNext.

The ID 10000 service 620 begins with, for example, a record_time AC, which records the current time into a scratch variable. This variable can be employed as a reference point for billing and other vital statistics, etc.

Figure 23:
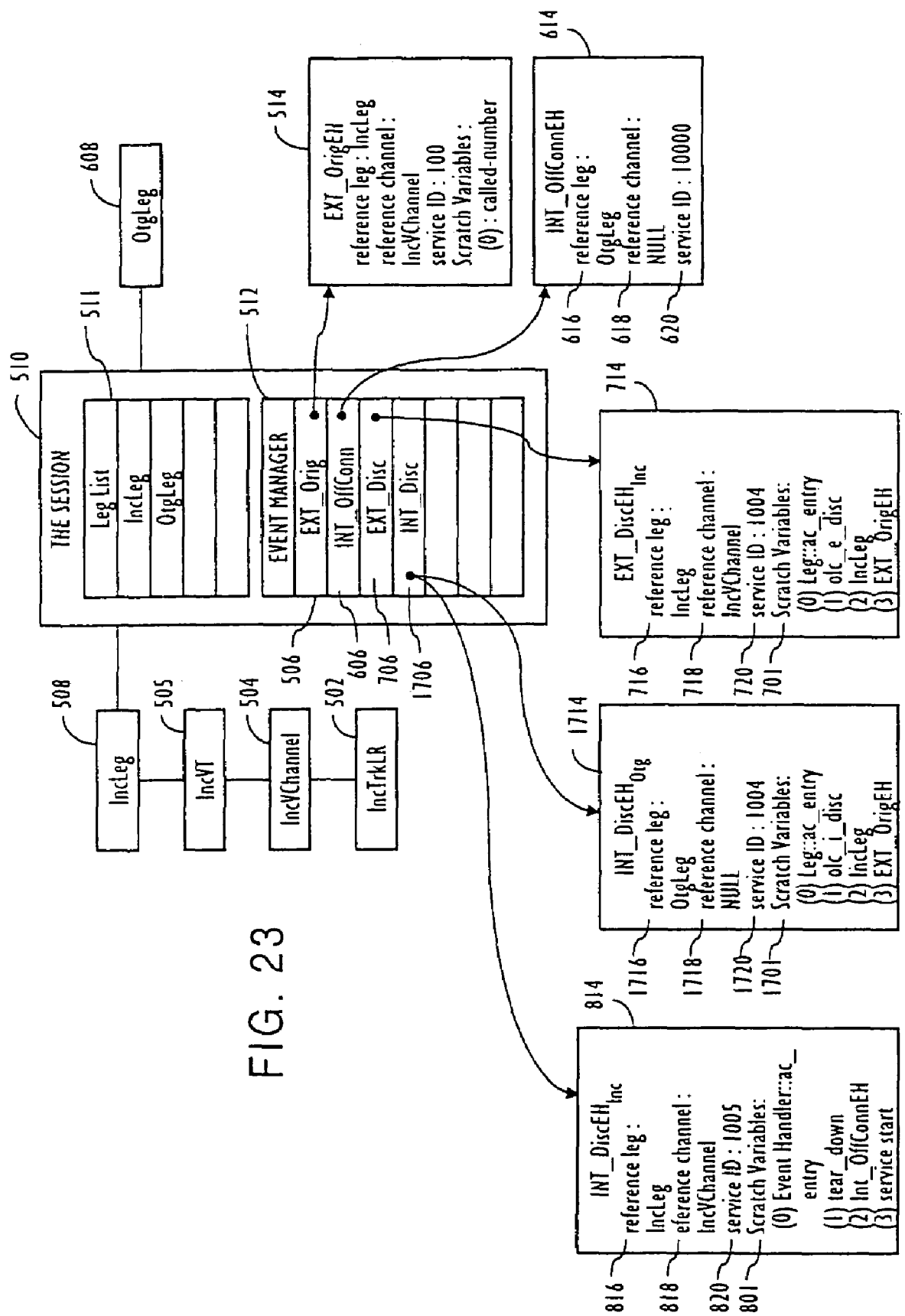
FIG. 23 is a block diagram representing the various objects that are present within the call processing software after an AC (application component) has been executed which creates another disconnect handler for the incoming leg.

Because the outgoing side has accepted the offered connection through TheSession's activation of the appropriate event handler for an offer of connection, it would be possible for the outgoing side to generate an internal disconnect event 1706 within a reference leg and reference channel, e.g., IncLeg and IncVChannel, respectively. The record_time AC's proceedToNext statement causes INT_OffConnEH 714, for example, to reg_for_i_disc AC, an AC that registers the originating leg and channel as the reference leg 1716 and channel 1718 for internal disconnect events 1706. FIG. 23 shows a flow diagram representing, by way of example, the objects of the call processing software following the execution of the reg_for_i_disc AC. The figure shows that this AC creates an event handler 814 for executing a given SLU upon occurrence of an internal disconnect by the platform software on the originating side of the call, for example, INT_DiscEH$_{Inc}$ 814, and registers it with TheSession 510. The new event handler 814 is set to execute, for example, the ID 1005 background service 820. The handler 814 must deal with internal disconnect events 1706 within reference leg 816 and reference channel 818, e.g., IncLeg and IncVChannel. The scratch variables 801 for INT_DiscEH$_{Inc}$ 814 must be initialized because service ID 1005 820 is another background service. For example, scratch variable 0 is set to the address of the event handler class's static ac_entry method; scratch variable 1 is set to the ID of the tear_down AC, the AC that tears down one leg of a disconnected call; scratch variable 2 is set to the address of the object that will execute the tear_down AC, e.g., INT_OffConnEH 614; and scratch variable 3 is set to the value stored in svc_start by the record_time AC, e.g., to calculate the duration of the call if INT_DiscEH$_{Inc}$ is invoked.

Notice that INT_DiscEH$_{Inc}$ 814 has been added to the same event 1706 as Int_DiscEH$_{Otg}$ 1714 and that these event handlers are marked to execute two different services. This is an added benefit of the present invention in that two identical events execute different service logic depending upon the reference leg and reference channel of occurrence defined by the event handler. This simplifies for the system designer the arrangement of events, enabling a system in which the events control the sequence and execution of service logic.

The reg_for_i_disc AC's proceedToNext statement causes INT_OffConnEH 614 to execute, for example, an initialization AC that sets user-specific data for the call. In a simple call service of this example, assume only one item is read, e.g., the number at which the subscriber may be reached, "To reach party B, press '1'." The number read is clearly not the same as the subscriber's telephone number, but the numerical representation required to access the subscriber's service.

Before proceeding with this particular outgoing call, the service may want to perform an additional preparatory function to assure itself it has the ability to collect the digits requested above. Thus, in making the call, a background service, e.g., escape service, is triggered to play ringing to the originating party and monitor the originating line for an escape. An escape occurs when the originating party presses a key on his or her phone keypad designated as an escape digit for the service. For example, if a message is read, "For connection to party B press '1'," the digit "1" is an escape digit. If the service sees an anticipated escape digit, the escape service performs its programmed escape action on behalf of the terminating service. Thus, the escape service must be able to collect DTMF digits from the monitored incoming channel as soon as the originating call starts.

In order for the flexible platform to read escape digits from the originating call, the system must satisfy itself that the originating call has DTMF capabilities. Before making its call, service ID 10000 assures itself that the resources required to produce and collect DTMF digits are available and ready on the originating channel. In this configuration, for example, the digit collecting capability is supported by the same hardware that supports the capability for playing voice messages, therefore, the digit collecting capability is obtained by playing a null message via, e.g., a play_msg AC on the originating channel. The originating party does not hear the null message, but the necessary resources are obtained and made ready to use for both voice message playing and digit collection. The resource layer allocates a logical resource suitable to perform the capability in a manner commensurate with that set forth above in the section describing the resource manager. Thus, if the hardware that supports playing voice messages did not support digit collection, another logical resource object would be appended to IncVChannel through the resource broker 414 (see FIG. 8). Another alternative is to initialize the system through a software setup macro with an appropriate code.

Finally, the proceedToNext statement within the play_msg AC causes INT_OffConnEH 614 to execute, e.g., mlr AC, represented by a call statement within the program for the ID 10000 service 620. The mlr AC has parameters including, for example, the number to be called; the leg on which the call is to be made, e.g., the reference leg for the service, e.g., OtgLeg; the leg and channel monitored for escape while the call is being made, e.g., the reference leg and channel of the originating call for the service, i.e., IncLeg and IncVChannel; and a set of three parameters that are updated if and when the originating call is answered, e.g., ans_channel set to the ID of the channel in the reference leg that answers, ans_number set to the network address of the station represented by ans_channel, and ans_type set to a character code, determined by the service itself, used to convey information about the characteristics of the answering station. While these parameters may appear to complicate a simple phone call, it should be remembered that the mlr AC can make a call to more than one network address at the same time. Thus, it is important to know precisely which station has answered and where to find its channel.

Figure 19:
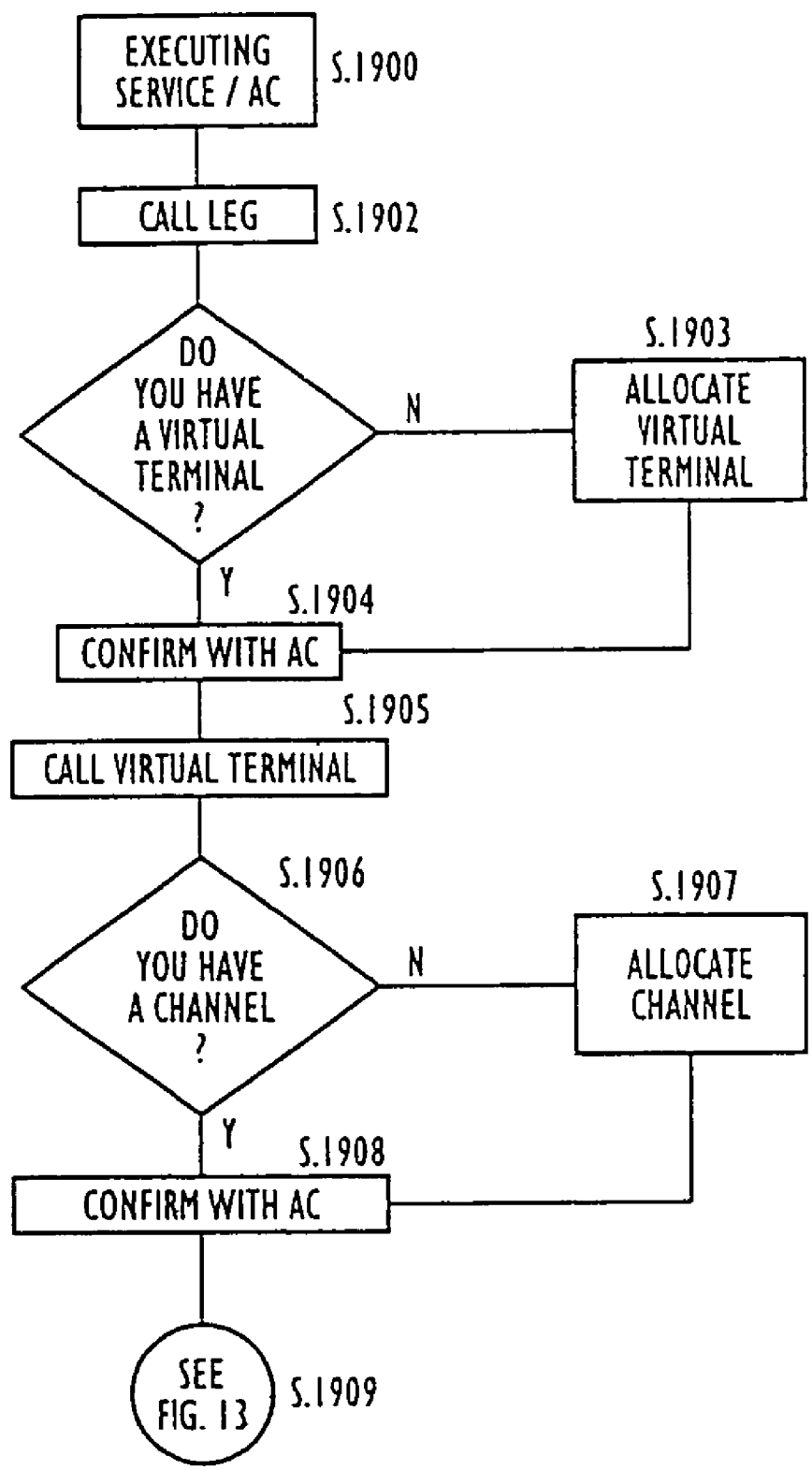
FIG. 19 is a flow chart representing the steps that may be performed in completing a terminating side on the call processing software right before a call is actually placed on the network.

FIG. 19 is a general diagram of how generic call components are added or accessed by the service. The remaining generic call components for the terminating side, e.g., OtgVT, OtgVChannel, and OtgLR, may be created by the service, as needed, in a like manner. In the figure, the service is executing an AC for making the call. The AC asks (s.1900) the reference leg, e.g., OtgLeg, (s.1902) if it has an associated virtual terminal. Since it does not, (s.1903) OtgLeg will respond that it does not, and the AC will have OtgLeg allocate a virtual terminal, e.g., OtgVT. OtgLeg will then (s.1904) confirm the allocation to the AC. Likewise, (s.1905) the AC will call OtgVT to (s.1906) inquire whether has a channel, and (s.1907) if not, direct it to allocate one, e.g., OtgVChannel. The allocation will be (s.1908) confirmed by OtgVT. Finally, (s.1909) the service running will require certain capabilities to provide the desired service. As discussed with regard to FIG. 13, the channel receiving the capability request, e.g., OtgVChannel, will allocate the appropriate logical resources to enable the service to perform its desired functionality. The method of FIG. 19 could also be used, for example, for adding a new path to an existing session, because the present channel cannot transmit along medium now additionally desired by the service.

G. Data Provisioning

Each service uses a set of data as it executes, including subscriber data. This data is input by a process called provisioning. More specifically, the data includes data on a per-subscriber basis, referred to as subscriber data, and data that applies to all subscribers, which may be referred to as system data.

A service executing on the flexible network platform may be provided with a data model, i.e., a model representing the way it expects to see certain data elements, including the subscriber data and the system data. Provisioning places such data into the system in accordance with the data model.

Whenever a new service is developed, a provisioning application will typically be developed. The provisioning application comprises a user interface, a data model component, and a communications component. In order to reduce the time needed to develop a new provisioning application, it is desired that various parts of the provisioning application be standardized so that it may be re-used. Accordingly, it is desired that the communications code be re-used, i.e., standardized. In addition, it would be beneficial if the data model component of the provisioning application could be standardized so it could be re-used. It is not an easy task to standardize the data model component, since the data model typically needs to be changed for each service. For example, in prior provisioning application systems, if one service needs paging information and another service does not need paging information, the data model will need to be changed. In any event, even if the data model and the communications component were configured so they would not need to be changed for each new provisioning application, there still need to be changes in the user interface.

In one aspect of the present invention, a provisioning application base is provided, which comprises both a standardized data model component and a standardized communications component. FIG. 27 shows the relationship between a provisioning system 132 and a service platform 130. Service platform 130 is shown as having service logic 134, and a service data model having data objects 136. Service platform 130 is coupled to provisioning application 132 via a transmission medium 138, which may be any appropriate transmission medium. User interface software 140 is provided within provisioning system 132, and is connected to a data model component 142, as well a communications component 144. User interface 140 is coupled to data model 142 and communications component 144 via an applications program interface (API) 148. API 148, data model 142 and communications component 144 together form what is known as a provisioning application base 146, i.e., portions of the provisioning system which have a standardized structure and can be re-used when introducing new provisioning applications.

The provisioning application base is standardized because it does not have any service-specific models built into it, and can hence support provisioning applications for any services.

Referring to FIG. 27, the upper layer of the software (user interface 140) depicted in provisioning system 132 may be called the provisioning application layer, and can be either graphical or text-based.

Provisioning base 146 sends and retrieves data to and from platform 130 with the use of communications component 144. Provisioning base 146 further stores data within a data repository provided by data model component 142. Such data may be accessed by a provisioner using user interface 140 in order to edit provisioning data. Provisioning base 146 also has an API 148 to application user interface 140 in order to allow user interface 140 to get and set data in the repository of data model 142, and further provides an API 148 to user interface 140 to allow a provisioner to control the sending and retrieving of data by communications component 144 to and from platform 130.

User interface 140 may present service specific screens, templates, or prompts to the user so that the user may view and edit data. In addition, user interface 140 may instruct provisioning base 146 via API 148 to retrieve data so that user interface 140 may present that data to the provisioner for modification. User interface 140 may further instruct provisioning base 146, via API 148, to send data to platform 130 that this application has modified. User interface 140 may modify data that is stored within data model 142 by using an API call. Another function of user interface 140 may be to enforce proper semantic relationships between data elements.

Provisioning base 146 is standardized by creating a service data model used by platform 132 which is made up of a set of types of data object structures. The data object structures are then combined in different ways in order to gather service data. In other words, services data structures or models are built using certain combinations of the set of data object structures. The data model component 142 within provisioning system 132 is configured in accordance with the overall set of types of data object structures that will be utilized by platform 130. Data model 142 is configured to handle each data object structure within the set on a per-data-object basis, and does not need to respond in any unique manner to different combinations of data object structures in accordance with a particular service. Accordingly, data model 142 can be standardized so that it contains no service-specific knowledge, and requires changes only when a new data object is introduced or an existing data object is modified.

User interface 140 allows service specific applications to be developed for each service. Such service specific applications can be developed using any development environment that is appropriate for the target platform and that is capable of making API calls to provisioning base 146.

User interface 140 should be configured so that it knows which data objects are needed for a particular service provided by platform 130. For example, suppose there is data within platform 130 that is stored in accordance with a particular service data model, and provisioning system 132 is to be used to change that data in accordance with a provisioning application that already has been built. Since user interface 140 already knows which data objects need to be pulled from platform 130, it can call such data objects by using a function call utilizing keys for the objects that it wants, each key indicating the particular object that it wants. An API call is made to communications component 144 to send a request to platform 130 with a list of keys to particular data objects that are wanted. The platform 130 will look up and retrieve the appropriate data objects and send them back via transmission medium 138 in the form of a provisioning protocol representation.

The provisioning protocol allows the data objects to be easily sent over transmission medium 138. The provisioning protocol entails encoding, in ASCII format, the data objects and transferring them in a serial fashion.

Provisioning system 132 then reads the protocol utilizing communication components 144, and recreates the objects in memory on the provisioning side.

In the provisioning system illustrated in FIG. 27, there are only a fixed number of data types which have a certain defined structure. In addition, the data model component deals with each data type in the same way each time a data object type is dealt with. Moreover, the encoded data object types can be transmitted and then recreated on the provisioning side 132, or may be transmitted back to platform 132 and retrieved on that side.

The API (application program interface) comprises a set of functions by which the user interface 140 can act on the database, i.e., by performing functions such as putting data within a repository of data model component 142, extracting data from the data repository, and communicating with platform 130 via communications component 144.

User interface 140 is the component of provisioning application 132 that knows which objects are in the data model.

Provisioning base 146 may be implemented in C++ on a PC computer. API 148 may be implemented, e.g., with a shared library or a dynamic link library (DLL), and API 148 may comprise functions exported by the DLL. User interface 140 may be written in an appropriate development environment, such as a PC development environment capable of making DLL calls. Examples include Borland C++, Microsoft Visual C++, Digitalk Small Talk/V, Microsoft Visual Basic, and Microsoft Access.

The basic data structure/data model of provisioning base 146 includes two main types of application layer data, including service data and virtual user data. Both of these types of data are modifiable by user interface 140. In accordance with a particular embodiment, only one abstract data type is provided that holds virtual user data, and that is called a virtual user object. There are several abstract data types that may contain service data, including data types for class data objects called case, collect digits, initialize, MLR, page, play announcement, play collect, record message, screening, and TOD (time of day).

The data for a particular service may consist of an arbitrary number of objects, in any particular combination of these types of objects. These objects may be stored in the platform and may be accessed via the provisioning interface which is formed by transmission medium 148 and the provisioning protocol described above. The objects may be accessed via keys. The key for a particular service data object may include information such as user ID, graph ID and data number. The key for a particular virtual user object may be indicated by a user ID. The keys are used when a provisioning system 132 sends and retrieves data to and from platform 130.

When provisioning base 146 retrieves objects from platform 130, it does so at the request of user interface 140. Typically user interface 140 will request that all data objects corresponding to a particular service and user be retrieved at one time. When those data objects are returned to the provisioning base 146, they are available to user interface 140 for display and editing.

Each service data type/data object may be formed with a hierarchal tree structure so that the data organization in the provisioning base 146 which forms data model component 142 can be thought of as a forest of object trees. Each root object is associated with its key (which may also be referred to as a label). User interface 140 can obtain and set data within data objects by referencing them in API calls referring to their labels.

API function calls may be provided in four general categories, including configuration, communications, access and data positioning. Configuration API calls are used to set provisioning base parameters that affect subsequent API calls. Communications API functions are used to tell provisioning base 146 to send or retrieve data to or from a platform 130. Access functions are used by user interface 140 to get and set data in data model component 142, and thus are used to get and set data without the need to transmit data between provisioning system 132 and platform 130. Data positioning functions are used to set the context for subsequent API calls.

User interface 140 may reference objects in the provisioning base data model component 142 in many different ways. In accordance with one particular referencing mechanism, provisioning base 146 may keep a pointer (referred to as a DP) to a "current" data object. Access and data positioning API calls may implicitly act on the object pointed to by DP. For example, if DP points to a screening object, an API call (e.g., get entry list) will get the network address list and the screening object pointed to by DP. In order to utilize this referencing technique, a collection of API calls may be provided which allows user interface 140 to "move" DP within data model 142.

User interface 140 may include a graphical user interface (GUI) application provided within an upper layer of provisioning system 132. An example of such a GUI application will now be described. This example is not intended to limit the type of user interface 140 that may be provided within provisioning system 132. Once the service is designed, a specification, including a particular set of data objects, is formed that constitutes the data to be used by the service. That data is formed in accordance with semantic rules for relaying the data elements and information regarding default of data values, if there are any. User interface 140 will preferably be implemented so that it can create a complete set of data required by a new subscriber which is new to a particular service, and can edit existing data for current subscribers.

There are four basic types of actions that a user needs to perform when driving a provisioning application. Those actions include the initiation of actions (e.g., with the use of buttons), the editing of text strings (which may be done with the use of a text edit box), the editing of lists (which may be done with an editable list control), and the setting of options (e.g., with check boxes). A typical provisioning application may only need these standard controls in order to perform its provisioning functions. The user interface may be designed to have a common service unit ID which may be used as part of a key to request data object trees. Such a service unit ID may be hard-coded into the application so that it does not need to be supplied by the user every time a new provisioning application is created. The screens may be designed so that they project some type of view of the data objects belonging to the service, so the set of data numbers which are also part of the key to request data will be hard-coded into the created application. The only variable information used in requesting service data from the platform is the user ID.

After issuing a retrieve operation, assuming the retrieve was successful, user interface 140 may assume that the data now resides in the data model components 142 and is available for access via API 148. User interface 140 may now use API 148 to request data strings necessary to fill its lists, text boxes and check boxes. When this is completed, user interface 140 may relinquish control and wait for user input. After changes are made to the data, user interface 140 may make API calls in order to update data model component 142.

Eventually, a send operation will be requested by the provisioner, at which time provisioning base 146 will determine which objects have been modified, and will create and send a protocol string to platform 130 in order to update the modified data within platform 130.

If data for a particular subscriber that is new to the service is created, the provisioning application may use API 148 in order to clear out the existing data in the provisioning base data model component 142, and build "from scratch" using API 148 the minimum data objects trees required by the service and send them to platform 130. This must be done because platform 130 does not store any form or template for a particular service.

User interface 140 may be designed in a manner different to that described above. For example, user interface 140 may be designed so that the service provider can perform service provisioning together with data management. This would be allowed by provisioning base 146 since it is generic enough to allow any number of a variety of application views into the platform data. Moreover, provisioning base 146 does not have to be the only layer below the application software. The application, which includes user interface 140, may manage data, some of which is held within platform 130, and some of which may be held in other databases. The application software may be designed to present an integrated view, and interact with the appropriate databases as needed.

FIGS. 28A-28K illustrate various types of data objects that may together form a data model for a platform 130 such as that shown in FIG. 27. The various data objects illustrated in those Figures include two sets, a first set comprising service data objects, and the second set comprising a virtual user data object. The second set, a virtual user data object, shown in FIG. 28K.

Various instances of each of these provisioning objects illustrated in these various figures are stored by provisioning base 146, within a data model repository provided within data model component 142, as shown in FIG. 27. Each instance of a particular provisioning object is referred to by a key. A key for a service data object includes information such as a platform ID, a user ID, a service unit ID, and a data number. The virtual user data object is identified by a key including information such as a platform ID and a user ID. The user interface portion of provisioning system 132 may get and set various portions of the various data objects by using API calls provided within API interface 148 of the provisioning system 132 as shown in FIG. 27. In order to access these various portions of the data objects, a pointer (which may be referred to as data pointer—DP) is kept at a particular node of each data object. User interface 140 may then move the pointer (DP) using an API call to another node within each data object.

Each of the data objects shown in FIGS. 28A-28K includes a plurality of nodes which form a data object. Rectangles with rounded corners represent nodes to which a DP can be pointed. Rectangles with nodes which are in the form of a rectangle represent atomic nodes, and therefore have no structure within or below them. These nodes represent basic data types. Dashed rectangles indicate where a set of nodes may be accessed by a single API get call when the DP is pointed to the root node of the database object. This allows an API call to access data from particular nodes within the hierarchy of each database object.

Referring back to FIG. 27, when user interface 140 of provisioning system 132 uses a get command to get a complete list, it will then add, delete and/or modify data within that list. As such information is added, deleted or modified, user interface 140 will invoke an API call to dispatch the corresponding entity in the data model. However, when this is performed, user interface 140 preferably does not store its own copy of the data, modify the same as the user edits the data, and then sends the revised data back to the data repository. Rather, user interface 140 will modify data within provisioning base 146 directly, as the user makes changes on the screen. If certain data is not modified at all, it is only used to fill in the fields of user interface 140 and is then discarded. That is, non-changed data will not be re-sent to the data repository within provisioning base 146 when the data is returned on execution of a get call.

Figure 28A:
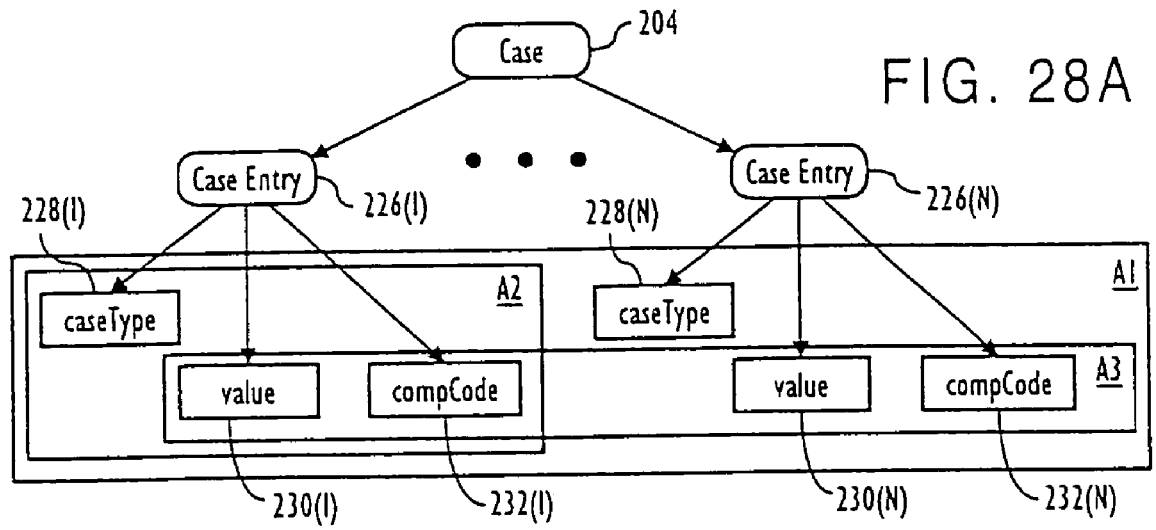
FIGS. 28A-28K are block diagrams representing several different types of database objects that may be used to represent provisioning data in a persistent manner in the flexible network platform.

FIG. 28A illustrates a case database object 204 which is used for storing case labels utilized by service logic units of the network platform of the present invention. Case database objects 204 include the following fields: case type, value, and completion code. Each case database object 204 comprises one or more case entries 226(1)-226(N). Each case entry comprises a plurality of nodes/fields, including a case type field 228(n), a value field 230(n), and a completion code field 232(n). The case type field may include information in the form of a short that specifies how the contents of the value field 230(n) are to be interpreted. A case type field 228(n) may include a numerical value, e.g., 1 representing a long, and 2 representing a network address. Each value field 230(n) is a character containing a string representation of the case label to which this record corresponds. By way of example, the character string "123" represents the case label 123. The completion code field 232(n) may be a short whose value is the completion code that is to be returned when a parameter that matches the value within the value field is passed to an AC that has been passed this particular case database object 204 as an entry in a case data list object. Each of the dashed rectangles A1-A3 indicates sets of data items that may be accessed via a single API get call when a data pointer is directed to the root node of case database object 204. Dashed rectangle A1 represents a get entry list call which causes the complete list to be retrieved for use by user interface 140, including the case type, value type, and completion code for each case entry 226(1)-226(N) of case database object 204. Dashed rectangle A2 represents a get entry API get call, which will provide all of the fields of a particular entry to user interface 140. Dashed rectangle A3 represents an API get call which provides all of the values 230(1)-230(N) and completion codes 232(1)-232(N) of the case entries 226(1)-226(n) to user interface 140.

Figure 28B:
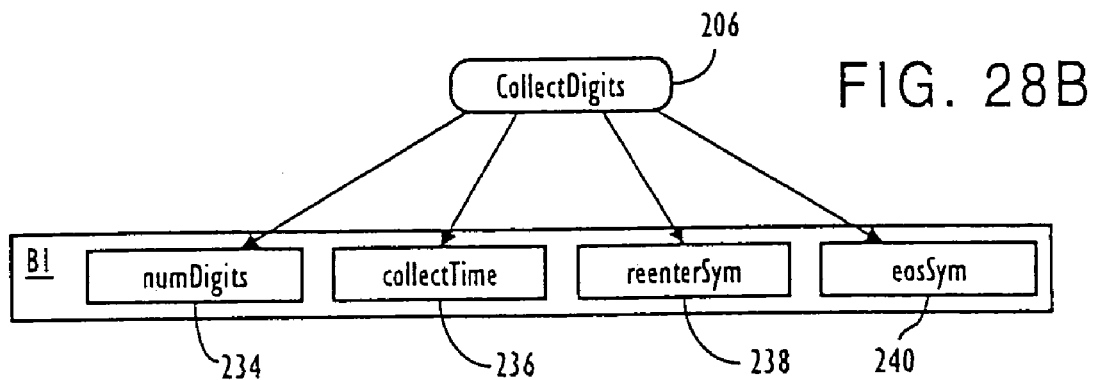

FIG. 28B represents a collect digits database object 206, including a number of digit field 234, a collect time field 236, a re-enter symbol field 238, and an eos symbol field 240. A dashed rectangle D1 is shown as encompassing all of these children nodes, and represents an API get call which allows user 140 to get all of the collect digits data, including each of the fields 234, 236, 238, and 240.

Number of digits field 234 represents a short whose value is the maximum number of digits to be collected by a particular service component (i.e., an AC) to which the data is passed. Collect time field 236 represents a short whose value represents the number of seconds allowed for the collection of the digits. Re-enter symbol field 238 is a character whose value is the key pad character (e.g., *) that may be entered to throw away any digits already selected and to start collection over again. The field may be left empty. The eos symbol field 240 represents a character whose value is the key pad character (e.g., #) that may be entered to terminate collection before expiration of the amount of time specified by collect time field 236. This field may be left empty as well.

Figure 28C:
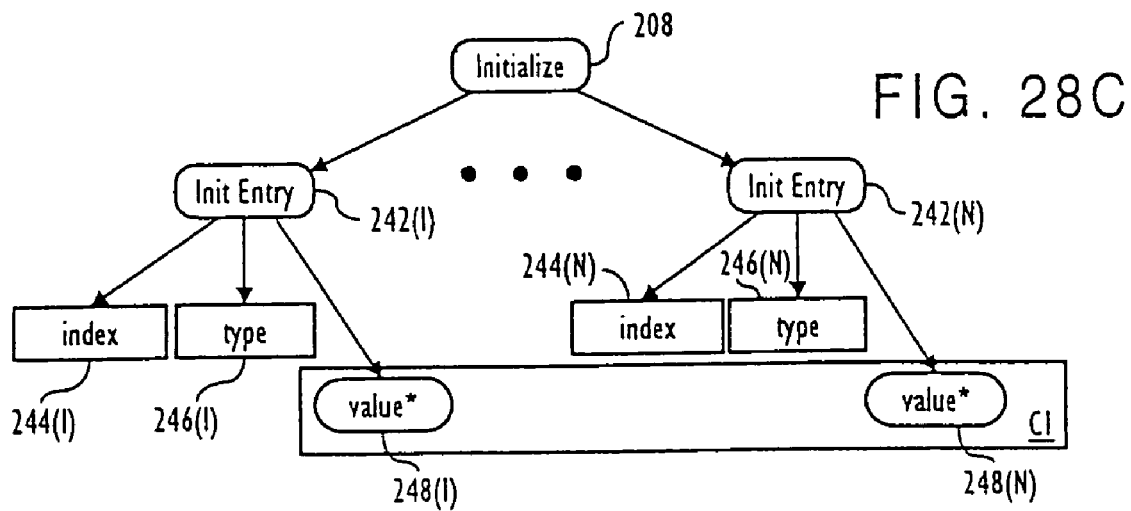

FIG. 28C represents an initialize database object 208, having a plurality of initialized entries 242(1)-242(N). For each initialize entry 242(n), there is an index field 244(n), a type field 246(n), and a value field 248(n). The index field 244(n) represents an entry number which is a short that uniquely identifies the initialize entry object of which it is a member. Each type field 246(n) represents a short that specifies how the data in the value field 248(n) is to be interpreted. Some example values that may be placed within the type field 246(n) include integer values such as 1 (representing a long), 2 (representing a network address), 3 (representing a database pointer), and 4 (representing a string). The value field 248(n) is a character field containing a string representation of data (e.g., "123" represents the integer 123).

The initialize database object 208 may be stored as a sparse array. Unlike the case database object 204 (where each item must have the same type), all of the initialize entries 242(n) of an initialize database object 208 need not be of the same type. It is noted that each of the value fields 248(n), represented by a rectangle having rounded corners, may serve as a root node for another data object, including another initialize database object 204. A dashed rectangle C1 is shown around each of the value fields 248(n), and represents an API get call for getting the value list. This API get call may be limited so that it is valid only if all of the initialize entries have the same type as represented in the type field 246(*n*), and if that type is either a long, a network address, or a character string.

Figure 28D:
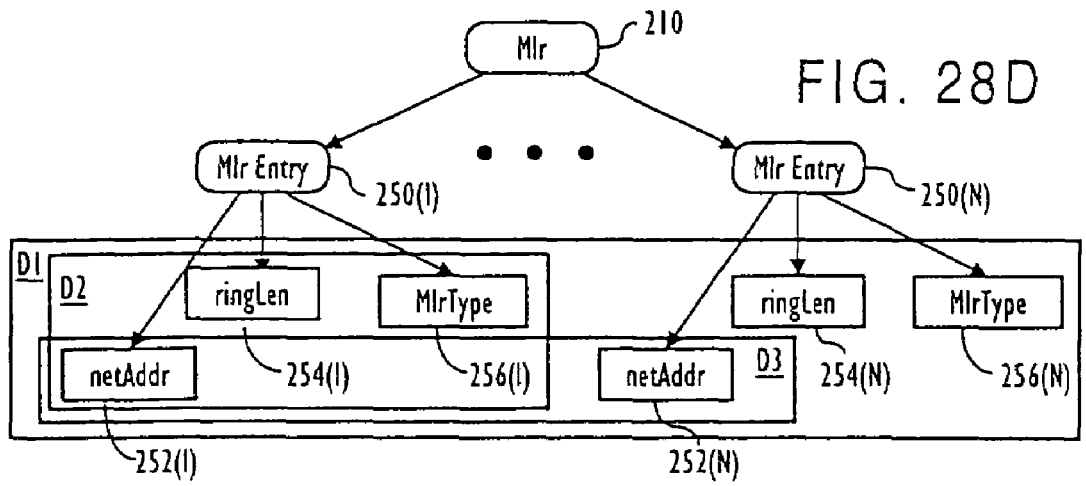

FIG. 28D illustrates an MLR database object 210. A plurality of MLR entries 250(1)-250(N) are provided within the MLR database object 210. Each MLR entry 250(*n*) has a plurality of fields, including a network address field 252(*n*), a ring length field 254(*n*), and an MLR type field 256(*n*). Each network address field 252(*n*) is a string containing a directory number called by a service corresponding to the MLR object or MLR service component (i.e., AC). A ring length field 254(*n*) is a short representing the amount of time the network address is to be rung before assuming that there is no answer. An MLR type field 256(*n*) is a character field that may be used for any purpose.

A service component (AC) that may accept a database pointer to an MLR database object 210 may be the MLR AC, which simultaneously offers calls to all network addresses in the MLR database object 210. If the MLR list within the MLR database object 210 is empty, the MLR AC will exit with a completion code "MLR no answer."

Figures 28E, 28F:
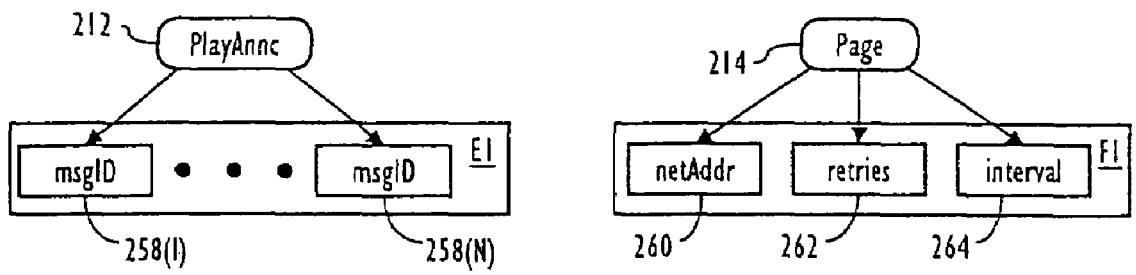

FIG. 28E illustrates a play announce database object 212, having a plurality (1-N) of message ID fields 258(*n*). All the message ID fields 258(*n*) may be provided to the user interface 140 of provisioning application by using an API get call represented by a dashed rectangle E1 as shown in FIG. 28E.

Message ID fields 258(*n*) may be arranged in the form of an array of N shorts, each representing a single message ID. The message IDs may identify recorded messages that may be played by an AC in the order in which their IDs appear within the array.

FIG. 28F illustrates a page database object 214, which includes a network address field 260, a retries field 262 and an interval field 264. Each of these fields may be provided to the provisioning user interface 140 by the use of an API get call, as represented by the dashed rectangle F1. The network address field 260 may be in the form of a string containing a directory number to be called by a page AC. The page retries field 262 is provided in the event that if a pager does not answer, the service may try to page again. Accordingly, this field is a short that specifies the maximum number of such attempts. The page interval field 264 may be a short whose value is the number of seconds to wait between page retries.

Figure 28G:
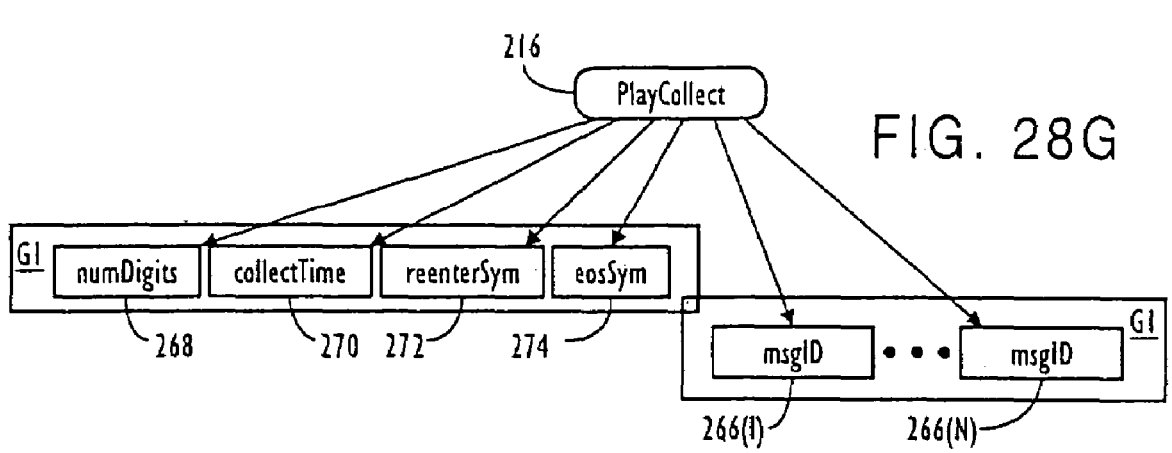

FIG. 28G illustrates a play collect database object 216. The play collect database object 216 includes a plurality of message ID fields 266(*n*) that may be similar in structure and content to the message ID fields 258(*n*) provided in the play announce database object 212 as shown in FIG. 28E. In addition, play collect database object 216 may include fields such as a number of digits field 268, a collect time field 270, a re-enter symbol field 272, and an eos symbol field 274. The number of digits field 268 may be in the form of a short whose value is the maximum number of digits to be collected by an AC to which the data is passed. Collect time field 270 may represent a short whose value is the amount of time allowed for collection of the digits. Re-enter symbol field 272 may be a character whose value is the keyboard character (e.g., *) that may be entered to throw away any digits already collected and start collection over again. This value may be left empty. The eos symbol field 274 may be a character whose value is the key pad character (e.g., #) that may be entered to terminate collection before expiration of the amount of time indicated in collect time field 270. Each of the fields 268, 270, 272, and 274 may be collected together as indicated by dashed rectangle G1 which represents an API get call that may be called by user interface 140 of the provisioning system. The complete list of message IDs 266(*n*) may be called by an API get call as indicated by the dashed rectangle G2.

Figure 28H:
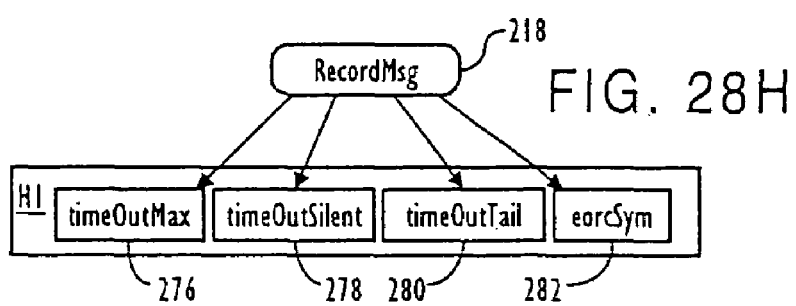

FIG. 28H illustrates a record message database object 218. This database object includes a time out max field 276, a time out silent field 278, a time out tail field 280, and an eorc symbol field 282. Time out max field 276 may be a short whose value is the amount of time allowed for a voice message recording session. Time out silent field 278 may be a short whose value is the amount of time allowed for a silent period after a recording session is activated. Time out tail field 280 may be a short whose value is the amount of time allowed for a silent period after a voice message or part of a voice message is recorded and before expiration of the value indicated in the time out max field. The eorc symbol field 282 is a character whose value is a key pad character (e.g., #) that may be entered to terminate a voice recording before expiration of the amount of time indicated in the time out max field 276.

Each of these fields may be called together by using an API get call as indicated by dashed rectangle H1.

Figure 28I:
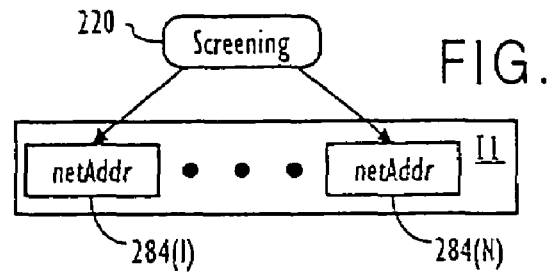

FIG. 28I illustrates a screening database object 220. This database object includes a plurality of network address fields 284 which may be in the form of an array. Each network address field 284(*n*) may be a string containing a directory number against which calls are to be screened. A dashed rectangle I1 represents that an API get call may be utilized to provide the data for all of the network address fields 284(1)-284(N) of a particular screening database object 220 to the user interface 140 of the provisioning system 132 as shown in FIG. 27.

Figure 28J:
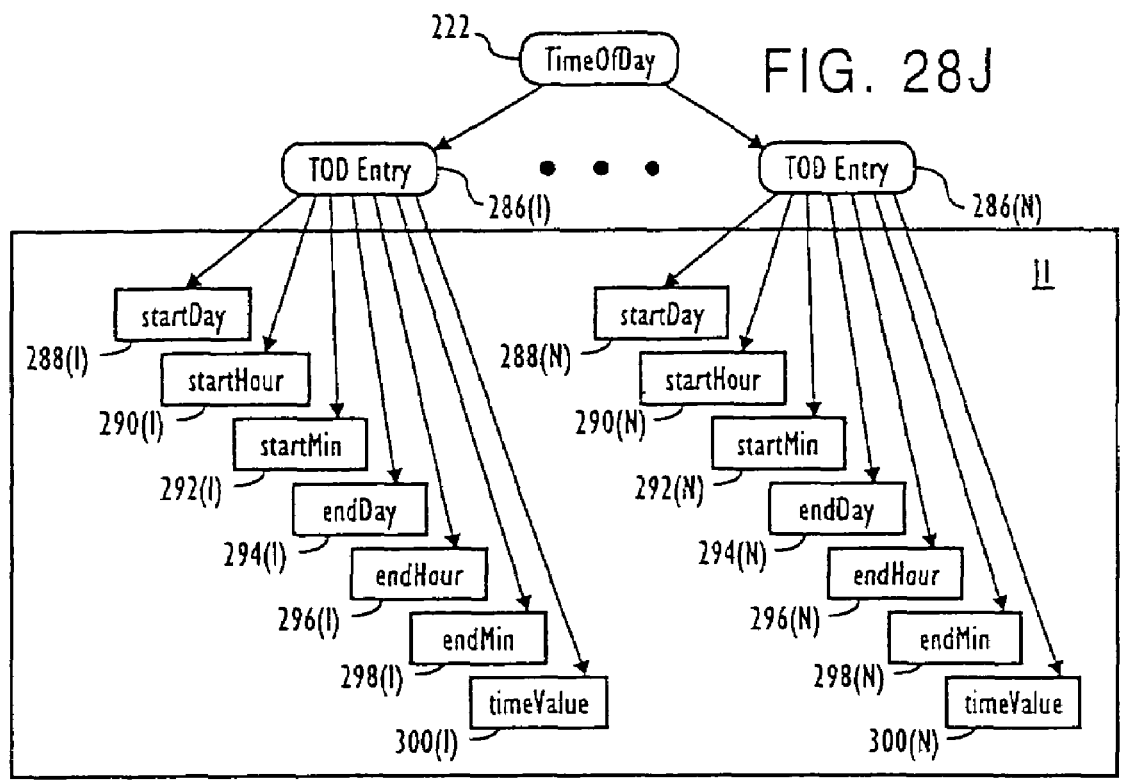

FIG. 28J illustrates a time of day database object 222. Each time of day database object 222 may have a plurality of time of day entries 286(1)-286(N). Each time of day entry 286(*n*) may be provided with a plurality of child nodes/fields, including a start day field 288(*n*), a start hour field 290(*n*), a start minute field 292(*n*), an end day field 294(*n*), an end hour field 296(*n*), an end minute field 298(*n*), and a time value field 300(*n*). Start day field 288(*n*) may be a short integer representing a particular day in the week. Each start hour field 290(*n*) may be a short representing a starting hour, i.e., a starting hour variable which may be indicated by a portion of the platform software that calls this database object. Start minute field 292(*n*) may be a short integer representing a starting minute. End day field 294(*n*) may be a short integer representing the particular day of the week as an end variable. End hour field 296(*n*) may be a short representing an ending hour; end minute field 298(*n*) may be a short representing an ending minute in the form of an integer. Time value field 300(*n*) may be a short used to identify its time of day entry object 286(*n*).

An API get call may be provided which is accessible by the user interface of the provisioning system 132 as shown in FIG. 27, and that API get call may allow all entries to be provided to the user interface as indicated by dashed rectangle J1.

Figure 28K:
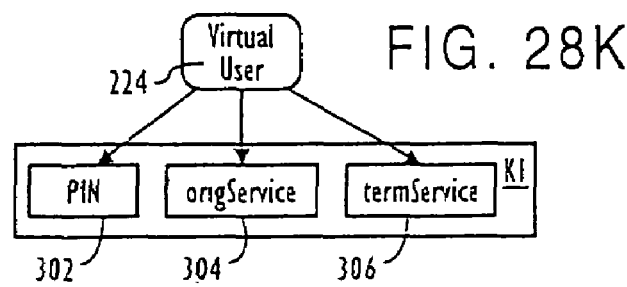

FIG. 28K represents a virtual user database object, which comprises virtual user data. The various fields provided within that database object include a PIN field 301, an originating service field 304 and a terminating service field 306. The originating service is a service that is to be executed whenever the identified user places an originating call. The terminating service field 306 may be a short representing a particular terminating service to be executed for the identified user.

Each of the above-described database objects, which include service data and virtual user data, may be called upon by various entities within a flexible network platform software 60, e.g., as shown in FIG. 7. However, these particular database object structures are exemplary, and are not intended to limit the structures of the database objects that may be utilized in a provisioning system in connection with a flexible network platform.

H. The Platform OAM&P Software System

Figure 24:
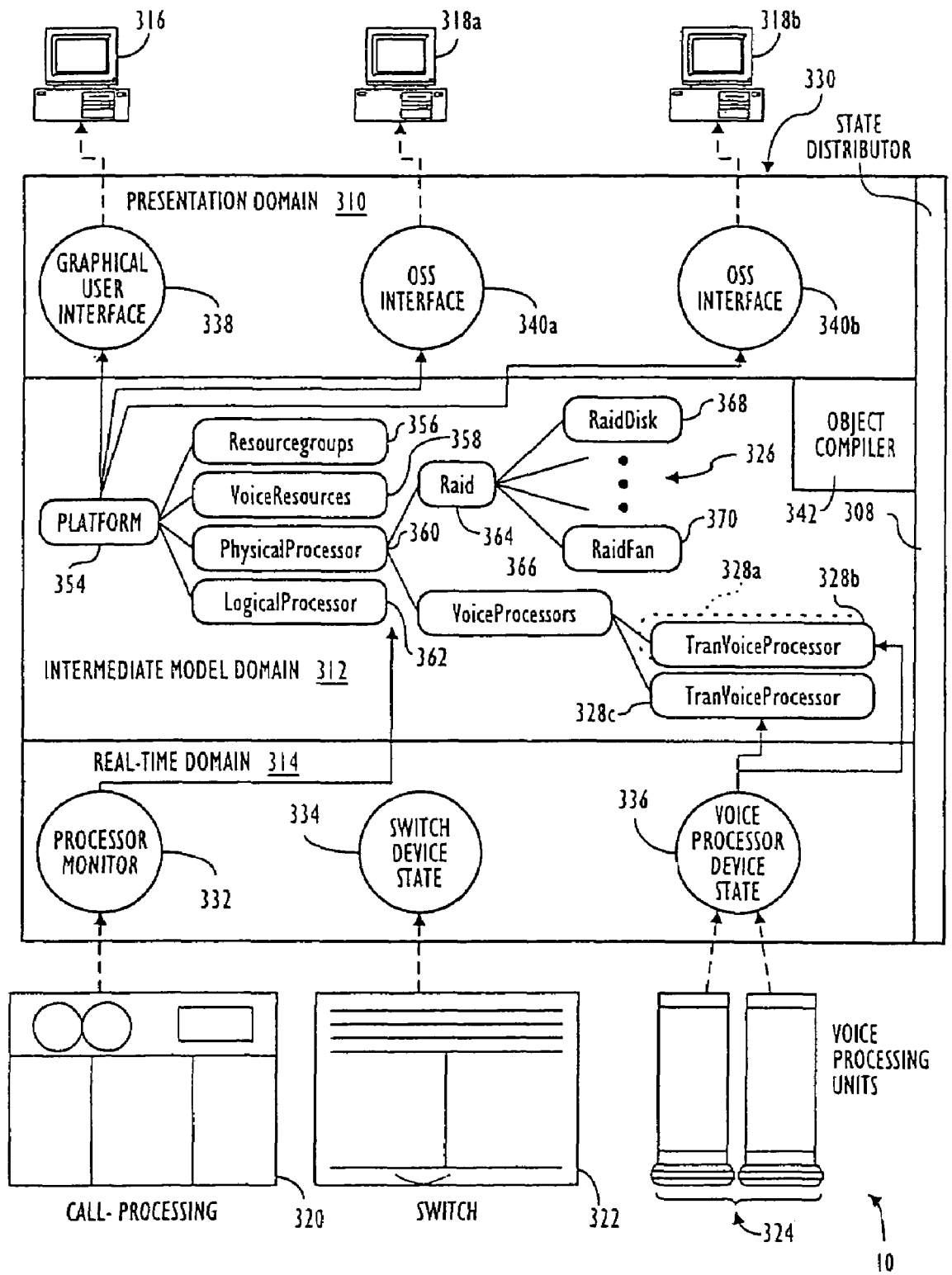
FIG. 24 is a general block diagram of the OAM&P portion of a flexible network platform.

FIG. 24 illustrates a flexible network platform 10 including a host computer complex 22 and several items connected thereto, including a call processing system 320, a switch 322, a voice processing unit 324, a graphic user interface (GUI) 316, and a plurality of operations support systems 318a, 318b. Call processing system 320 may be provided within the same host computer as the platform OAM&P software system 330.

Platform OAM&P software 330 is shown as comprising a state distributor 308, a presentation domain 310, an intermediate model domain 312, and a real-time domain 314. Presentation domain 310, intermediate model domain 312, and real-time domain 314 together form a managed object information engine. The managed object information engine is produced, in part, by a managed object compiler 342. OAM&P subsystem 330 has three different execution domains, which are indicated as presentation domain 310, intermediate model domain 312, and real-time domain 314. Real-time domain 314 comprises those components of the system which directly support call processing, indicated by call processing system 320, as well as OAM&P specific object which interact in real time with call control objects which form part of call processing system 320. Such OAM&P specific objects may comprise external processes called "cloud" processes such as the processor monitor process 332, which monitors the state of call processing system 320, a switch device process 334 which keeps track of the state of switch 322, and a voice processor device state process 336 which keeps track of the state of voice processing units 324.

Presentation domain 310 comprises applications that are used to present the objects in the intermediate model domain 312 to an external system, which may be a graphical user interface 316, or an operations support system 318a, 318b, e.g., a Bellcore NMA system.

Intermediate model domain 312 comprises managed objects 326 and transient objects 328, which together form a managed object hierarchy. Managed objects 326 (as well as transient objects 328) comprise object representations of objects existing in the real-time domain 314 and logical groupings of those objects.

State distributor 308 is a communication mechanism for simultaneously informing multiple processes of changes in the states of various aspects of a system. States may be represented by objects called bound variables which can take on as a "value" any of a large set of supported types, including basic types, instances of other classes and arrays or lists of basic types or objects. The processes may communicate via state distributor 308, and such processes may be classified as either state information servers or state information clients. A state information server will generate (i.e., report) a transition with a state distributor 308, and a state information client will register a transition with state distributor 308. State distributor 308 will then maintain a state history (indicating the present state) for every state information server of the system A state information server is any process which monitors or maintains a specified state. When the state changes, the state information server informs state distributor 308 of that change. This is done by generating a transition with state distributor 308.

A state information client is any process which initiates certain actions when notified of a change in the value of a specified state. For a process to become a state information client process for a specified state, it must register a transition with state distributor 308. In order to register a transition with state distributor 308, the state information client process will specify what event the client is registering for, and what function will be performed when a particular state changes. An example command for registering a transition could be as follows:

rT (platform, PH, *, summary)

It is possible for a process to be both a state information server and a state information client. Additionally, multiple processes can be registered for the same state transition.

A command rT(platform, PH, *, summary) may be indicated by a particular process in order to register a particular transition with that process, making that process an information client. The thing that is being registered for is a particular managed object or process (in this case, a managed object called "platform"), of a particular class (PH standing for physical class), of a particular instance (* indicating all instances of that particular class). The type of state information, i.e., the type of event being registered for, includes the summary state information. Accordingly, when a transition is registered for by a particular process, the process will indicate the process group, its class/type identifier, its instance identifier, and its name (i.e., type of event being registered for).

The command rT(*,*,*,summary) will register the present process to receive all of the summary states from all of the classes/types within each process group and instances of those classes/types. In this manner, all of the summary state information of all the managed objects will be presented to the process that has registered that transition.

The system may be implemented so that there is no persistence implemented in state distributor mechanism 308. When a particular state information server or state information client process terminates, all the registrations and current state information will be removed. This information needs to be rebuilt when the platform is booted up.

The presentation domain contains the application software including graphic user interface (GUI) software 338, and OSS interface application software 340a, 340b, which is used to present the objects that are present in intermediate model domain 312 to an external system, such as a GUI system 215 or an OSS system 318a, 318b.

OAM&P subsystem 330 is formed with a managed object hierarchy. All of the managed objects 326, 328 which are present in intermediate model domain 312 share certain key characteristics which enable them to create an extremely flexible model. An object compiler 342 is provided for creating executable code for each managed object in order to allow a developer to concentrate on the managed objects rather than the environment in which they are created. State distributor 308 is used for inter-object communication, and thus provides distribution capabilities as well as "virtually synchronous" updates to all objects using a particular state, i.e., registered to receive a particular state as a state information client.

While each managed object 326 models a different aspect of the whole system, they each contain characteristics common to all managed objects. Each object has a set of input states that it receives from state distributor 308, a set of output states that it sends to state distributor 308, and a set of functions that it will perform. In addition, each managed object will contain a logic definition which will define the output states as a function of the input states to that managed object.

In other words, each managed object is created by specifying, among other things, its output states, its input states, a list of functions that it can perform, and a set of logic defining how its output states will be determined as a function of its input states. Once that information is specified in creating a particular managed object, managed object compiler 342 will generate code for each created object. The generated code will register that managed object with state distributor 308 for its input state, and will evaluate the new output state of the managed object based upon its input state. In addition, the generated code will generate, to state distributors 308 the object's output state transition, and will create answers to information requests the managed object may receive. That information will include the managed object's attributes (which include the output states, the input states, and the alarm factor of the managed object), sub-components (i.e., all of the other managed objects which are state information servers for one or more input states of the present managed object), and what the present managed object can do (i.e., the list of functions which this particular managed object can perform). Another type of code which is generated by managed object compiler 342 is code for performing the list of functions that the managed object can perform.

The functions that each managed object can perform will include at least three basic functions, i.e., the ability to respond to the three basic queries including: what are your attributes, what are your sub-components, and what can you do. Other functions may include the ability to cut off power to a component of the system corresponding to that managed object, and rebooting the complete platform system.

Each managed object may be configured so that it has a distinguished output state known as a summary state. This state may be used to describe the overall state of the managed object, e.g., information indicating the managed object as CLEAR, MINOR, MAJOR, CRITICAL, INITIALIZING, or UNKNOWN. Other information that may be included with the summary state is a list of "alarm factors." The alarm factors are the input states which caused the summary state to take on its current value. For example, if the input states of a certain object are file system 1, file system 2, and file system 3, and the state of file system 1 is 0% available, while the states of file system 2 and file system 3 are each 40% available, the summary state of the managed object may be MAJOR. The alarm factors would include file system 1 only, because file system 2 and file system 3 are not contributing to the summary state being MAJOR rather than CLEAR.

Each time the summary state of a managed object changes, it may be logged into a system log. By doing this, the system log can be searched to determine the state of the managed objects at a previous time.

FIG. 24 illustrates a particular example managed object hierarchy of managed objects 326 and 328. A root managed object 354 represents the overall platform, and has input states which are forwarded from the output states of managed objects corresponding to the resource group 356, voice resources 358, physical processor 360, and a logical processor 362.

Logical processor 362 has as its input state an output state of a processor monitor process 332 which is in real-time domain 314. Physical processor managed object 360 has input states which comprise an output state of a RAID managed object 364, and an output state of a voice processors managed object 366. RAID managed object 364 has input states which comprise output states of managed objects representing several RAID subsystems and components including a RAID disk managed object 368 and a RAID fan managed object 370.

Voice processors managed object 366 has as its input state output states of TranVoice processor transient objects 328. TranVoice processor managed objects 328 have as their input states output states from a voice processor monitor process 336, which is in real-time domain 314.

Figure 24A:
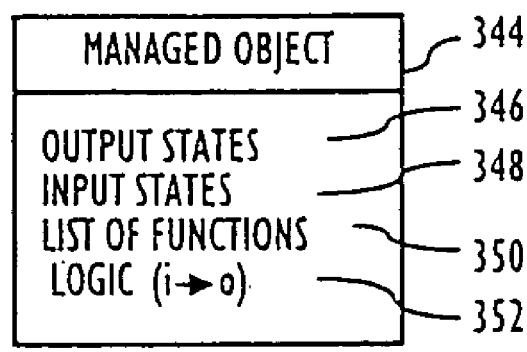
FIG. 24A illustrates a managed object.

FIG. 24A illustrates the general structure of an exemplary managed object 344 as it is described when it is built. Managed object 344 includes information such as output states 346, input states 348, a list of functions that it can perform 350, and logic 352 that it would perform in converting input states to output states. As noted above, managed object compiler 342 takes this information and generates code so that managed object 344 can perform all of its functions, register with the state distributor 308 for its input state, evaluate and determine its new output state(s), and generate to state distributor 308 output state transition(s).

Figure 24B:
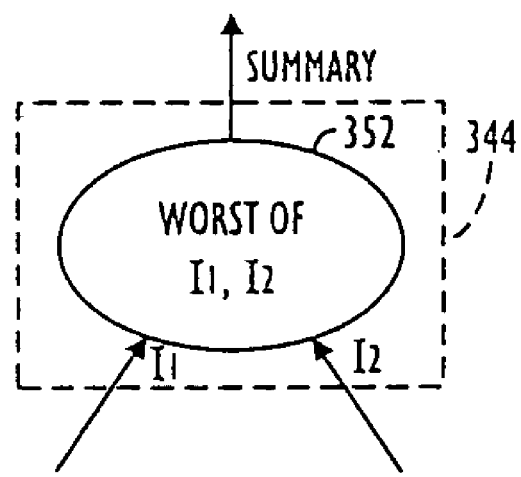
FIG. 24B illustrates a managed object in relation to its input and output states.

FIG. 24B gives a different view of the managed object 344 of FIG. 24A, graphically indicating its logic 352 and how it acts upon input states in order to determine an output state. The managed object 344 shown in FIG. 24B has two input states I1 and I2 and a single output state which is a summary state. In this case, the logic may be that the summary state indicates the worse of the summary states from the input states I1 and I2.

Figure 25:
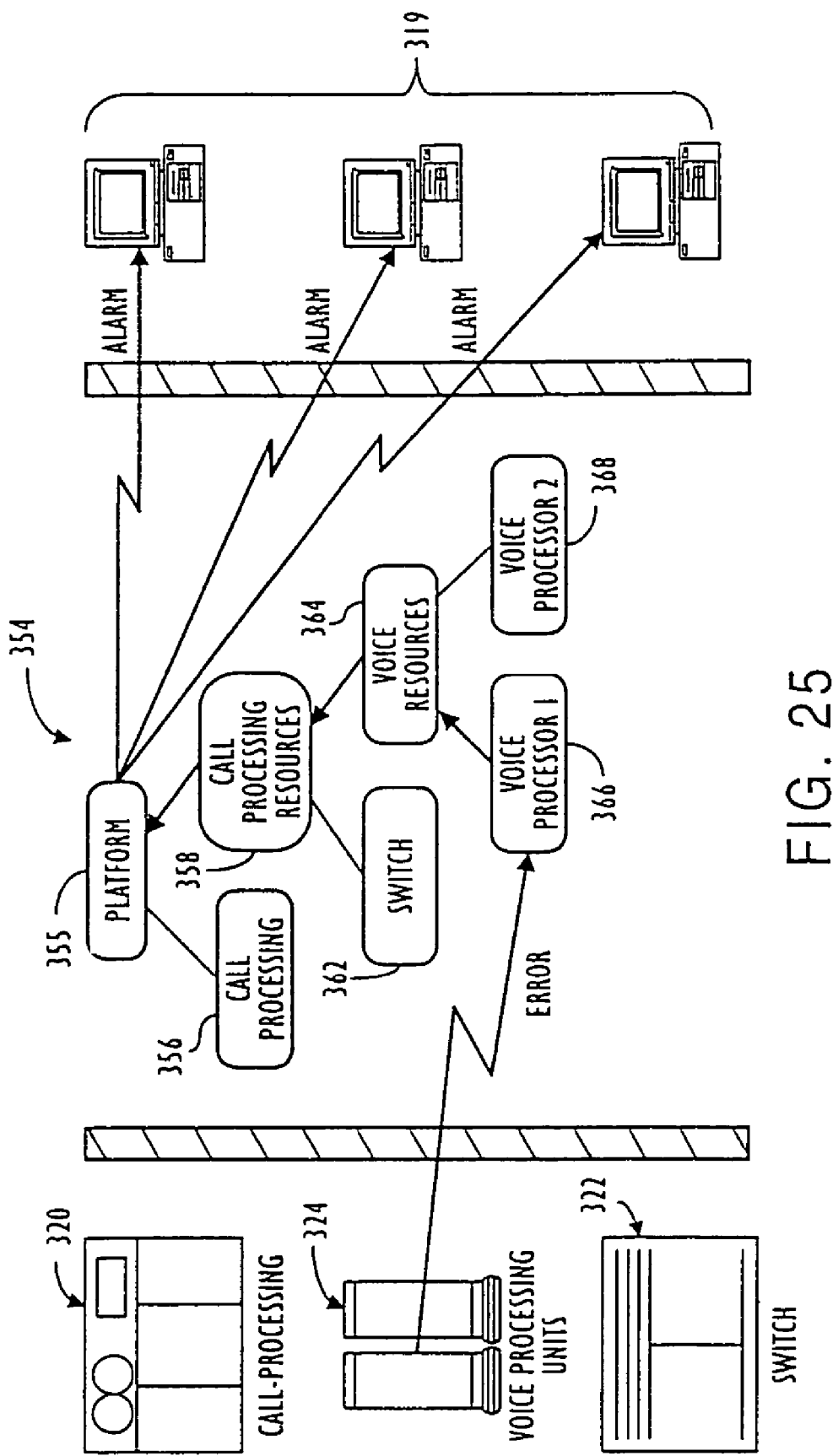
FIGS. 25 and 26 are graphic representations of various subsystems of the flexible network platform in relation to the managed object hierarchy of the OAM&P subsystem.

FIG. 25 illustrates the relationship between a managed object hierarchy 354 and various other components of a flexible platform, including a call processing system 320, voice processing units 324, and a switch 322, as well as a plurality of OAM&P work stations 319. Managed object hierarchy 354 comprises a plurality of managed objects arranged in a particular hierarchal form, including a root platform managed object 355. A call processing system managed object 356 and a call processing resource managed object 358 each have output states that form input states to platform managed object 355. Call processing resource managed object 358 has input state(s) which comprise the output states to a switch managed object 362 and a voice resources managed object 364. Voice resources managed object 364 has input states which comprise output states of a voice processor 1 managed object 366 and a voice processor 2 managed object 368. A process which monitors the activity of the voice processing units 324 is shown as indicating a current error state. That is detected by voice processor 1 managed object 366 since it has registered a transition as an information client for that particular state (or state information including such an error state). That information can be determined by a user using one of OAM&P workstations 319 in a number of ways.

An error condition is detected by a monitoring process (not shown) which monitors one or more states of voice processing units 324. That error condition is reported to the OAM&P sub-system by generating (i.e., reporting) a transition to the state distributor. Voice processor 1 object module 366 is then notified of the error state, since it has registered to receive the state of voice processing unit 324 via the state distributor. The output state of voice processor 1 managed object 366 will then change according to the change in its input state. That output state forms an input state of voice resources managed object 364, and accordingly will change its output state, which will in turn cause call processing resources managed object 358 and platform managed object 355 to change their respective output states. Accordingly, OAM&P work stations 319 can detect a change in the output state of platform managed object 355, indicating an alarm condition due to there being an error in voice processing units 324.

Figure 26:
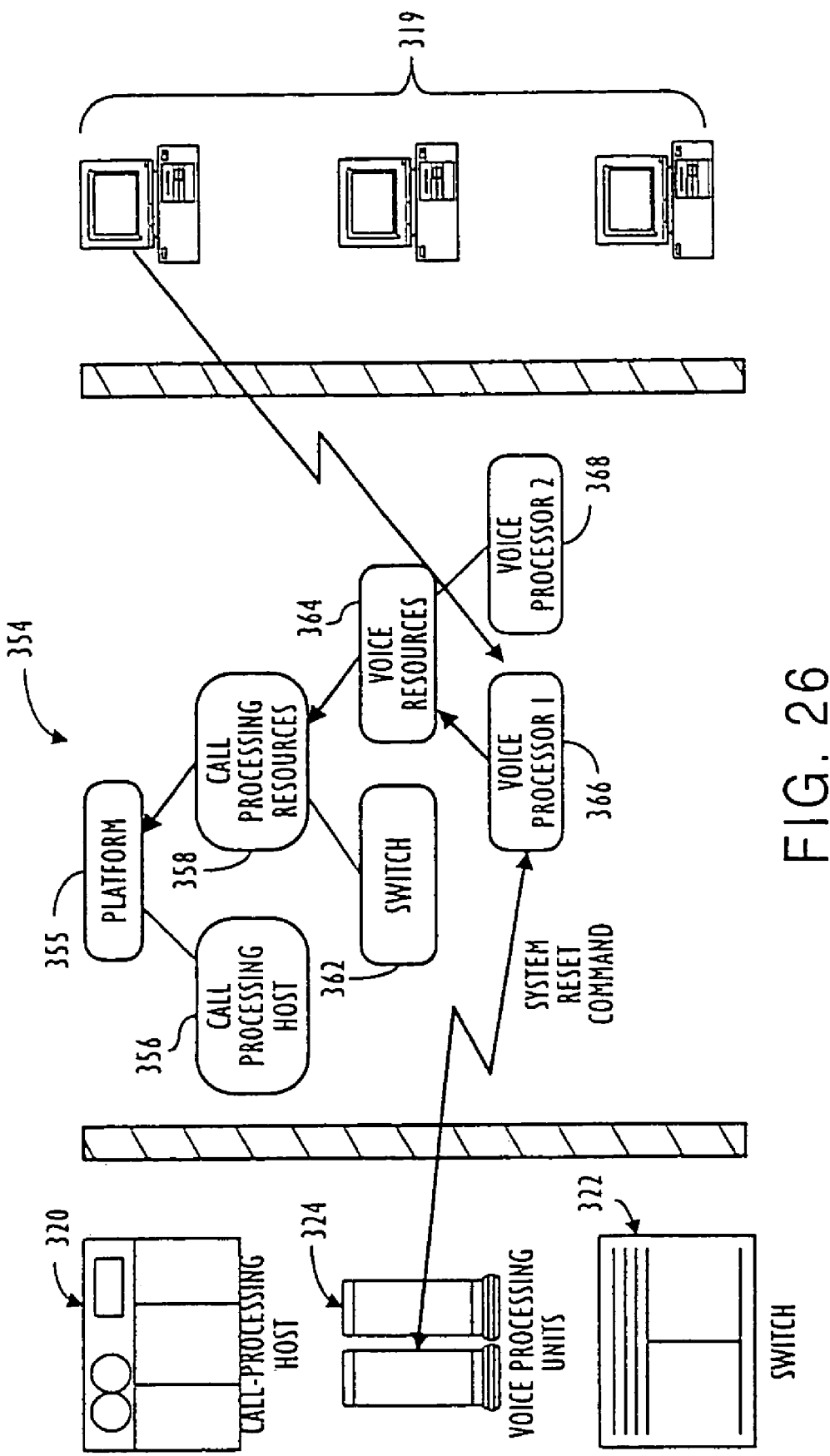

An OAM&P work station 319 may also directly view the attributes of a particular managed object. Therefore, OAM&P work station 319 may ask voice processor 1 managed object 366 about its attributes, sub-components, and functions that it can perform. The attributes of that managed object will include the output states, the input states, and alarm factor for that managed object. Accordingly, voice processor 1 managed object 366 may be viewed directly in order to determine that there is an error within voice processing units 324. That managed object may then have functions it can perform or that can be directly invoked by an OAM&P work station 319. For example, OAM&P work station 319 may desire to switch from one voice processing unit which is faulty to another voice processing unit. It may be one of the functions of voice processor 1 managed object 366 to send a system reset command to a particular voice processing unit 324, and that function may be invoked by an OAM&P work station 319. This process, of directly communicating with a particular managed object within managed object hierarchy 354, is shown in FIG. 26.

Since each managed object can respond to requests and explain its attributes, sub-components and functions, this information need not be replicated in the user interface of the OAM&P work station. The presentation within the work station can obtain this information from the managed object by simply starting with a distinguished managed object known as the root and recursively asking each child/branch object, "what are your sub-components?" Accordingly, it is possible to create a "default user interface" which only knows how to display the managed object and its relation to other managed objects, but has no information specific to the managed object hierarchy provided within a particular situation, other than how to access the root object and the other objects once they are identified. The user interface could then query the root object, construct an object graph, and calculate the graph without any implementation-specific information.

Each managed object in the managed object hierarchy of the OAM&P subsystem is either transient or static. Static objects are fixed at compile time and instantiated upon startup of the managed object software. Transient objects are managed objects which are instantiated as a result of a state transition from the real-time domain. This transition is processed by a managed object which will be a hierarchal parent of the newly created (transient) object. Upon receipt of the state transition, the parent instantiates the transient object and links it to the managed object hierarchy by adding the transient object to its list of sub-components and registering for the output states produced by the transient object. The state distributor is used to communicate instantiation messages. Therefore, the necessary transient objects may be created well after the real-time domain has sent the creation messages, and such transient objects may be created even upon restarting the managed object software after abnormal termination.

Transient objects are useful where there is uncertainty in the number of components of a system. A particular flexible platform may be equipped differently with network connections, voice processors, etc., and thus cannot be prepared to handle any type or number of components connected to the platform system. In order to provide OAM&P state information for such items which will vary in number, the managed object hierarchy may be modified at each system installation, by developing specialized static managed objects that represent different components, or a single managed object may be created which can represent multiple components as a single managed object. Another way of handling such a situation is with the use of transient objects which may be created by a parent managed object.

In other words, the flexible network platform may have more than one instance of a hardware type. For example, there may be a plurality of media processors that are used as peripheral processing units, and that number may vary from platform to platform. A transient object template may be created which has information which pertains to the transient object that could be created for each instance, including output states, input states, a list of functions the transient object can perform and logic indicating what effect the input states will have on the output states of the transient object. In addition, the transient object template will have a transient create function associated therewith. A monitor process monitors the media processors and therefore knows the number of media processors which are connected. Accordingly, that media processor monitor process will look at the hardware and decide how many media processors are connected and invoke a create transient object function for each media processor for which a transient object is needed. The managed object hierarchy shown in intermediate model domain 312 in FIG. 24 illustrates a transient object template 328*a*, as well as transient objects 328*b* and 328*c* which were created using transient object template 328*a*. Each transient object corresponds to a particular voice processing unit among voice processing units 324 that are connected to the platform.

I. Service Creation Environment

A flexible network platform 10 (e.g., as shown in FIG. 1) may have a service creation environment associated therewith, in order to allow services to be developed for use with the platform. A service creation environment will preferably have a high degree of intelligence about the target platform and to some extent, about the target network in which the application being created will be executed. A goal is to provide a service creation environment which decreases the amount of knowledge that the programmer has to have about the particular system and thus decreases the amount of effort expended by the programmer. This requires specialized support in order to bridge the gap between the programmer's general knowledge and the specifics concerning network platform and network involved. In this regard, a service creation environment may be provided which is an integral part of the core flexible network platform. The flexible network platform 10, e.g., as illustrated in FIG. 1, is intended to be a programmable service node which allows service programming to be done as efficiently as possible, efficiency being defined in terms of time and the level of expertise required to design, write and implement service programs. A service creation environment may be created which allows a user to create services using a text environment, a graphical environment, or a hybrid graphical/text system. A hybrid graphical/text system can be considered more user-friendly in that it will allow programmers with less specific knowledge to create services. The reason for having text as part of the system is because when you have high points in the hierarchy of creating a program, graphic representations of the service are helpful; however, when you get lower in the hierarchy in representing various parts of the service on a lower level, the graphics are less valuable and the textual representations of the program are more helpful.

An exemplary graphical service creation environment system will now be described. The particular embodiment disclosed below uses visual programming as opposed to text-based programming, and point-and-click programming as opposed to mainly keyboard typing. However, a hybrid combination of these elements may be preferable.

A special service creation environment will preferably comprise hierarchal diagrams, since as service logic diagrams grow, they become increasingly difficult to comprehend unless there is a mechanism to represent them in hierarchal form. In order to achieve the goal of creating a program representation that allows quick assimilation of the logic, the programming tool may be configured so that it supports hierarchal representations, along with a powerful navigation capability to move through the hierarchy while mentally following the execution path. It may further be preferred or desirable to incorporate a service provisioning function within the service creation environment since the service logic will define the data relationship that will be needed for the created services.

The flexible network platform disclosed herein may write service programs in a specialized application-oriented language. The primitive statements of the language are called application components (ACs). The flexible network platform may be configured so that it executes a machine readable version of its program. A service creation environment may be provided which allows service programs to be expressed in human readable format and to be expressed mainly graphically, rather than in texts. Programming consists of drawing, as well as typing (at lower levels). The resulting program is called a service graph. That graph is then "compiled" in the service creation environment, and the resulting machine-readable version of the program may be downloaded to the flexible network platform where it can be executed.

Because the programming environment may be tailored to a particular application domain, not only is the language customized, but specialized data objects may exist that all programs interact with. These include a session, which represents the current call, and leg, which represents users on the call. These and other data objects are visible in the service program of the flexible network platform, and the service creation environment may create programs utilizing these objects.

A service graph may be provided within a service creation environment which consists of nodes, which represent each of the service creation application components, and edges that represent transitions from one node to the other. The execution logic is represented by a graph rather than a straight line sequence of ACs because, in general, the ACs may complete their execution with any one of several possible outcomes (which may be referred to as completion codes). The particular outcomes which occur will determine which AC to execute next. Hence, each node in the graph must have an outgoing edge for every possible outcome of the AC represented by the node. The edges may be configured so that they are more than mere indications of the order of execution of the nodes. The service programmer may specify on an edge information that will be used by an AC to which the edge terminates.

The service graph may execute in a separate execution environment, or within a virtual machine provided by the software on the network platform. This environment may include a set of variables that can be written to and read by the ACs in the graph. Some of the variables are called environment variables, which are given values by the system prior to the beginning of execution of the graph, and they are typically used as read-only variables. They provide the ACs in the graph references to the session-related objects. For example, the environment variables include references to the session that this graph is executing in, the leg that originated the event that triggered execution of this graph, the even itself, the ID of the subscriber on whose behalf this graph is executing, and so on.

The remainder of the graph variables are called scratch variables, and are left uninitialized as the graph begins execution. These variables provide a mechanism by which one AC can pass a value to another AC. The use of these variables is determined by the service programmer. The scope of the scratch variables and the environment variables is the full graph.

ACs will typically require parameters. The parameters to an AC are specified by the service programmer on the edges leading to that AC node. These parameters are passed into an AC via environment or scratch variables. An AC may use its parameters for input, output or for both input and output purposes.

In order to program with the graph system, a user will lay out the particular AC nodes to execute and interconnect them with edges that specify the sequence of the execution, and the user will then specify the AC parameters on every edge. The service creation environment should support these functions as well as support the programmer in managing the environment variables and scratch variables. The service creation environment may include standard file manipulation capabilities, such as saving, loading and printing a draft. An editor may be provided in order to allow manipulation of source files, which are in the form of graph diagrams. Such editing capabilities may include graph navigation abilities to particular nodes in the graph, the ability to cut and paste portions of graph and other editing functions.

A specific embodiment of a service creation environment will now be described in relation to the particular embodiment of a flexible network platform disclosed herein. The service creation environment may be implemented on an Apple Macintosh in a Smalltalk programming environment. More specifically, the Macintosh may comprise a Macintosh IIcx, or a IIfx, with a 19-inch monitor. The Smalltalk programming environment may comprise Digitalk's Smalltalk VMac Ver 1.2.

The service creation environment may be configured so that it allows a basic graph structure to be built by point and click techniques. In addition to nodes and edges, a number of other objects may be placed on the graph to aid the programmer in producing a graph that is easy to understand, and such additional objects will be described below.

In order to display graphs in a hierarchal fashion, most graphs will take the form of a tree. The top level is referred to as the main graph, or the top level graph. Besides nodes and edges, the top level graph can contain objects (called expanders) which represent hidden (sometimes collapsed) subgraphs. Those expanders can be opened to display the subgraph they contain. The subgraph may in turn contain expanders, with no limits as to the degree of nesting in subgraphs. Each subgraph is displayed in its own window, and multiple windows can be opened at any time.

A service graph may be displayed and manipulated in the service creation environment as a tree of subgraphs rooted in a top level graph. The hierarchal representation is for display purposes only. The machine readable form of the graph as it executes in a flexible network platform has no notion of hierarchy inherent in it. Of all of the objects that appear on a displayed version of a graph, only nodes, edges and parameters will survive the machine version that the flexible network platform will execute.

The service creation environment may use a number of graph objects that can appear on the graph to have a particular type of visual appearance in order to aid the creation of a service program.

Figure 29A:
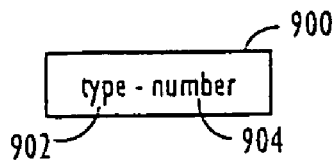
FIGS. 29A-29F are illustrations of several types of graph objects which may be used in connection with a graphics-based service creation environment.

FIG. 29A illustrates a node 900, which may be used to represent a platform executable statement. Displayed with node 900 is its type 902 (which represents the executable AC which it represents), along with its number 904. All nodes are numbered and display their number as shown in FIG. 29A. Incomplete nodes, i.e., nodes which do not have outgoing edges for each of their completion codes, may have a dark box (not shown) around them.

Most node types require parameters, and the parameters to a node are specified on edges coming into the node.

A few node types require provisioning data for their execution, in addition to parameters. For example, an AC may use a particular type of list stored in a network platform database when it executes, so that it can look up a particular number within that list and pass the same to the AC as a parameter.

This information is placed in data objects which are populated through the user/system data provisioning system, and are non-visible in the service creation environment. Nodes that require data may be displayed with a dog-ear corner (not shown).

Figure 29B:
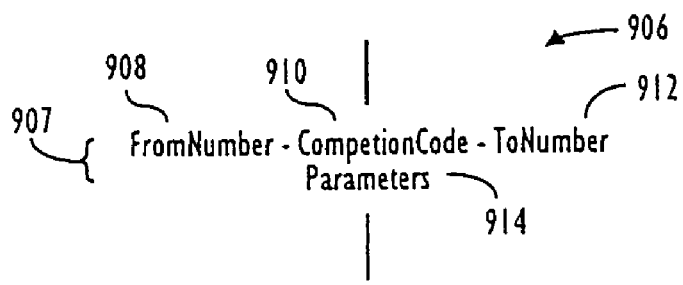

FIG. 29B illustrates an edge 906. Edges represent the flow of execution from one node to another, and represent programming which occurs by specifying AC parameters therein. Each edge 906 will have a "from number" 908 representing the number of the node from which the edge is coming, and a completion code 910 which represents the completion code of the node from which the edge is coming that will trigger the transition that present edge 906 represents. Edge 906 also displays a number representing the node to which the edge is pointing by a "to number" 912. Edge label 907 will optionally include node parameters that the program has specified. Until all required parameters have been specified, the edge label may be provided with an indicator to indicate that this is the case, e.g., by placing a dark underline (not shown) underneath edge label 907.

Comments may be used within a graph and are indicated by free form text. Any object can have a comment except for a connector and a joint graph objects. The service creation environment may be designed so that comments can be placed and moved anywhere on the graph, and so that comments are considered relative to the object that it is associated with. If an object is moved, its comments may automatically move to maintain the same relative position with respect to the object. Comments may automatically be projected back onto the graph if their new relative position would have moved them off the graph.

Figure 29C:
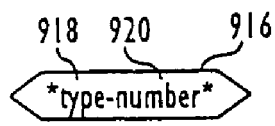

FIG. 29C illustrates a connector graph object 916 which may represent other nodes in the graph. Connectors 916 allow the graph to be displayed more cleanly by eliminating the need for edges that span a large distance in the graph. Edges can be constructed to connectors but not from connectors. Connectors cannot be created for nodes in other subgraphs, only for nodes in the current subgraph. This is because connectors are not for the purpose of creating edges that span subgraphs, but merely simplify the display of a single subgraph. Each connector may include a connector type 918 (which by definition is equal to the type of the node represented by this connector), and a connector number 920 (which by definition is equal to the type of the node represented by this connector).

Figure 29D:
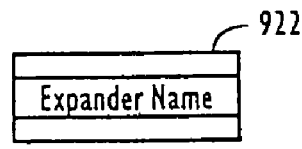

FIG. 29D illustrates an expander 922 which is a single object which represents complete subgraphs hidden "below" them. Expander 922 is used to provide a hierarchal representation of a graph. Edges can be seen going into expanders and coming out of expanders. This occurs when the "from" node and the "to" node are in different levels of the hierarchal representation.

Figures 29E, 29F:

FIG. 29E illustrates a ghost object 924. Ghost objects 924 provide context information for edges that span hierarchy levels. When viewing one end of a spanning edge (either the "from" node or the "to" node) ghosts are used to represent the node at the other end in order to provide context information for the complete edge. A ghost object 924 may include a graph name 926, an edge name 928, and parameters 930.

FIG. 29F illustrates a joint object 932 that can be placed on edges to allow routing of edges through the graph as needed. A joint such as that illustrated in FIG. 29F carries no information.

Figure 30:
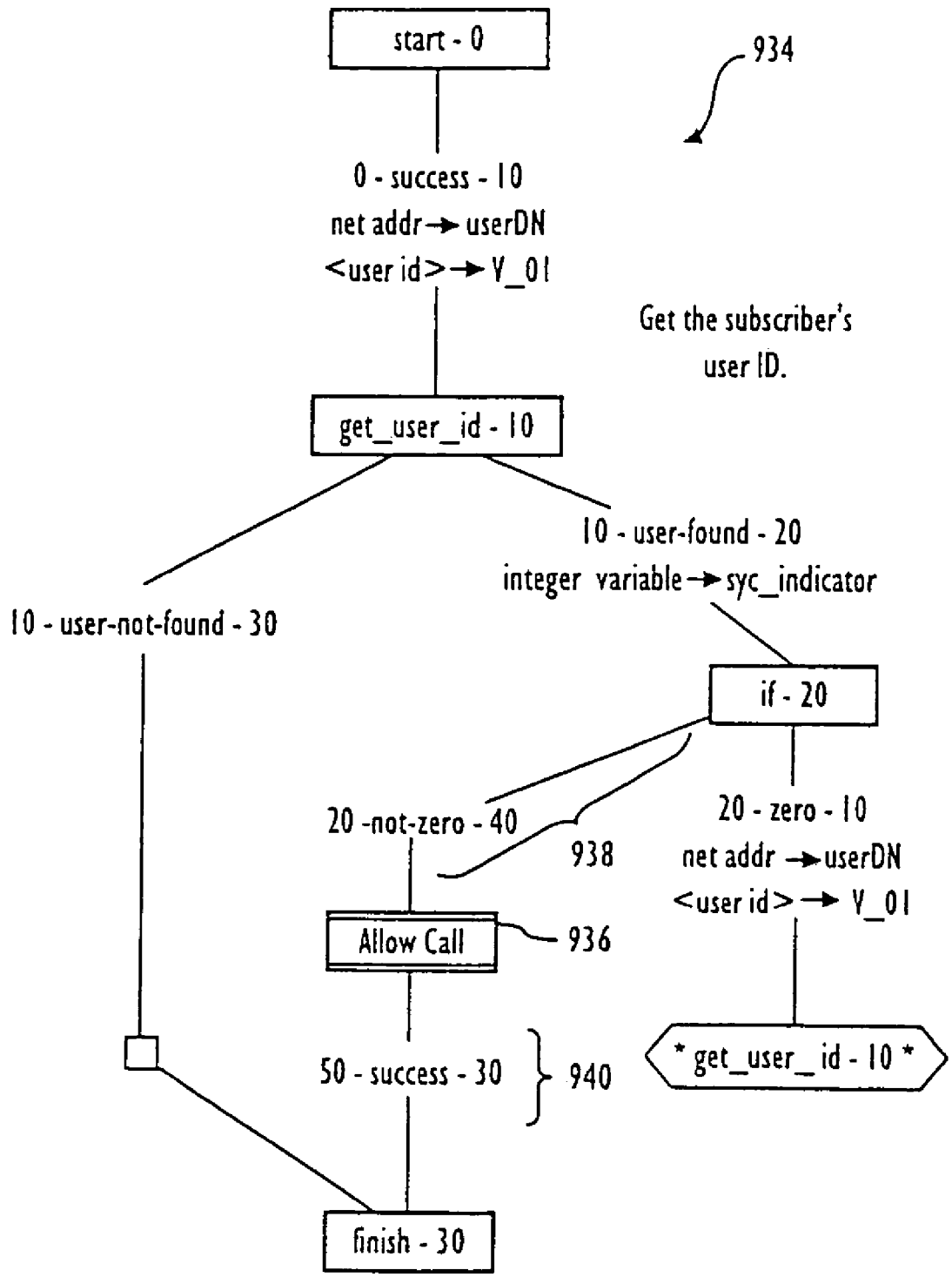
FIG. 30 represents an example graph that may be created in a graphics-based service creation environment.

FIG. 30 illustrates a fragment of a typical graph 934 with various types of graph objects marked thereon. Among the various graph objects illustrated in the graph 934 of FIG. 30, an expander 936 is shown which is labeled "allow call." Expander 936 has an incoming edge 938 and an outgoing edge 940.

Figure 31:
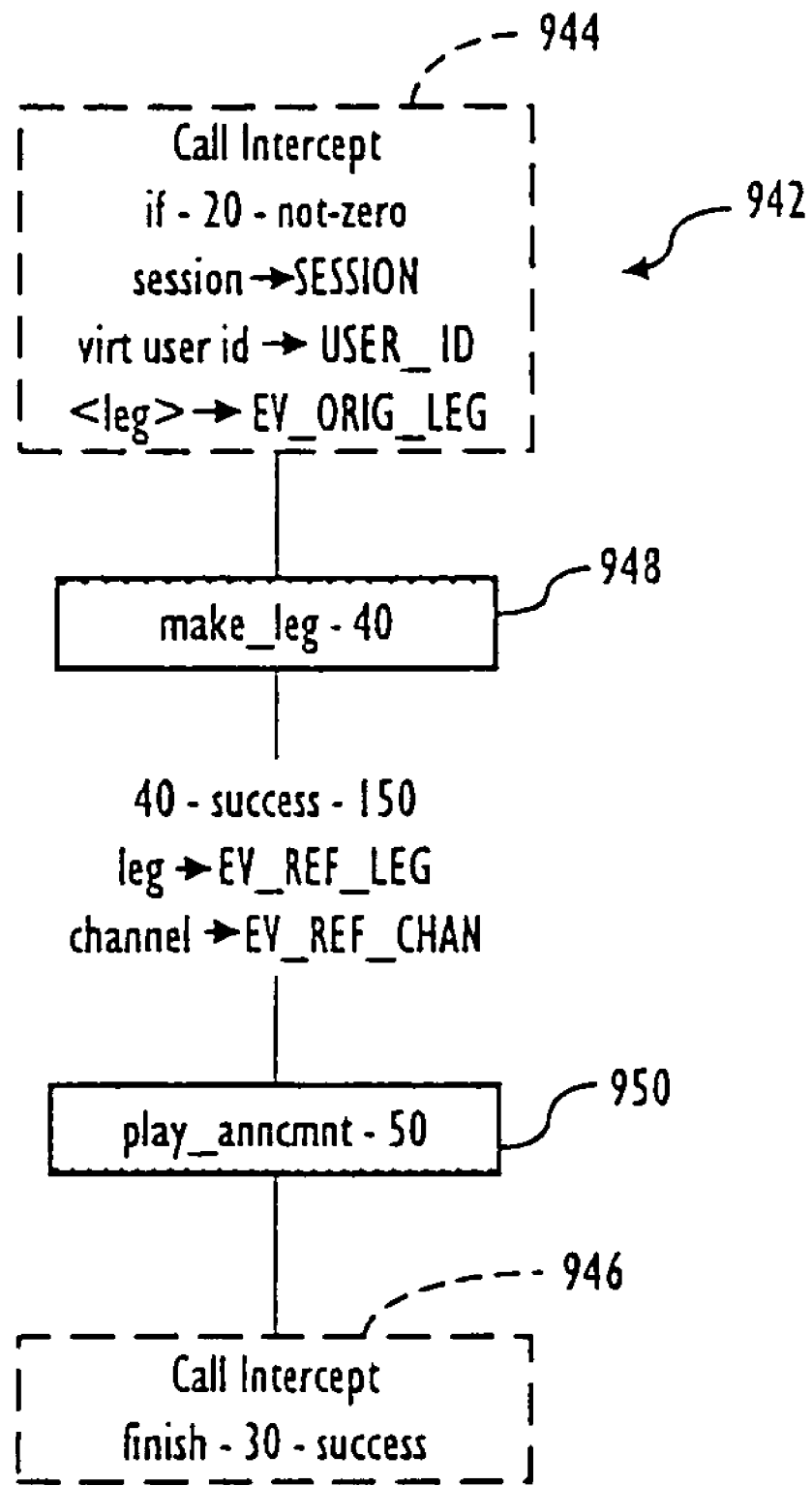
FIG. 31 illustrates an example expander subgraph.

FIG. 31 illustrates an expander subgraph 942 which represents the "allow call" expander 936 shown in FIG. 30. A first ghost 944 and a second ghost 946 are shown to respectively indicate where incoming edge 938 is coming from, and where outgoing edge 940 is going to.

In expander subgraph 942, as shown in FIG. 31, hatch marks are provided at the top of "make_leg-40" node 948 to indicate that this node is an entry point to the subgraph, i.e., it has an incoming edge from a node outside of the subgraph. Hatch marks are also provided on the bottom of a "play_anncmnt-50" node 950 in order to similarly indicate that this node is an exit point of the subgraph, i.e., that this node has an outgoing edge which terminates to a node outside of this subgraph.

Figure 32:
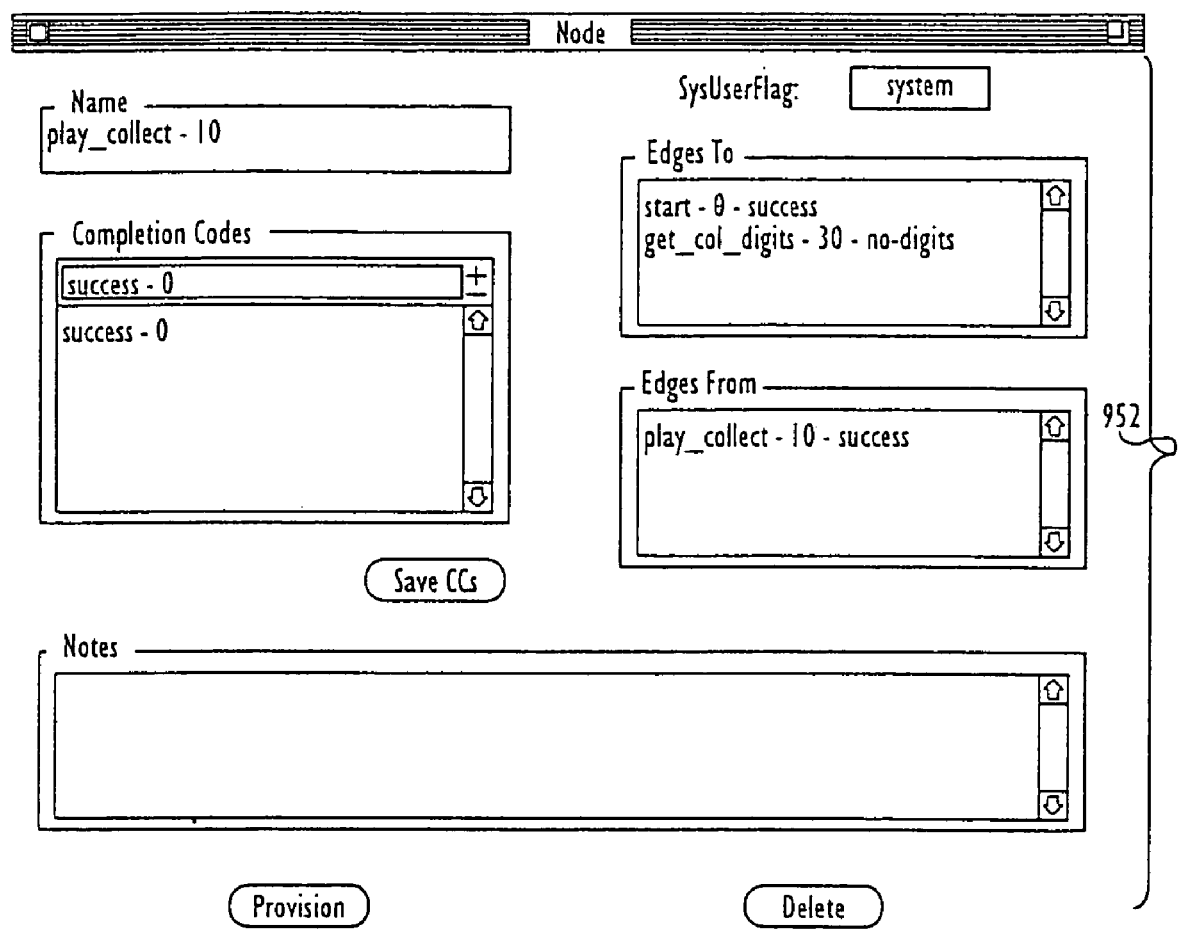
FIG. 32 illustrates an example node window.

Many of the graph objects may be "opened," the term "opened" meaning different things for different types of objects. For example, a node may be opened in order to cause a window 952 as shown in FIG. 32 to be opened to display information about that node. The window illustrated in FIG. 32 corresponds to a "play_collect" node. Most of the fields provided in this window are informational, and no input should be required by the programmer. A notes field is provided which can be used for any detailed comments as desired. If this node uses data from a database (not parameters) this field can be used to document the data and its relationship to data used by other nodes. This information can then be made available to a provisioning application designer.

Figure 33:
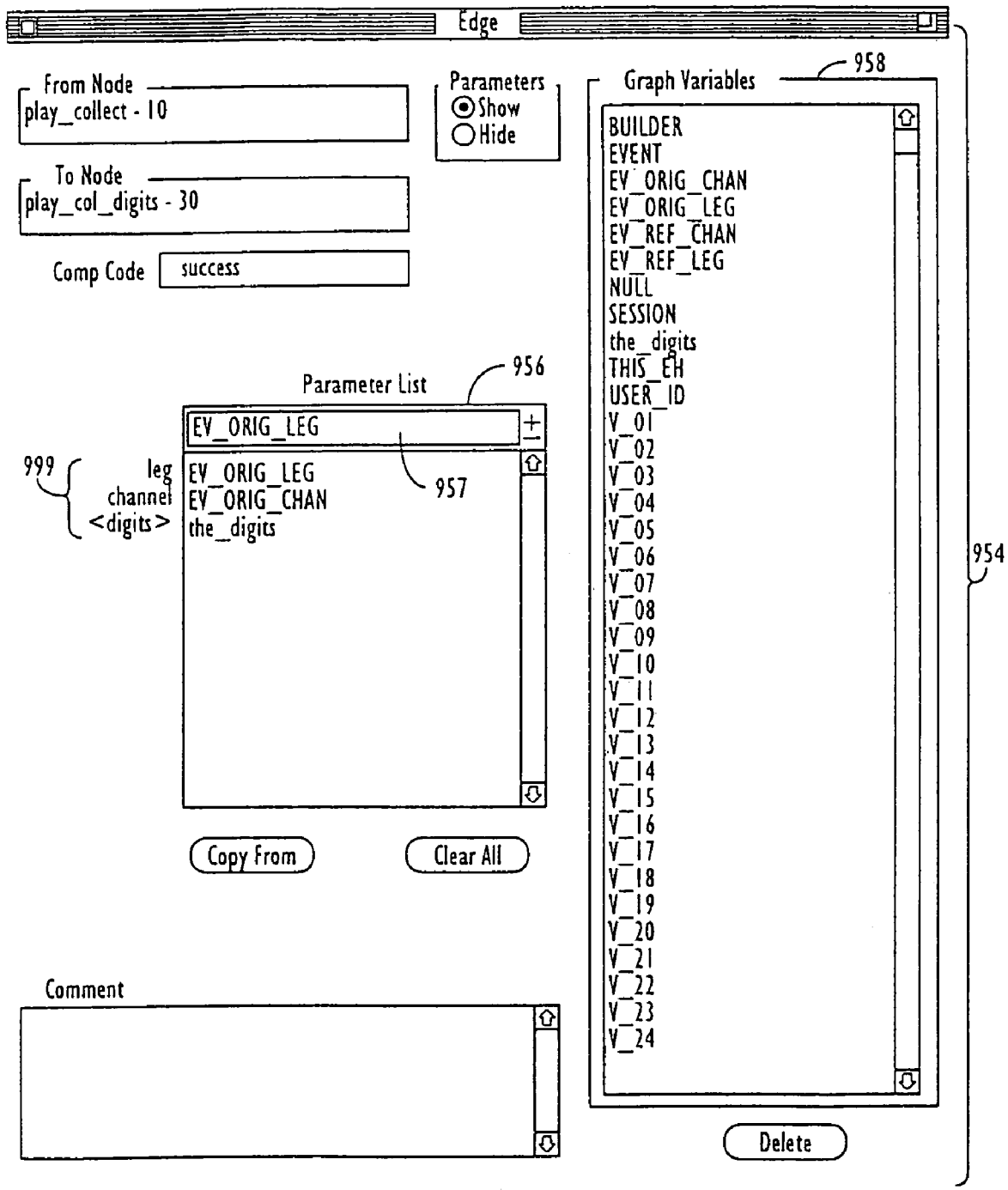
FIG. 33 illustrates an example edge window.

An edge may be opened, e.g., by opening an edge window 954 as shown in FIG. 33. In this window, parameters to ACs may be specified. Therefore, an edge window 954 will most likely always eventually be opened, and user information will be input by that window. The service creation environment may be configured so that it automatically opens an edge window whenever an edge is created.

Mnemonics 999 for the parameters of the "to" node appear on the left side of the parameter list edit box 956. Variables are available as parameters appear in a graph variables list box 958 which is shown at a right side of edge window 954. The service creation environment may be configured so that clicking on the variables in graph variables box 958 will copy a variable's name to the highlighted parameter slot 957 in parameter list box 956, and increment the present highlighted parameter to the next parameter slot below the highlighted parameter slot 957. In this edge window 954, the point-and-click style of programming is shown as being heavily used. The programmer does not have to re-type variable names. The mnemonics 999 on the left of the parameter list box 956 make it clear how many parameters are required.

Other graph objects may be opened in order to open up different-types of information. For example, an expander may be opened to thereby open a graph window on the subgraph of the expander. A comment may be opened to open a text edit window on the comment's text. A ghost object may be opened thereby opening the graph of the node of the "other" end of the edge represented by the ghost. A ghost, as noted above, indicates an edge into and out of a subgraph. By opening a ghost, the programmer can quickly view the graph on the other end, thereby completing the context of a spanning edge. The service creation environment may be provided with a searching system that is similar to that provided by text editing systems. For example, the service creation environment may provide a find menu item which brings up a finder window that allows the programmer to search for graph objects within a user-defined search space that match a user defined search key. The search space may consist of subgraphs to search, types of objects to search for, and an object attribute to base the search on.

In order to navigate a graph, several shortcut methods may be used to jump to other subgraphs or to other places in the current graph in order to follow the logic of the program, or to view sections of a graph related to the currently viewed portion. By way of example, a mechanism may be provided to allow double-clicking on an expander in order to open a window on the expander's subgraph. By using this, edges can be "followed" into an expander. In addition, a shortcut key (e.g., "p") may be used to open a window on the parent graph of the current graph. This, together with the ability to open a window in the expander subgraph, will allow a user to navigate up and down the graph hierarchy. A ghost may be double clicked in order to open the graph containing the other end of the edge represented by the ghost. Using this feature, the logic on both ends of a spanning edge can be viewed. Another feature could include the ability to double-click a connector node in order to scroll the graph to its corresponding real node and highlight that node. This would allow the programmer to quickly jump to the portion of the graph where the execution logic continues.

When graphs execute, they may have a number of available scratch variables for temporary storage of pointers, network addresses, and/or other values. Initially, these variables may be given generic names. A mechanism may be provided to allow the programmer to maintain and edit a data dictionary and define alias names for these variables. Later, when parameters are specified on edges, these alias names can be placed in the menu of legal variable names to chose from.

By providing a data dictionary window, this would allow the programmer to create, delete, or change an alias name. Changing an alias name may result in a global substitution of the new name for the old name on all edges where the old name is used as a parameter. Deleting an alias name could cause edges that have that variable as a parameter to become incomplete. Accordingly, the programmer should be warned before deleting this alias. A finding mechanism (if provided) may be used to find those edges that were rendered incomplete as a result of the deletion.

Routine and Translation

The resource broker may be provided with a mechanism for performing routing and translation. Translation consists of translating an address to particular equipment and routing consists of determining a particular location for the equipment. A given address is routed and translated to provide a particular type of equipment at a particular location.

There are many different ways in which routing and translation can be performed, and it is not necessary that the routing and translation mechanism of the flexible network platform be provided within the resource broker.

The present disclosure describes many different objects in the context of an exemplary embodiment platform software architecture that may be provided in a flexible network platform. In describing the objects, which include objects such as session objects and logic resource objects, specific definitions are provided regarding the encapsulation and modularity of each object. Those definitions are provided to illustrate a specific implementation of the platform software architecture, but they are not intended to be rigidly interpreted. The present invention does not preclude the use of other similar objects that may happen to have different encapsulation and modularity characteristics.

Further, while the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials and embodiments, it is understood that the invention is not to be limited to the particulars disclosed herein, and that the invention extends to all equivalent structures, methods, and uses, such as are within the scope of the appended claims.

What is claimed:

1. A communications services network platform implemented on at least one processor and comprising an operations, administration, maintenance and provisioning (OAMP) system for facilitating communications processing by entities within the platform, the (OAMP) system comprising:

a hierarchy of managed objects, each of the managed objects receiving input state information and defining a logical relation among the input state information and output state information, at least one of the managed objects comprising a state information server, the state information server outputting output state information that is received as input state information by at least one of the managed objects comprising a state information client;

a state distributor system that identifies state information clients registered to receive a notification regarding changes to output state information and that notifies the identified state information clients of the changes to output state information;

a registry that registers at least one specified managed object with the state distributor system so that the at least one specified managed object receives, as input state information, specified output state information, the at least one specified managed object becoming a state information client upon receipt of the specified output state information; and a response system that determines whether output state information has changed for each of the managed objects and that sends a transition message to the state distributor system indicating the change, wherein the entities comprise at least one communications processing resource and at least one object representing communications processing operations and resource usage within a communications processing system.

2. The communications services network platform according to claim 1, wherein state information servers do not utilize information concerning state information clients registered to receive the notification regarding changes to output state information, and wherein the hierarchy of managed objects is modifiable.

3. The communications services network platform according to claim 2, wherein the state distributor system registers bound variables comprising supported types that receive input state information.

4. The communications services network platform according to claim 3, wherein the supported types comprise basic types, instances of classes and lists of at least one of objects and the basic types.

5. The communications services network platform according to claim 1,
wherein output state information comprises a bound variable, the bound variable comprising one of a basic type, an instance of a class and a list comprising at least one of an object and the basic type, and
wherein input state information comprises a bound variable, the bound variable comprising one of a basic type, an instance of a class and a list comprising at least one of an object and the basic type.

6. The communications services network platform according to claim 1,
wherein functions performed by each of the managed objects are registered with the state distributor system.

7. A method for use in a communications services network platform for facilitating communications processing by entities within the platform, the method comprising:
providing a hierarchy of managed objects, each of the managed objects receiving input state information and defining a logical relation among the input state information and output state information, at least one of the managed objects comprising a state information server, the state information server outputting output state information that is received as input state information by at least one of the managed objects comprising a state information client;
identifying state information clients registered to receive a notification regarding changes to output state information;
notifying the identified state information clients of the changes to output state information;
registering at least one specified managed object with a state distributor system so that the at least one specified managed object receives, as input state information, specified output state information, the at least one specified managed object becoming a state information client upon receipt of the specified output state information; and
determining whether output state information has changed for each of the managed objects and sending a transition message to the state distributor system indicating the change,
wherein the entities comprise at least one communications processing resource and at least one object representing communications processing operations and resource usage within a communications processing system.

8. The method according to claim 7,
wherein state information servers do not utilize information concerning state information clients registered to receive the notification regarding changes to output state information, and
wherein the hierarchy of managed objects is modifiable.

9. The method according to claim 7,
wherein the state distributor system registers bound variables comprising supported types that receive input state information.

10. The method according to claim 7,
wherein the supported types comprise basic types, instances of classes and lists of at least one of objects and the basic types.

11. The method according to claim 7,
wherein functions performed by each of the managed objects are registered with the state distributor system.

* * * * *